United States Patent [19]
Ishikawa et al.

[11] Patent Number: 5,870,213
[45] Date of Patent: Feb. 9, 1999

[54] OPTICAL TRANSMISSION SYSTEM, OPTICAL MULTIPLEXING TRANSMISSION SYSTEM, AND RELATED PERIPHERAL TECHNIQUES

[75] Inventors: George Ishikawa; Hiroshi Nishimoto; Hiroki Ooi; Motoyoshi Sekiya; Hiroaki Tomofuji, all of Kawasaki, Japan

[73] Assignee: Fujitsu Limited, Kanagawa, Japan

[21] Appl. No.: 10,519

[22] Filed: Jan. 21, 1998

Related U.S. Application Data

[62] Division of Ser. No. 781,511, Jan. 8, 1997, Pat. No. 5,754,322, which is a continuation of Ser. No. 510,474, Aug. 2, 1995, Pat. No. 5,717,510.

[30] Foreign Application Priority Data

| Aug. 2, 1994 | [JP] | Japan | 6-181013 |
| Mar. 17, 1995 | [JP] | Japan | 7-59295 |
| Jul. 18, 1995 | [JP] | Japan | 7-181929 |

[51] Int. Cl.$^6$ ................................ H04J 14/08
[52] U.S. Cl. ................ 359/135; 359/158; 370/537
[58] Field of Search ............... 359/123, 135, 359/137, 158; 370/535–537, 907

[56] References Cited

U.S. PATENT DOCUMENTS

| 4,473,901 | 9/1984 | Jensen | 370/100 |
| 5,218,662 | 6/1993 | Dugan | 385/123 |
| 5,224,183 | 6/1993 | Dugan | 385/24 |
| 5,355,240 | 10/1994 | Prigent et al. | 359/161 |
| 5,365,362 | 11/1994 | Gnauck et al. | 359/174 |
| 5,539,563 | 7/1996 | Park | 359/161 |
| 5,610,911 | 3/1997 | Ishikawa et al. | 359/135 |
| 5,623,357 | 4/1997 | Kight et al. | 359/135 |

FOREIGN PATENT DOCUMENTS

0590633-A1  4/1994  European Pat. Off. .

*Primary Examiner*—Kinfe-Michael Negash
*Attorney, Agent, or Firm*—Helfgott & Karas, PC.

[57] ABSTRACT

The invention provides a technique for optimizing transmission conditions to achieve large-capacity transmission, and also provides peripheral techniques for the practical implementation of optical multiplexing that makes large-capacity transmission possible. A transmission characteristic is measured in a transmission characteristic measuring section, and control of signal light wavelength in a tunable light source, control of the amount of prechirping, control of the amount of dispersion compensation, and/or control of optical power are performed to achieve the best transmission characteristic. Wavelength dispersion is deliberately introduced by a dispersion compensator, to reduce nonlinear effects. A tunable laser is used to optimize signal light wavelength for each optical amplification repeater section. Peripheral techniques, such as drift compensation, clock extraction, optical signal channel identification, clock phase stabilization, etc., are provided for the implementation of optical multiplexing.

16 Claims, 103 Drawing Sheets

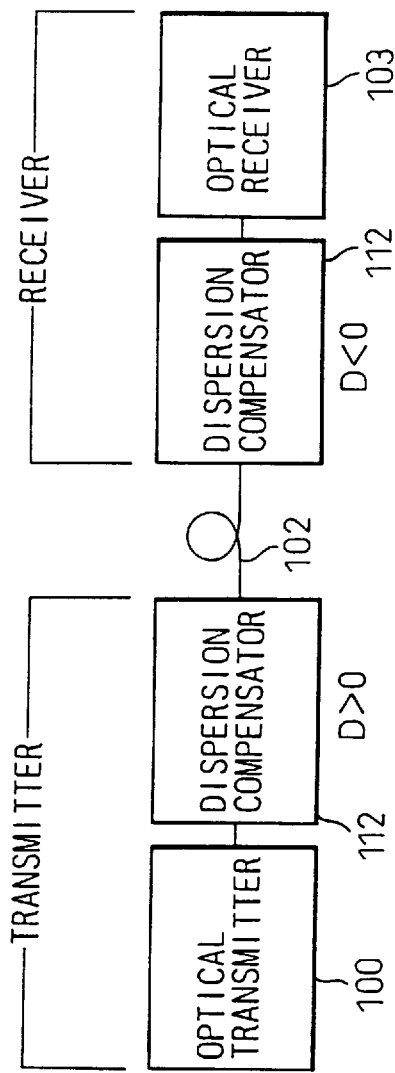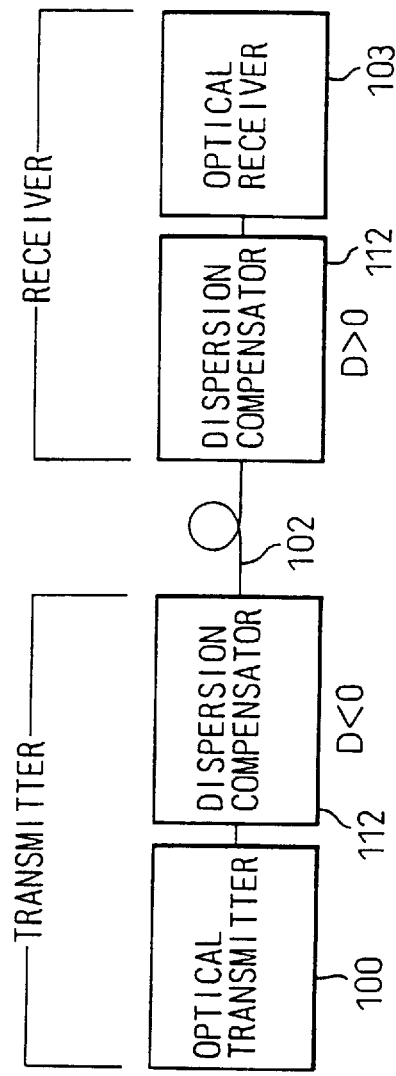
Fig. 42(a)
Fig. 42(b)

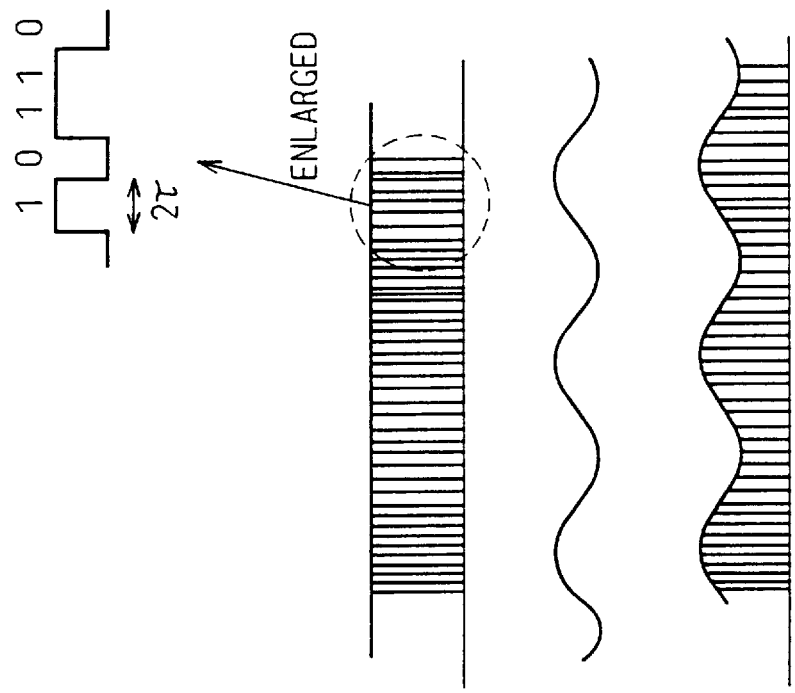

OPTICAL TRANSMISSION SYSTEM, OPTICAL MULTIPLEXING TRANSMISSION SYSTEM, AND RELATED PERIPHERAL TECHNIQUES

This application is a division of application Ser. No. 08/781,511 now U.S. Pat. No. 5,754,322, filed Jan. 8, 1997, which is a continuation of application Ser. No. 08/510,474 now U.S. Pat. No. 5,717,510, filed Aug. 2, 1995.

BACKGROUND OF THE INVENTION

1. Field of the Invention

The present invention relates to an optical transmission system and its related techniques. More particularly, the invention relates to an optical transmission system having a transmission line with its transmission conditions optimized for large-capacity transmission, an optical transmission system employing an optical multiplexing technique such as optical time-division multiplexing (OTDM) to achieve large-capacity transmission, and related techniques for implementing the same.

2. Description of the Related Art

Increasing the transmission speed severely limits the transmission distance because of the waveform distortion, caused by group-velocity dispersion (GVD), in optical fibers. Furthermore, when the transmission speed is increased, the optical power for transmission needs to be increased to maintain required difference between transmitted and received optical power levels. This in turn increases the effect of self-phase modulation (SPM), a nonlinear effect of optical fibers, which further complicates the waveform degradation through interaction with group velocity dispersion (SPM-GVD effect).

When the waveform distortion caused by the SPM-GVD effect is dominant, the scaling rule expressed by the following equation essentially holds.

$$DB^2 P_{av} L^2 = \text{const.} \quad (1)$$

D: dispersion value (ps/nm/km)
B: transmission rate (Gb/s)
$P_{av}$: average optical power through transmission line (mW)
L: transmission distance (km) p0 const.: determined by required penalty For example, when the transmission rate B is quadrupled from 10 Gb/s to 40 Gb/s, the average optical power $P_{av}$ through the transmission line needs to be quadrupled. This means that to achieve the same transmission distance, the dispersion value D at signal wavelength must be set to $\frac{1}{64}$.

To minimize the dispersion value of signal light, work is currently under way to transmit signals in the 1.55-$\mu$m range by using a dispersion-shifted fiber (DSF), an optical fiber whose zero-dispersion wavelength $\lambda_0$ is shifted to the 1.55-$\mu$m range where fiber transmission loss is minimum. The zero-dispersion wavelength $\lambda_0$ is the wavelength at which the chromatic dispersion value D (ps/nm/km), representing the amount of change of propagation delay time with respect to slight variations in wavelength, changes from negative (normal dispersion) to positive (abnormal dispersion). Near this wavelength $\lambda_0$, the absolute value of chromatic dispersion becomes the smallest, so that the waveform distortion due to the chromatic dispersion is reduced to a minimum.

However, since the fiber drawing process introduces slight variations in fiber core diameter, the zero-dispersion wavelength $\lambda_0$ of a DSF transmission line is inevitably subjected to variations along its longitudinal direction. Furthermore, transmission cables are fabricated by connecting segments of multi-core cables, each segment extending several kilometers, and the wavelengths $\lambda_0$ between adjacent segments are not continuous but randomly distributed. Moreover, $\lambda_0$ varies with aging and due to changes in ambient temperature, etc.

Therefore, in the prior art, the worst-case design has been employed by which the transmission line has been designed by considering the distribution of $\lambda_0$ and the deterioration with time so that the required transmission quality can be satisfied even if the worst-case value is applied throughout the transmission line. This has inevitably increased transmission line costs, which has impeded the implementation of high-capacity transmission systems.

On the other hand, signal processing, such as modulation and demodulation of optical signals, is usually performed at the electrical signal level, and it has been standard practice to increase the speed of optical transmission systems by increasing the speed of electrical signals used to modulate optical signals. In recent years, however, increasing the speed at the electrical signal level using electronic devices has been posing a difficult problem. Research and development is being undertaken on optical communication devices, at 10 to 40 Gb/s, using Si, GaAs, HBT, HEMT, etc., but it is said that at the present state of technology, 10 to 20 Gb/s is the maximum for practical implementation.

Therefore, to increase the transmission speed of optical transmission systems beyond the operating speeds of electronic devices, multiplexing techniques in the optical region provide effective means. There are two main techniques that can be used: one is wavelength-division multiplexing (WDM) and the other is optical time-division multiplexing (OTDM). For practical implementation of either technique, development of related peripheral techniques is needed.

SUMMARY OF THE INVENTION

Accordingly, it is a first object of the invention to provide a technique for optimizing transmission conditions to achieve high-capacity transmission.

It is a second object of the invention to provide peripheral techniques for the practical implementation of optical multiplexing that makes large-capacity transmission possible.

According to the present invention, there is provided an optical transmission system comprising: an optical transmitter for generating an optical signal; an optical transmission line for transmitting the optical signal generated by the optical transmitter; an optical receiver for recognizing the optical signal transmitted over the optical transmission line; and characteristic adjusting means for adjusting at least either a characteristic value of the optical signal or a characteristic value of the optical transmission line, and thereby matching the characteristic of the optical signal to that of the optical transmission line.

According to the present invention, there is also provided an optical transmission system comprising: an optical transmitter for generating an optical signal; an optical transmission line for transmitting the optical signal generated by the optical transmitter; an optical receiver for recognizing the optical signal transmitted over the optical transmission line; and means for reducing a nonlinear effect by smoothing variation of the power of the optical signal transmitted through the optical transmission line.

According to the present invention, there is also provided an optical transmission system comprising: an optical transmitter for generating an optical signal; an optical transmission line for transmitting the optical signal generated by the optical transmitter; an optical receiver for recognizing the optical signal transmitted over the optical transmission line; an optical amplification repeater, installed at an intermediate point along the optical transmission line, for optically amplifying the optical signal being transmitted along the optical transmission line; and a wavelength converter for converting the wavelength of the optical signal optically amplified in the optical amplification repeater.

According to the present invention, there is also provided a drift compensation circuit for optical modulators in an optical multiplexing system in which a plurality of optical signals modulated with baseband signals by a plurality of optical modulators are multiplexed together, comprising: a plurality of drive circuits for amplitude-modulating the baseband signals with low-frequency signals before the baseband signals are supplied to the plurality of optical modulators; an optical coupler for separating a portion of an optical multiplexed signal generated by multiplexing the plurality of optical signals; an optical detector for converting the portion of the optical multiplexed signal separated by the optical coupler into an electrical signal; and control means for generating a bias signal for the drift compensation of each of the optical modulators by phase-detecting the low-frequency signal components contained in the output of the optical detector with the low-frequency signals respectively used in the plurality of drive circuits.

According to the present invention, there is also provided an optical transmission system comprising: optical time-division multiplexing means for time-division multiplexing a plurality of optical signals; an optical transmission line for transmitting an optical multiplexed signal generated by the optical time-division multiplexing means; clock extraction means for extracting a clock signal for the original optical signals directly from the optical multiplexed signal transmitted over the optical transmission line; and amplitude difference providing means for providing amplitude differences among the optical signals multiplexed on the optical multiplexed signal to be supplied to the clock extraction means and thereby enabling the clock extraction means to extract the clock signal.

According to the present invention, there is also provided an optical transmitter comprising: optical time-division multiplexing means for time-division multiplexing a plurality of optical signals; and amplitude difference providing means for providing amplitude differences among the optical signals to be multiplexed on an optical multiplexed signal so that a clock signal for the original optical signals can be extracted directly from the optical multiplexed signal at the receiving end.

According to the present invention, there is also provided an optical transmission system comprising: optical time-division multiplexing means for time-division multiplexing a plurality of optical signal channels; means for appending identification information, for identifying each optical signal channel, to an optical multiplexed signal generated by the optical time-division multiplexing means; an identification information extraction circuit for extracting the identification information contained in the optical signal channel; and a control circuit for changing output destinations so that each optical signal channel is output to a designated destination in accordance with the identification information extracted by the identification information extraction circuit.

According to the present invention, there is also provided an optical receiver comprising: an identification information extraction circuit for extracting the identification information contained in the optical signal channel; and a control circuit for changing output destinations so that each optical signal channel is output to a designated destination in accordance with the identification information extracted by the identification information extraction circuit.

According to the present invention, there is also provided an optical transmitter comprising: optical time-division multiplexing means for time-division multiplexing a plurality of optical signal channels; and means for appending identification information for identifying each optical signal channel, to an optical multiplexed signal generated by the optical time-division multiplexing means.

According to the present invention, there is also provided an optical receiver for receiving an optical time-division multiplexed signal carrying a plurality of optical signals time-division multiplexed thereon and having a low-frequency signal superimposed thereon in a time slot designated for a specific optical signal, comprising: an optical switch for separating the optical time-division multiplexed signal into the respective optical signals; clock generating means for generating a clock signal for controlling the optical switch; and clock phase control means for performing control so that the clock signal generated by the clock generating means is phase synchronized, to the optical time-division multiplexed signal, by using the low-frequency signal superimposed on the optical time-division multiplexed signal.

BRIEF DESCRIPTION OF THE DRAWINGS

FIG. 42 is a diagram showing an example of an optical transmission system in which dispersion compensators with dispersion amounts with signs opposite to each other are installed at a transmitting end and a receiving end;

FIG. 120 is a waveform diagram showing the operation of the circuit of FIG. 96.

DESCRIPTION OF THE PREFERRED EMBODIMENTS

Figure 1:
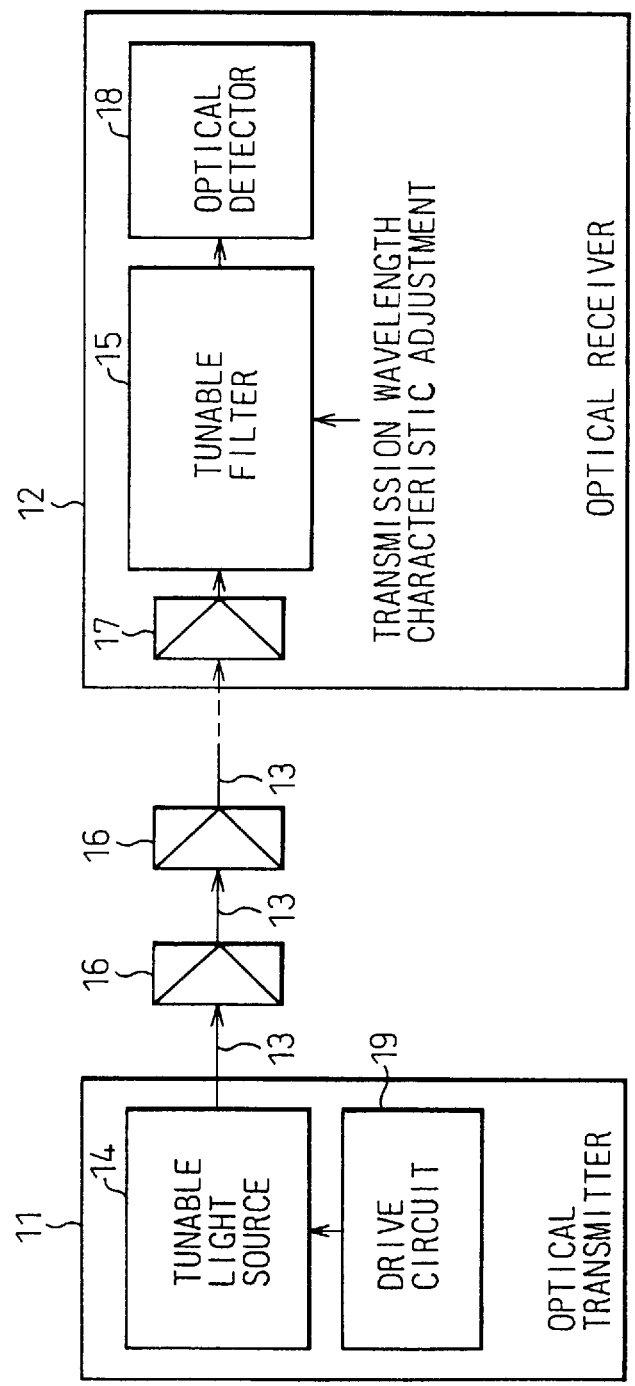
FIG. 1 is a block diagram showing an example of an optical transmission system according to the present invention, in which a tunable light source is provided.

FIG. 1 is a block diagram showing an example of an optical signal transmission system according to the present invention. In FIG. 1, reference numeral 11 is an optical transmitter, 12 is an optical receiver, 13 is an optical fiber, 14 is tunable light source, 15 is a tunable filter, 16 and 17 are optical amplifiers or optical repeaters including optical amplifiers, 18 is an optical detector, and 19 is a drive circuit.

The tunable light source 14 used in the optical transmitter 11 can be constructed, for example, from a tunable semiconductor laser of known configuration, such as a three-electrode type or an external diffraction grating controlled type.

Figure 2:
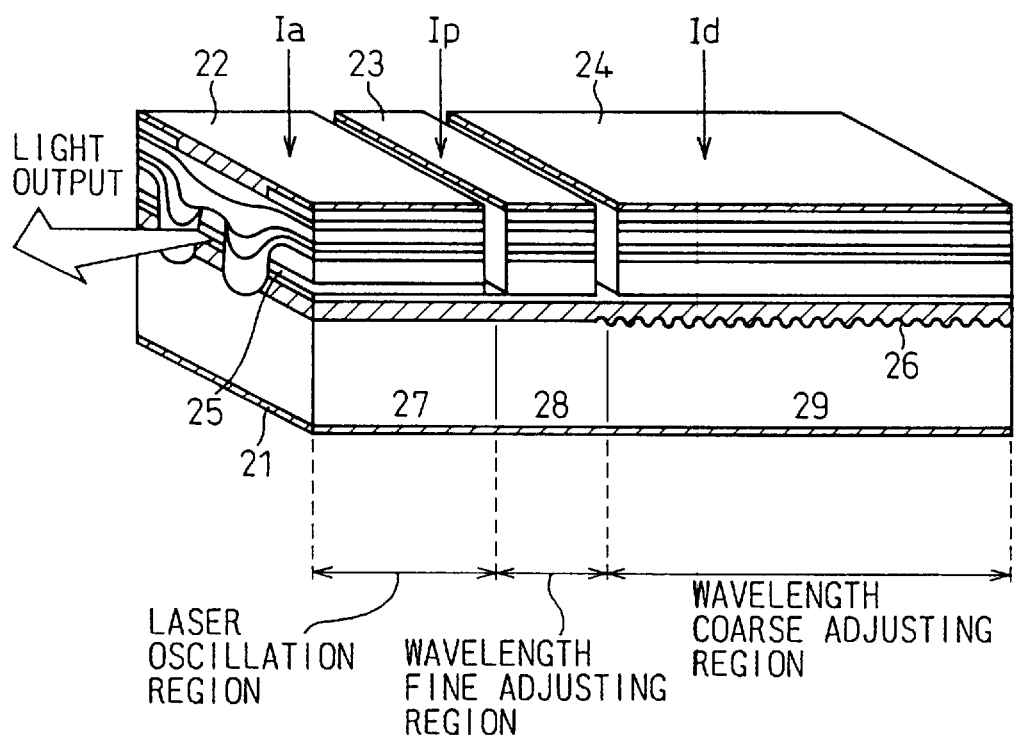
FIG. 2 is a perspective view showing a tunable semiconductor laser as an example of the tunable light source.

FIG. 2 is a diagram for explaining a tunable semiconductor laser; the basic structure of a three-electrode tunable semiconductor laser is shown here. The tunable semiconductor laser shown in FIG. 2 has an InGaAsP/InP laser configuration. As shown, a laser oscillation region 27 containing an active layer 25 is formed between a common electrode 21 and an electrode 22, a wavelength fine-adjusting region 28 is formed between the common electrode 21 and an electrode 23, and a wavelength coarse-adjusting region 29 containing a diffraction grating 26 is formed between the common electrode 21 and an electrode 24. The emission wavelength can be varied by adjusting a current Ip applied to the electrode 23 and a current Id applied to the electrode 24, and the optical output can be controlled by adjusting a current Ia applied to the electrode 22. Therefore, by controlling the currents Ia, Ip, and Id via the drive circuit 19, the emission wavelength can be controlled while outputting an optical signal modulated with the information to be transmitted.

Instead of the direct modulation type described above that directly drives the light source, the tunable light source 14 may be constructed as an external modulation type which uses an external modulator to modulate the light from the light source. Furthermore, an optical amplifier may be provided for amplifying an optical signal from the tunable light source 14 for transmission through the optical fiber 13.

The optical amplifiers 16 and 17 can be constructed from optical-fiber amplifiers doped with rare earth elements such as Er, Nd, etc. For example an Er-doped optical-fiber amplifier can directly amplify an optical signal at 1.5 μm when pumped with light at 1.48 μm or 0.98 μm.

The optical receiver 12 consists, for example, of the optical amplifier 17, tunable filter 15, and optical detector 18. The optical amplifier 17 and the tunable filter 15 may be omitted. The optical detector 18 is constructed, for example, from a photodiode or a phototransistor of known structure for converting an optical signal into an electrical signal. An information processing section for converting the signal to electrical form by the optical detector 18, performing equalization for level discrimination, and recovering the transmitted information for reception, is not shown here since it can be implemented using various known configurations.

The tunable filter 15 can be constructed using a filter of known configuration. For example, it is possible to use a temperature-controlled tunable filter as explained by the title "Study of a Fabry-Perot wavelength-selective optical filter using Si," B-1055, Proc., Institute of Electronics, Information and Communication Engineers, Spring Convention, 1994. It is also possible to use a fixed-wavelength filter having a transmission wavelength characteristic that can cover the entire wavelength variable range of the tunable light source 14.

In a system in which the optical transmitter 11 and the optical receiver 12 are not separated by a large distance, the optical amplifiers 16 can be omitted, in which case the optical transmitter 11 will be connected to the optical receiver 12 by the optical fiber 13 alone. If there exists a fluctuation in the zero dispersion wavelength along the longitudinal direction of the optical fiber 13, or if there exist variations in the zero dispersion wavelength of the optical fiber 13 between fiber segments constructed by splicing manufactured unit lengths of optical fibers, the average value of such fluctuation or variation of the zero dispersion wavelength is obtained along the entire length between the optical transmitter 11 and the optical receiver 12, and the tunable light source 14 is so regulated as to emit light at that wavelength, for example. It should be noted that a signal light wavelength that provides the best transmission characteristics is not always the zero dispersion wavelength, as explained later.

When an optical signal is amplified by a rare-earth doped optical-fiber amplifier and fed into an optical fiber for transmission over a long distance, if the wavelength of the signal light is in an abnormal dispersion region near the zero dispersion wavelength of the optical fiber, a four-wave mixing (FWM) phenomenon occurs between the signal light and spontaneously emitted light, and because of modulation instability the spontaneous emission is amplified, degrading the S/N ratio. To prevent this, the emission wavelength is controlled within a normal dispersion region, while avoiding a region near the zero dispersion wavelength of the optical fiber 13.

For a long distance transmission system, the optical amplifiers 16 and 17 are usually provided. Since the optical amplifiers 16 and 17 not only amplify optical signals but emit light as spontaneous emission, it is desirable to provide a filter in the front stage of the optical receiver 18. It is further desirable that the filter be constructed from the tunable filter 15 whose transmission wavelength characteristic is adjustable. In that case, when the emission wavelength of the tunable light source 14 of the optical transmitter is controlled in the above manner, the transmission characteristics can be further improved by controlling the transmission wavelength characteristic of the tunable filter 15 in such a manner as to match the emission wavelength.

Figure 3:
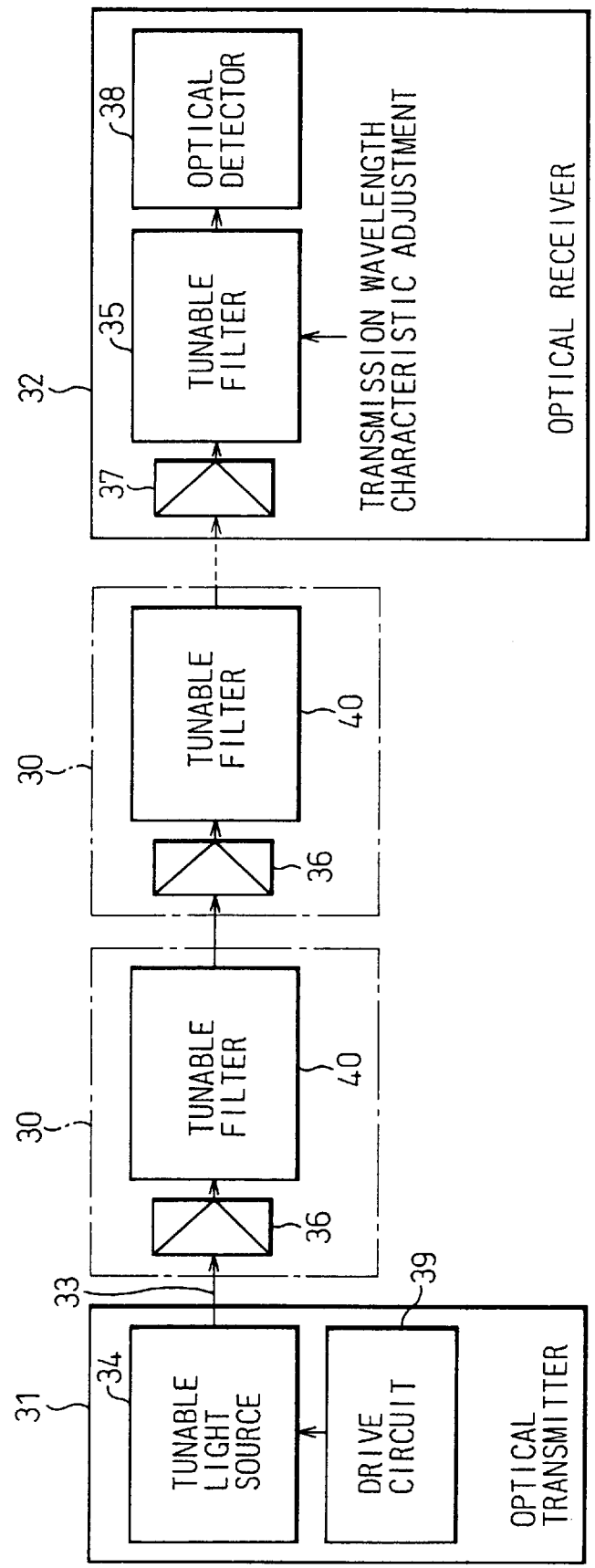
FIG. 3 is a block diagram showing another example of the optical transmission system according to the present invention, further including a tunable filter for each repeater.

FIG. 3 is a block diagram showing another example of the optical signal transmission system according to the present invention. In FIG. 3, reference numeral 30 is a repeater, 31 is an optical transmitter, 32 is an optical receiver, 33 is an optical fiber, 34 is a tunable light source, 35 is a tunable filter, 36 and 37 are optical direct amplifiers, 38 is an optical detector, 39 is a drive circuit, and 40 is a tunable filter. The parts with the same names as those in the embodiment shown in FIG. 1 have the same functions as the corresponding parts already described.

In the example shown here, the optical amplifier 36, such as a rare-earth doped optical-fiber amplifier, and the tunable filter 40 constitute the repeater 30. The wavelength transmission characteristic of the tunable filter 40 in each repeater 30, as with the tunable filter 35 in the optical receiver 32, is adjusted so as to block light components other than the optical signal, such as spontaneous emission from the optical amplifier 36, thus improving transmission characteristics and making long-distance transmission possible. It is also possible to use, instead of the tunable filter 40, a fixed-wavelength filter having a transmission wavelength characteristic that can cover the entire wavelength variable range of the tunable light source 34. Furthermore, in the configuration shown here, the tunable filter 40 is provided after the optical amplifier 35, but it will be recognized that the invention is not limited to this particular configuration.

Figure 4:
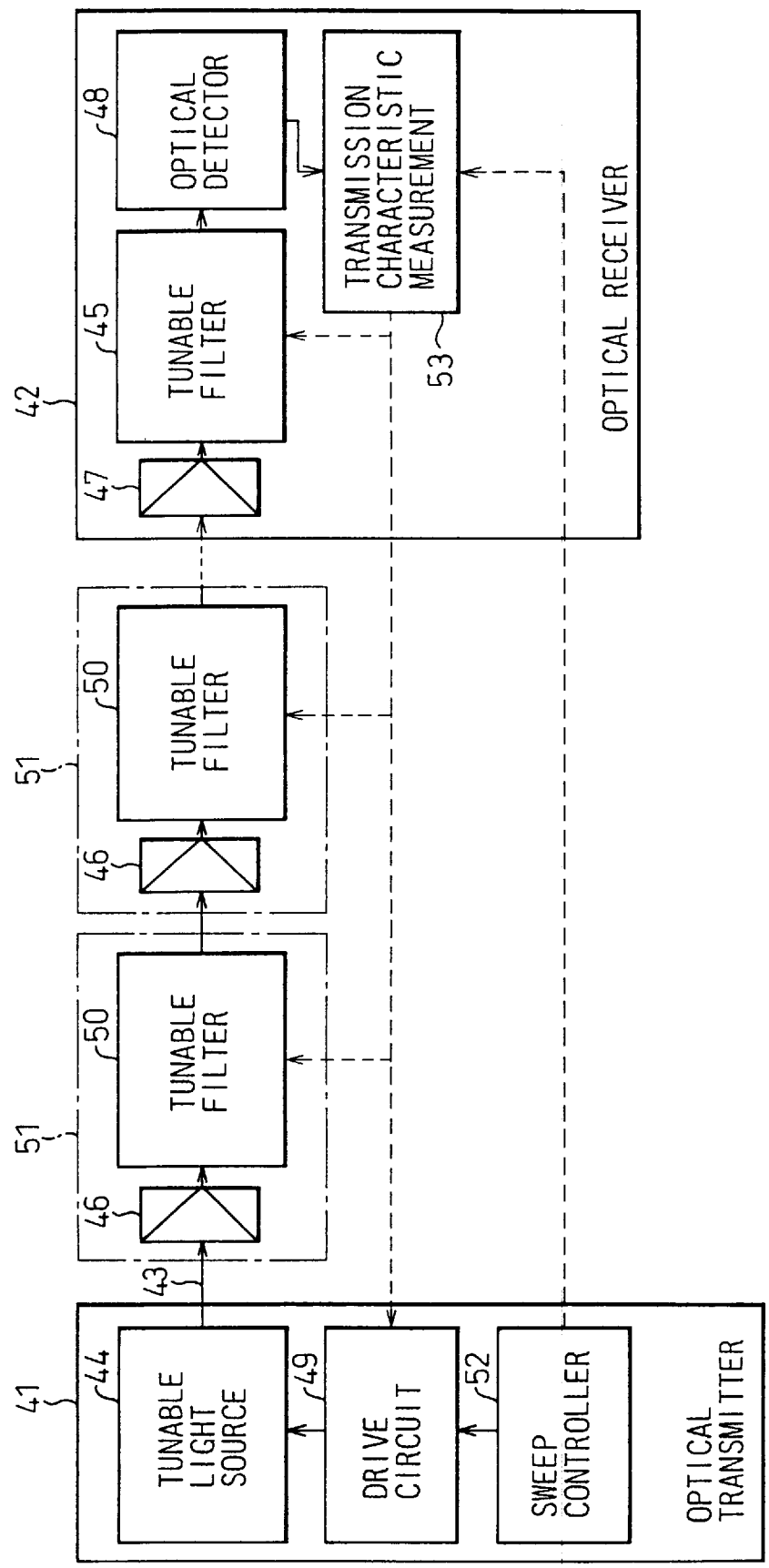
FIG. 4 is a block diagram showing another example of the optical transmission system according to the present invention, further including a transmission characteristic measuring section.

FIG. 4 is a block diagram showing a further example of the optical signal transmission system according to the present invention. In FIG. 4, reference numeral 41 is an optical transmitter, 42 is an optical receiver, 43 is an optical fiber, 44 is a tunable light source, 45 is a tunable filter, 46 and 47 are optical amplifiers, 48 is an optical detector, 49 is a drive circuit, 50 is a tunable filter, 51 is a repeater, 52 is a sweep controller, and 53 is a transmission characteristic measuring section.

This example is identical to the embodiment shown in FIG. 3, except that the transmission characteristic measuring section 53 and the sweep controller 52 are added. The drive circuit 49 is controlled by the sweep controller 52 to sweep the emission wavelength of the tunable light source 44. For example, when the tunable light source 44 is constructed from the tunable semiconductor laser shown in FIG. 2, sweeping can be accomplished by varying the currents Ip and Id; in the case of a semiconductor laser of other configuration, sweeping of the emission wavelength can be accomplished by continuously varying the temperature. The optical signal with the thus swept emission wavelength is transmitted along the optical fiber 43 and via the repeaters 51, and is detected by the optical detector 48 of the optical receiver 42, where the received result is applied to the transmission characteristic measuring section 53 which measures the transmission characteristic between the optical transmitter 11 and the optical receiver 12. Based on the result of the transmission characteristic measurement, the emission wavelength of the tunable light source 44 and the wavelength transmission characteristics of the tunable filters 45 and 50 are so set as to achieve the best transmission characteristic.

When the system is constructed so that the tunable light source 44 and the tunable filters 45 and 50 are automatically controlled by the transmission characteristic measuring section 53, sweep control information for controlling the sweeping of the emission wavelength of the tunable light source via the drive circuit 49 is transmitted from the sweep controller 52 to the transmission characteristic measuring section 53, as shown by a dotted line. Based on the sweep control information thus transmitted, the transmission characteristic measuring section 53 controls the transmission wavelength characteristic of the tunable filters 45 and 50, as shown by dotted lines in the figure. From the transmission characteristic at the optical detector 48 during sweep control, the transmission characteristic measuring section 53 determines the emission wavelength that maximizes the transmission characteristic, and sends control information to the drive circuit 49 to control the wavelength to the determined value, while applying control information to the tunable filters 45 and 50 to control their transmission wavelength characteristics to match that emission wavelength.

Therefore, by activating the sweep controller 52 when the system is started the emission wavelength of the tunable light source 44 can be automatically set to a value that provides the best transmission characteristics. Further, while the system is in operation, the sweep controller 52 may be deactivated, but it would be possible to have the transmission characteristic measuring section 53 measure the transmission characteristic periodically or continuously and adjust the emission wavelength of the tunable light source 44 and the wavelength transmission characteristics of the tunable filters 45 and 50 so that the best transmission characteristic can be achieved.

The control signal for adjusting the wavelength transmission characteristic from the transmission characteristic measuring section 53 to each repeater 51 and the control signal applied to the drive circuit 49 for optimizing the transmission characteristic or the sweep control signal from the sweep controller 52 to the transmission characteristic measuring section 53 can be transmitted using a relatively low-speed transmission line. Therefore, such information can be transmitted over control lines or the like installed between the optical transmitter 11 and the optical receiver 12, and in the case of a system in which optical signals are transmitted in both directions, such information can be transmitting by superimposing it as a sub-signal on the main optical signal.

Figure 5:
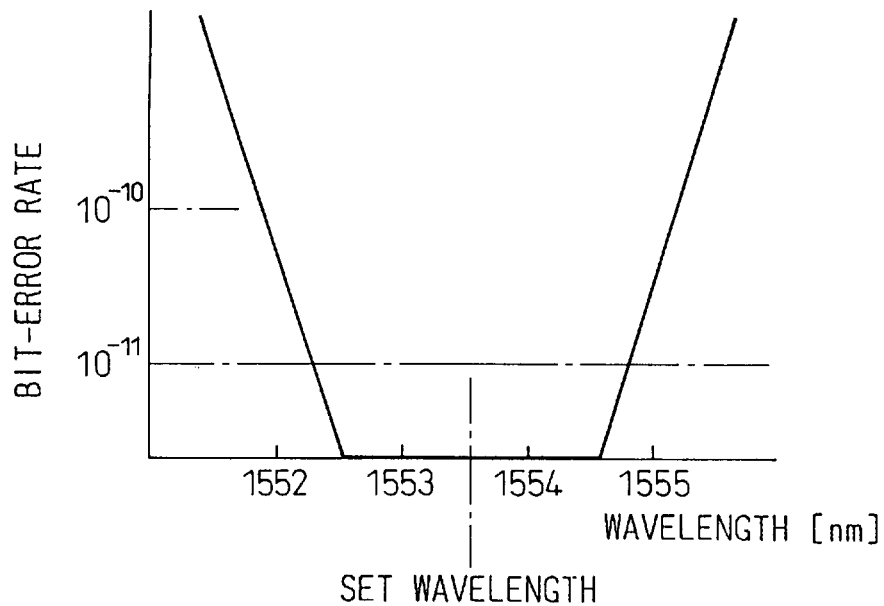
FIG. 5 is a diagram for explaining a method of determining wavelength from a measured value of a bit-error rate.

When the transmission characteristic measuring section 53 is constructed to measure the transmission characteristic by measuring bit-error rates, if the bit-error rate at each wavelength is measured while sweeping the emission wavelength of the tunable light source 44 and the measurements are plotted as shown in FIG. 5 where the allowable error rate is set at $10^{-11}$, for example, the emission wavelength of the tunable light source 44 is set approximately at the center of the wavelength range falling within the allowable error rate. That is, the drive circuit 49 is controlled to set the emission wavelength of the tunable light source 44 to the best point of the transmission characteristic, and at the same time, the wavelength transmission characteristics of the tunable filters 45 and 50 are set accordingly. The bit-error rate can thus be controlled within the allowable value despite the variation of the characteristics of the optical fiber 43 caused by temperature changes, aging, etc.

The bit-error rate can be measured using an error rate measuring means provided in an ordinary transmission system. If the transmission speed of optical signals is higher than 10 Gb/s, for example, the error rate at each wavelength can be measured in a short time for allowable error rates smaller than $10^{-11}$. It is also possible to append a parity check bit for transmission and measure the error rate using the parity check bit.

Figure 6:
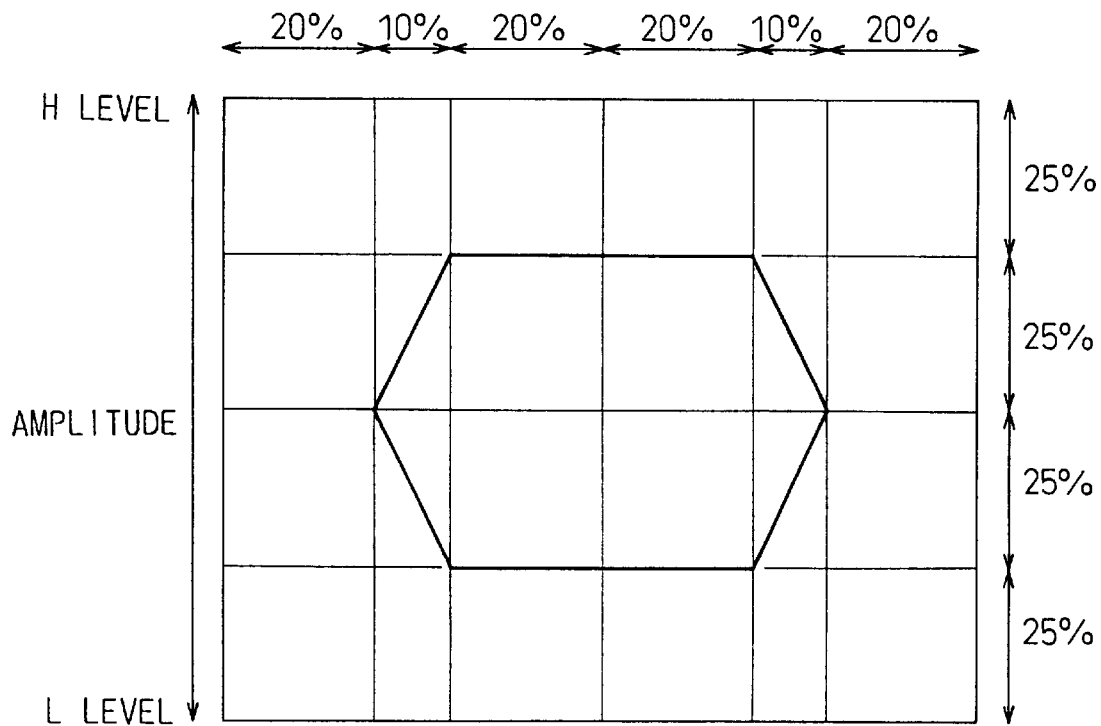
FIG. 6 is a diagram for explaining the measurement of a transmission characteristic using an eye pattern.

The transmission characteristic measuring section 53 may be constructed to measure the transmission characteristic using an eye pattern. FIG. 6 is a diagram for explaining an eye mask pattern. If the eye mask pattern shown by thick lines represents a threshold value, for example, the emission wavelength of the tunable light source 44 is adjusted so that the eye pattern of the received signal is formed outside the thick-lined eye mask pattern, that is, the eye pattern exceeds the predetermined threshold value. Since the eye pattern opens wide when the transmission characteristic is good, the emission wavelength of the tunable light source 44 may be adjusted so that the eye pattern opens widest. As an adjusting means in this case, control may be performed manually while observing the eye pattern, or alternatively, automatic control by means of computer processing may be employed.

Figure 7:
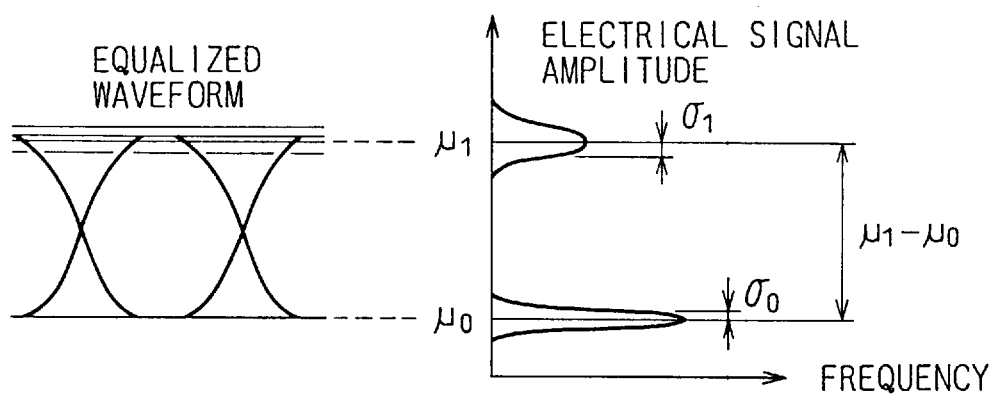
FIG. 7 is a diagram for explaining a Q value.

An alternative way to measuring the bit-error rate is to measure the Q value (electrical SNR). The definition of the Q value is given below in conjunction with FIG. 7.

$$Q = 20 \log_{10}[(\mu_1 - \mu_0)/(\sigma_1 + \sigma_0)]$$

where
$\mu_1$: average level during "emission"
$\mu_0$: average level during "no emission"
$\sigma_1$: standard deviation of level during "emission"
$\sigma_0$: standard deviation of level during "no emission"

The Q value is expressed using the signal level difference (=signal amplitude) between emission and no emission as the numerator and the sum of the standard deviations of noise during emission and during no emission as the denominator. When a Gaussian distribution is assumed for the noise distribution, the bit-error rate given by the Q value defined by the above equation agrees with the minimum value of the actually measured bit-error rate. A Q value measuring system is substantially identical in configuration to the optical receiver; that is, using a discrimination circuit having a reference voltage varying function, the discrimination level of the equalizing waveform is varied up and down with respect to the optimum level to measure the bit-error rate, and by finding the intersection of the two straight lines obtained from the measurement, the minimum point of the bit-error rate is estimated, to obtain the Q value. Other methods, such as measuring the transmitted waveform and using specifications of equal bit-error rate curves, may also be employed.

Figure 8:
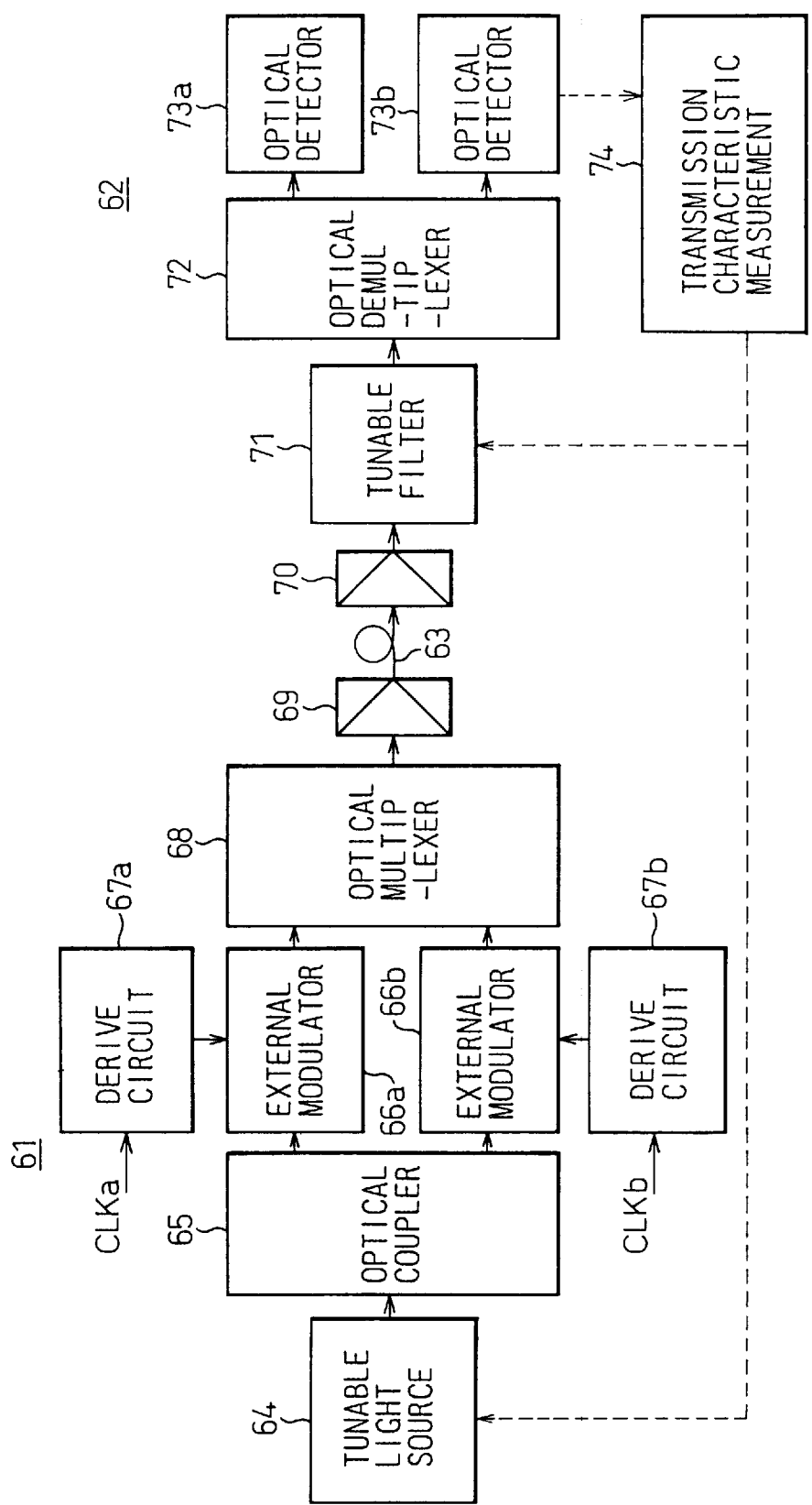
FIG. 8 is a diagram showing another example of the optical transmission system according to the present invention.

FIG. 8 is a block diagram showing another example of the optical signal transmission system according to the present invention. In FIG. 8, reference numeral 61 is an optical transmitter, 62 is an optical receiver, 63 is an optical fiber, 64 is a tunable light source, 65 is an optical coupler, 66a and 66b are external modulators, 67a and 67b are drive circuits, 68 is an optical multiplexer, 69 and 70 are optical amplifiers, 71 is a tunable filter, 72 is an optical coupler, 73a and 73b are optical detectors, and 74 is a transmission characteristic measuring section.

As in the foregoing examples, the tunable light source 64 can be implemented using, for example, a tunable semiconductor laser. The optical coupler 65 splits the output light of the tunable light source 64 into two output signals which are respectively applied to the external modulators 66a and 66b. The optical coupler 65 may be constructed to split the light into three or more output signals to drive the respective external modulators.

Clock signals CLKa and CLKb and transmission information not shown are applied to the drive circuits 67a and 67b which then generate modulation signals synchronized to the clock signals CLKa and CLKb and apply them to the external modulators 66a and 66b for modulation of the two split light signals. The modulated light signals are multiplexed by the optical multiplexer 68 and amplified by the amplifier 69 for transmission through the optical fiber 63. The external modulators 66a and 66b can be constructed, using, for example, Mach-Zehnder optical modulators using $LiNbO_3$ substrates or semiconductor electro-absorption optical modulators.

Multiplexing of the optical signals in the optical multiplexer 68 can be accomplished using various multiplexing means such as bit multiplexing, byte multiplexing, frame multiplexing, etc. Modulation timing in the external modulators 66a and 66b is selected according to such multiplexing means, and control is performed so that the external modulators 66a and 66b output modulated optical signals with different phases which are then multiplexed together in the optical multiplexer 68.

If the optical coupler 65 is constructed, for example, as a Mach-Zehnder optical modulator having two separate output ports, and the output light of the tunable light source 64 is input to the optical modulator for modulation with a 10 GHz clock signal, for example, optical clock signals 180° out of phase with respect to each other are output at 10 GHz from the two respective output ports and applied to the external modulators 66a and 66b, respectively. These optical signals are modulated by the external modulators 66a and 66b with information to be transmitted, and optically multiplexed by the optical multiplexer 68 which outputs a multiplexed optical signal at a transmission rate of 20 Gb/s.

When two separate information signals are transmitted together by time-division multiplexing, it would be possible at the optical receiver 62 to demultiplex them after first converting the multiplexed signal to an electrical signal; in the above example, however, the multiplexed signal is first amplified by the optical amplifier 70, then passed through the tunable filter 71 for elimination of noise and other unwanted light components, and then fed into the optical coupler 72 where the input signal is split into two signals which are then applied to the respective optical detectors 73a and 73b. Using a clock signal from a clock regenerator not shown, two clock signals corresponding to the clock signals CLKa and CLKb used in the optical transmitter 61 are obtained, and using the thus obtained clock signals, the two transmitted information signals are reconstructed from the output signals from the optical detectors 73a and 73b.

A transmission characteristic measuring section 74 may be provided for each of the optical detectors 73a and 73b, but in the above example, one is provided for one of the detectors. When the system is started or while the system is in operation, the transmission characteristic measuring section 74 measures the transmission characteristic, sets the emission wavelength of the tunable light source 64 for the best transmission characteristic, and sets the transmission wavelength characteristic of the tunable filter 71 accordingly. This facilitates high-speed transmission over long distances. The optical amplifier 69, tunable filter 71, etc. may be omitted.

Figure 9:
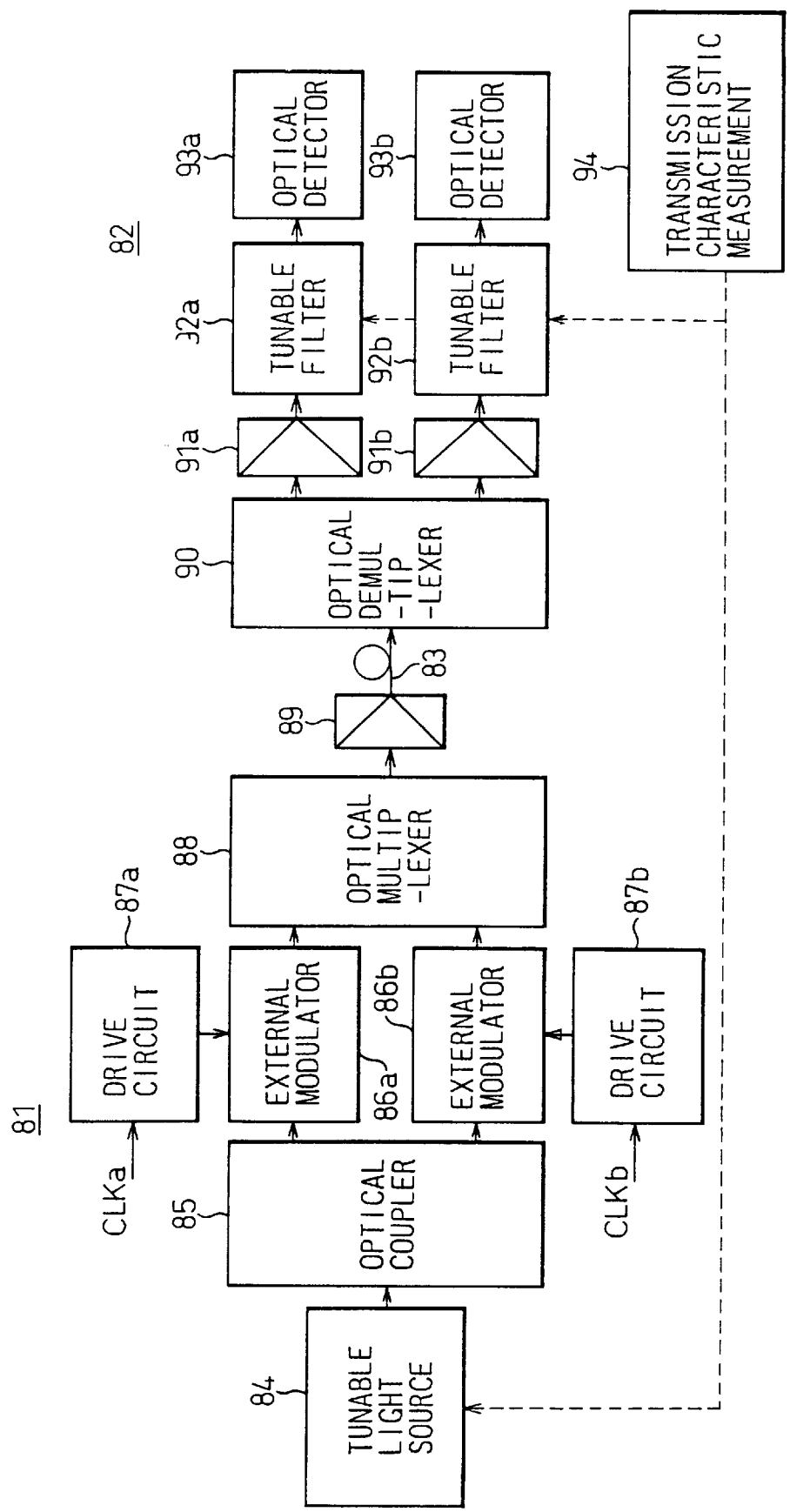
FIG. 9 is a diagram showing another example of the optical transmission system according to the present invention.

FIG. 9 is a block diagram showing another example of the optical transmission system according to the present invention. In FIG. 9, reference numeral 81 is an optical transmitter, 82 is an optical receiver, 83 is an optical fiber, 84 is a tunable light source, 85 is an optical coupler, 86a and 86b are external modulators, 87a and 87b are drive circuits, 88 is an optical multiplexer, 89 is an optical direct amplifier, 90 is an optical coupler, 91a and 91b are optical direct amplifiers, 92a and 92b are tunable filters, 93a and 93b are optical detectors, and 94 is a transmission characteristic measuring section.

The optical transmitter 81 is identical, in both configuration and operation, to the transmitter 61 in the foregoing embodiment. At the optical receiver 82, the optical signal received via the optical fiber 83 is split by the optical coupler 90 into two signals which are then amplified by the respective optical amplifiers 91*a* and 91*b* and applied to the optical detectors 93*a* and 93*b* through the tunable filters 92*a* and 92*b*, respectively. The two transmitted information signals are thus processed by the respective optical detectors 93*a* and 93*b*.

As in the foregoing embodiment, the transmission characteristic measuring section 94 measures the transmission characteristic between the optical transmitter 81 and the optical receiver 82 by using the output signal from one or other of the optical detectors 93*a*, 93*b*, and controls the emission wavelength of the tunable light source 84 for the best transmission characteristic, while controlling the wavelength transmission characteristics of the tunable filters 92*a* and 92*b* accordingly. High-speed transmission is thus made possible by time-division multiplexing of optical signals; furthermore, even though there exists a variation in the zero dispersion wavelength, since the emission wavelength is controlled so as to give the best transmission characteristics, the transmission distance can be extended.

It will be appreciated that the present invention is not limited to the above illustrated examples, but various modifications can be made in the invention. For example, in the embodiments shown in FIGS. 8 and 9, the output light of the tunable light source is divided into two signals, but it would be possible to divide it into a larger number of signals with a corresponding number of external modulators provided so that optical signals modulated with transmitted information from multiple lines would be time-division multiplexed, thereby making transmission at higher speeds possible. Further, the above embodiments have each dealt with an example in which bit multiplexing is used, but it would be possible to use other multiplexing means such as byte multiplexing or frame multiplexing. Furthermore, in the embodiments shown in FIGS. 8 and 9, optical amplifiers may be provided at prescribed intervals of distance along the optical fiber 63, 83 to further extend the transmission distance.

Any of the examples thus far described use a tunable light source and optimize the transmission conditions by controlling the wavelength of the signal light to an optimum value with respect to the transmission line in use. Conversely, it is possible to use a signal light of a fixed wavelength, in which case the transmission conditions are optimized for that fixed wavelength by using a variable dispersion compensator capable of adjusting the amount of wavelength dispersion. Examples of such an optical transmission system will be described below.

Figure 10:
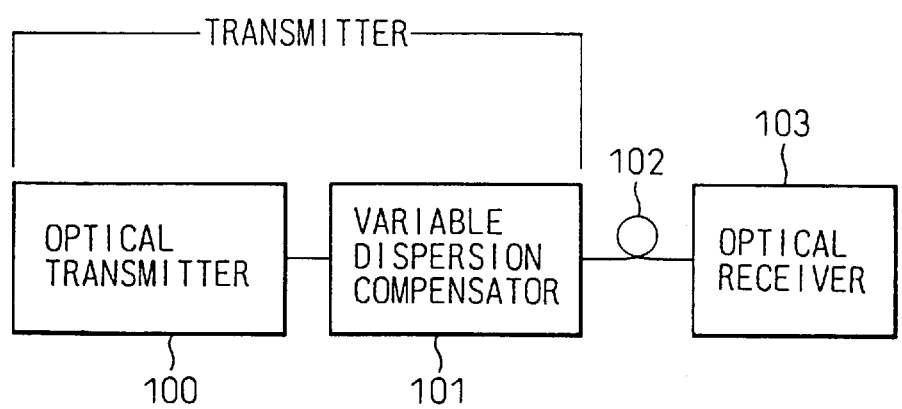
FIG. 10 is a diagram showing an example of the optical transmission system according to the present invention, in which a variable dispersion compensator is installed at transmitting end.
Figure 11:
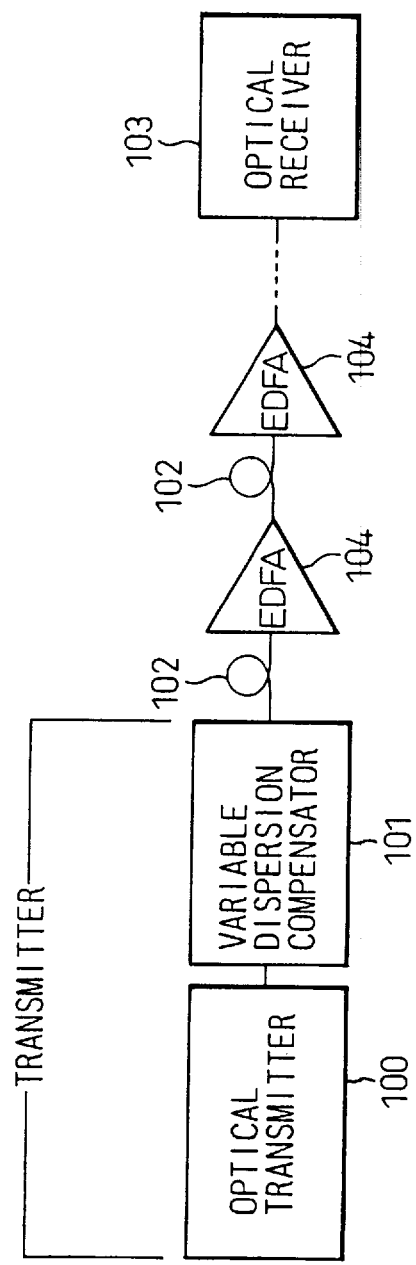
FIG. 11 is a diagram showing another example of the optical transmission system according to the present invention.
Figure 12:
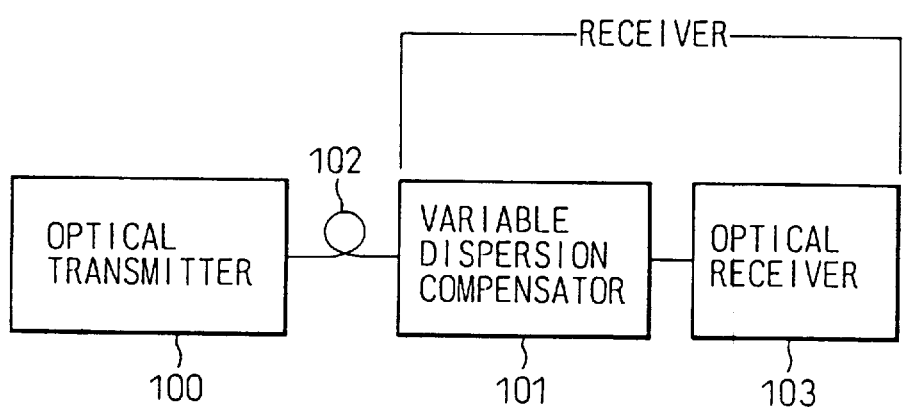
FIG. 12 is a diagram showing an example of the optical transmission system according to the present invention, in which a variable dispersion compensator is installed at receiving end.
Figure 13:
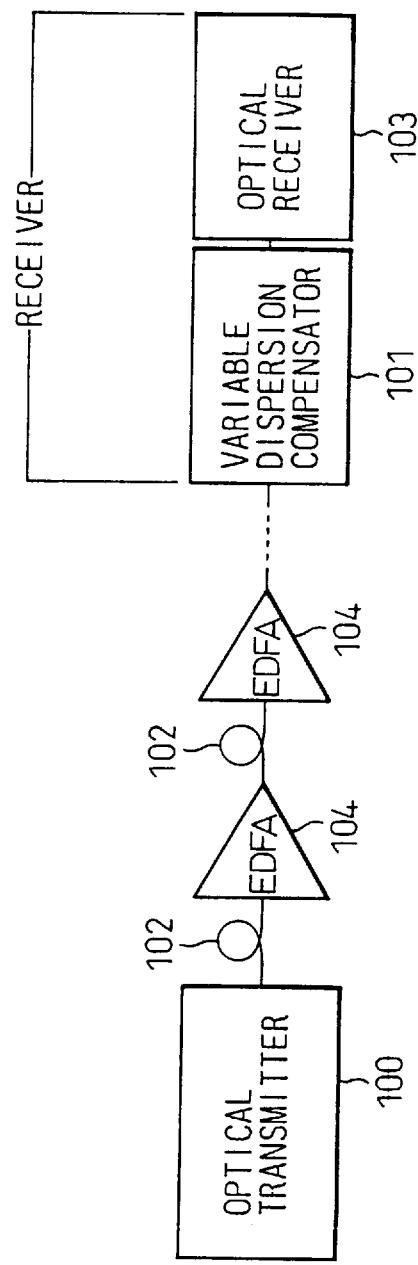
FIG. 13 is a diagram showing another example of the optical transmission system according to the present invention.

In the examples shown in FIGS. 10 and 11, the variable dispersion compensator is provided at the transmitting end, while in the examples shown in FIGS. 12 and 13, it is provided at the receiving end. FIGS. 10 and 12 each shown an example of a repeaterless transmission system, and FIGS. 11 and 13 each shown an example of a multiple optical amplifier repeated system. In the figures, reference numeral 100 is an optical transmitter, 101 is a variable dispersion compensator capable of varying the amount of dispersion, 102 is a transmission line, 103 is an optical receiver, and 104 is a repeater amplifier. In the description below, the same reference numerals indicate the same constituent parts.

The variable dispersion compensator 101 used here can be constructed from a Mach-Zehnder interferometer-type dispersion compensator using a planar lightwave circuit (PLC) (for example, Takiguchi et al., "Dispersion Compensation Experiments Using PLC-type Light Dispersion Equalizer," C-337, Institute of Electronics, Information and Communication Engineers, Spring Convention, 1994), or an optical resonator-type dispersion compensator (for example, Fukashiro et al., "Study on a Dispersion Compensation Method Using an Optical Resonator," B-935, Institute of Electronics, Information and Communication Engineers, Autumn Convention, 1994).

Figure 14:
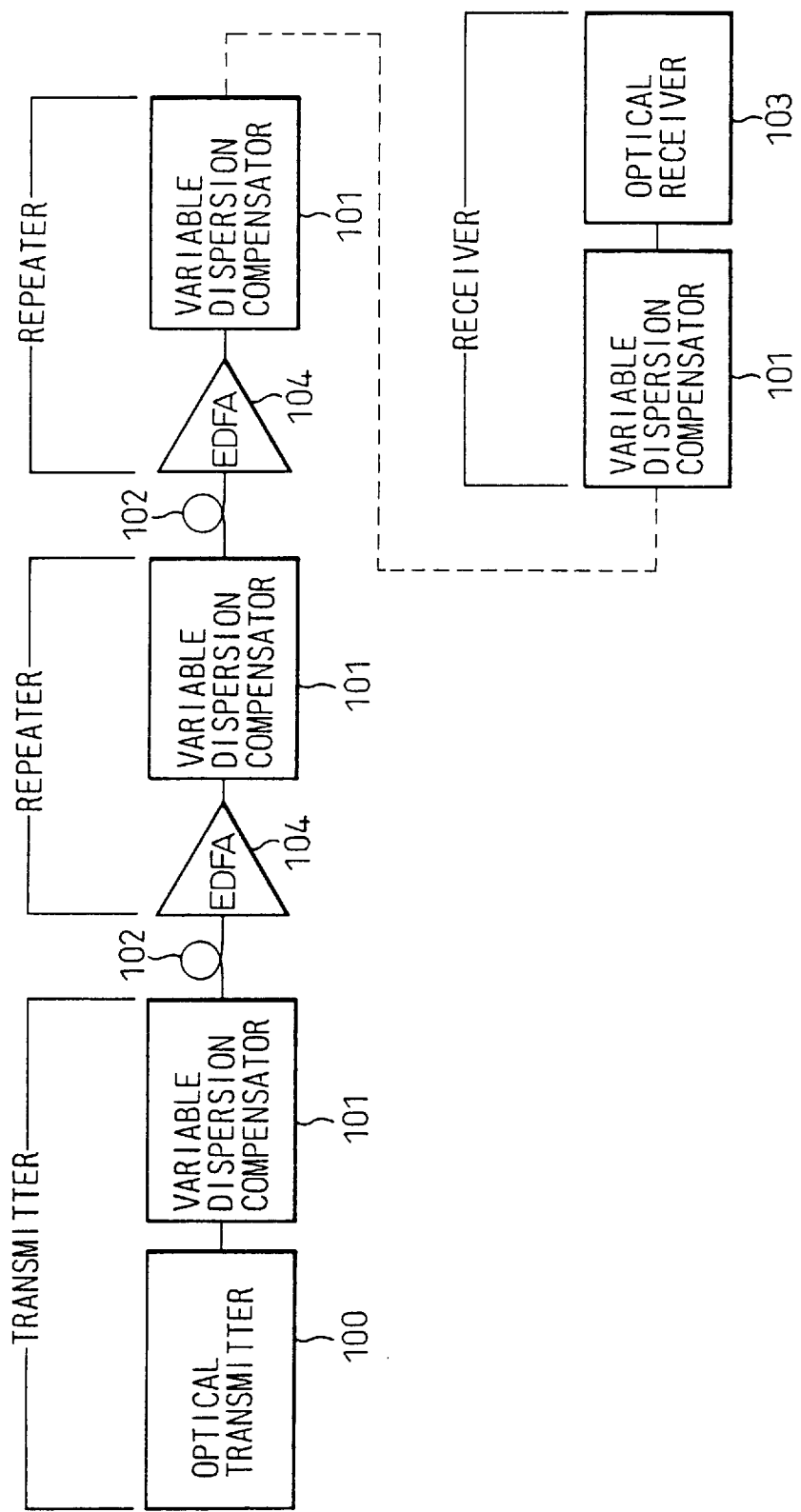
FIG. 14 is a diagram showing an example of the optical transmission system according to the present invention, in which a variable dispersion compensator is also installed at repeater.

FIG. 14 shows an example of a multiple optical amplifier repeated system in which a variable dispersion compensator is also provided in each repeater. The invention, however, is not limited to the configuration shown in the example of FIG. 14 where both the transmitter and receiver as well as all the repeaters are provided with variable dispersion compensators, but various other configurations are possible, for example, a configuration where only the repeaters are provided with variable dispersion compensators, a configuration where the transmitter and the repeaters are provided with variable dispersion compensators, a configuration where the repeaters and the receiver are provided with variable dispersion compensators. Furthermore, in the case where the repeaters are provided with the variable dispersion compensators, only some of the repeaters may be provided with them.

As for the dispersion compensation techniques used in the examples of FIGS. 10 to 14, though various dispersion compensators and dispersion compensation methods using them have already been proposed and implemented for land systems, undersea systems, repeaterless systems, and multiple repeater systems, the point of the present invention is that using a variable dispersion compensator capable of varying the amount of dispersion, the amount of dispersion compensation is optimized at a value that maximizes the transmission characteristic for each repeater section.

For optimization, when the zero dispersion wavelength of the transmission line, including the variation along the longitudinal direction, is known, the optimum dispersion compensation amount can be determined through simulation, and this amount is set in the variable dispersion compensator 101.

Figure 15:
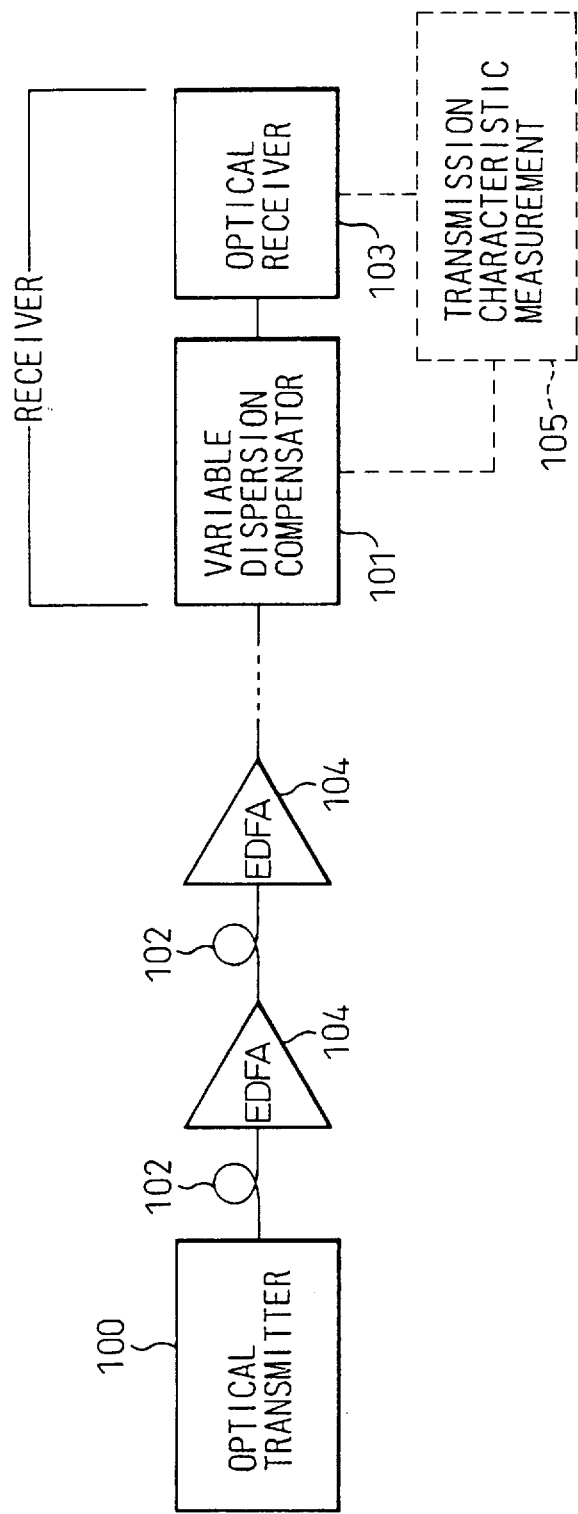
FIG. 15 is a diagram showing an example of the optical transmission system according to the present invention, further including a transmission characteristic measuring section.

FIG. 15 shows another example. In this example, sweeping the dispersion compensation amount is performed while measuring the transmission characteristic at the receiving end, and the variable dispersion compensator is set to a value at which a good transmission characteristic is obtained. In this example, since the variable dispersion compensator 101 is provided at the receiver, the transmission characteristic is measured at the receiving end while sweeping the dispersion compensation amount, and the optimum dispersion compensation amount is set accordingly. The same method of measurement as used in the previously described transmission characteristic measuring section 53, 74, or 94 may be used in the transmission characteristic measuring section 105 for measurement of the transmission characteristic.

Figure 16:
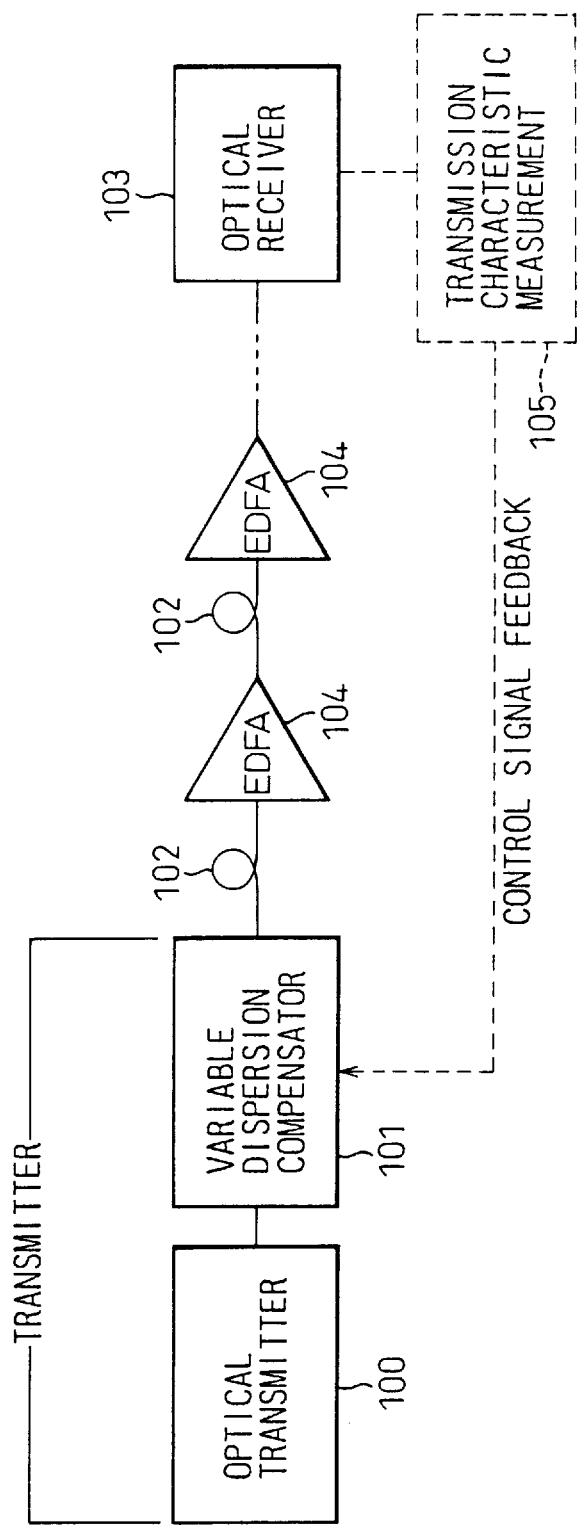
FIG. 16 is a diagram showing another example of the optical transmission system according to the present invention.
Figure 17:
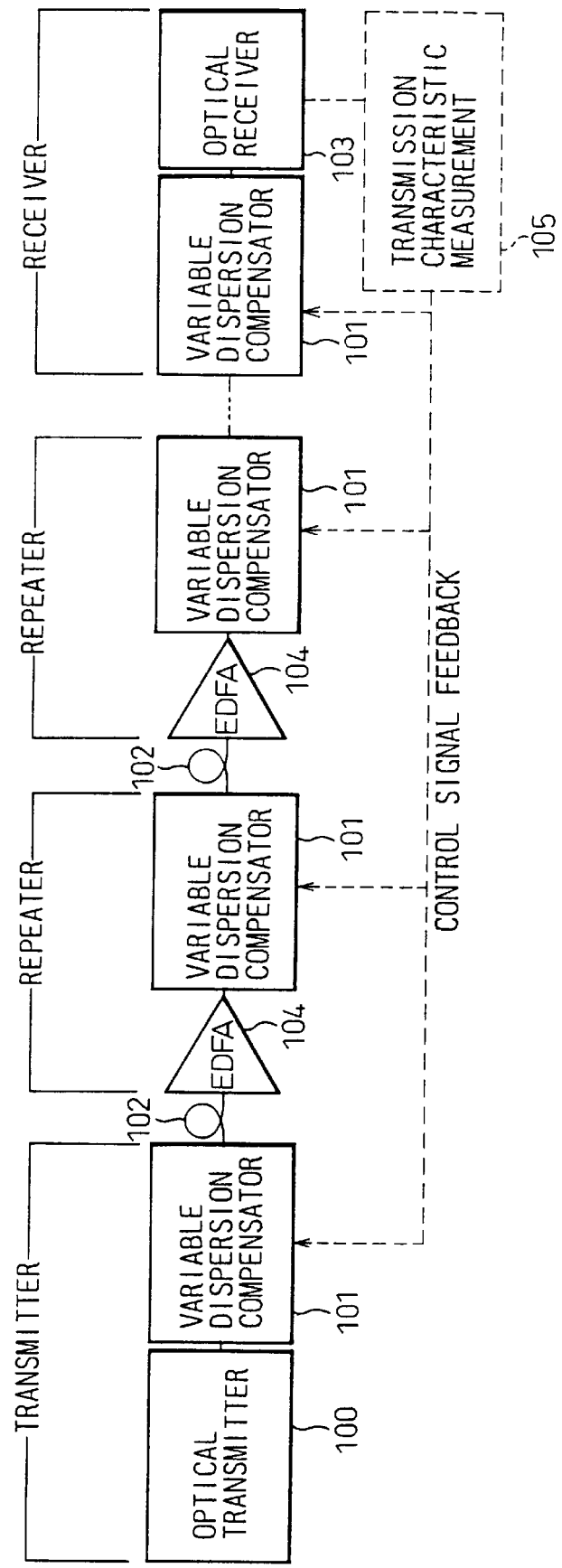
FIG. 17 is a diagram showing another example of the optical transmission system according to the present invention.

FIGS. 16 and 17 show a still further example. In the optical transmission system of this example, a control signal is fed back to the transmitter or to the repeaters on the basis of the transmission characteristic measured at the receiver, to optimize the dispersion compensation amount that is set in the variable dispersion compensator 101 installed therein. FIG. 16 shows a configuration where the variable dispersion compensator is installed only in the transmitter. In this configuration, the transmission characteristic is measured at the receiving end while the dispersion compensation amount is being swept at the transmitting end, and the resulting information is fed back so that the optimum dispersion compensation amount can be set. FIG. 17 shows a configuration where the variable dispersion compensator is installed in the transmitter, the receiver, and in every repeater. In a system where a plurality of dispersion compensators are installed, all the compensators need not necessarily be of dispersion variable type but some may be constructed from fixed-type dispersion compensators. A fixed-type dispersion compensator can be implemented using a dispersion compensating fiber (DCF).

The dispersion compensation amount can be controlled by the variable dispersion compensator while monitoring the transmission characteristic not only when the system is started up but also while the system is in operation. In this way, proper control can be performed independently of the variation of the wavelength of the light source LD and the variation of the zero dispersion wavelength of the transmission line due to temperature changes and aging.

This process may be performed manually or may be automatically performed by the CPU. Furthermore, a separate CPU may be provided for each of the regenerative repeater sections between the optical transmitter and receiver for independent control, or alternatively, control may be performed centrally by a single CPU while adjusting the relationships among the plurality of regenerative repeater sections.

Figure 18:
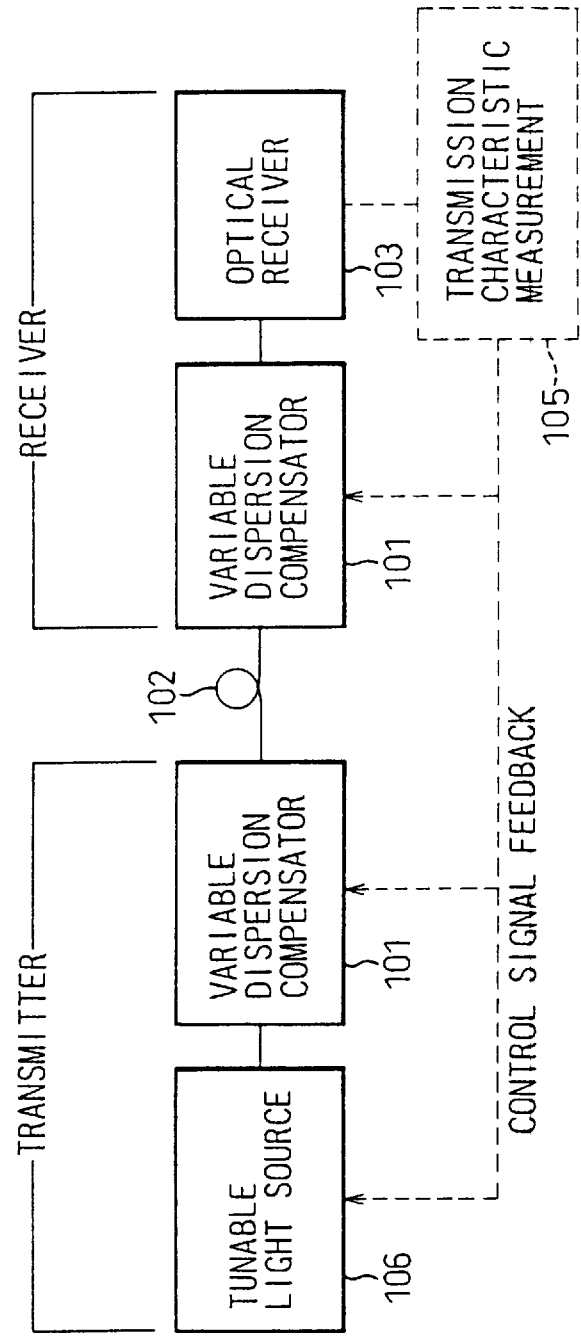
FIG. 18 is a diagram showing another example of the optical transmission system according to the present invention.
Figure 19:
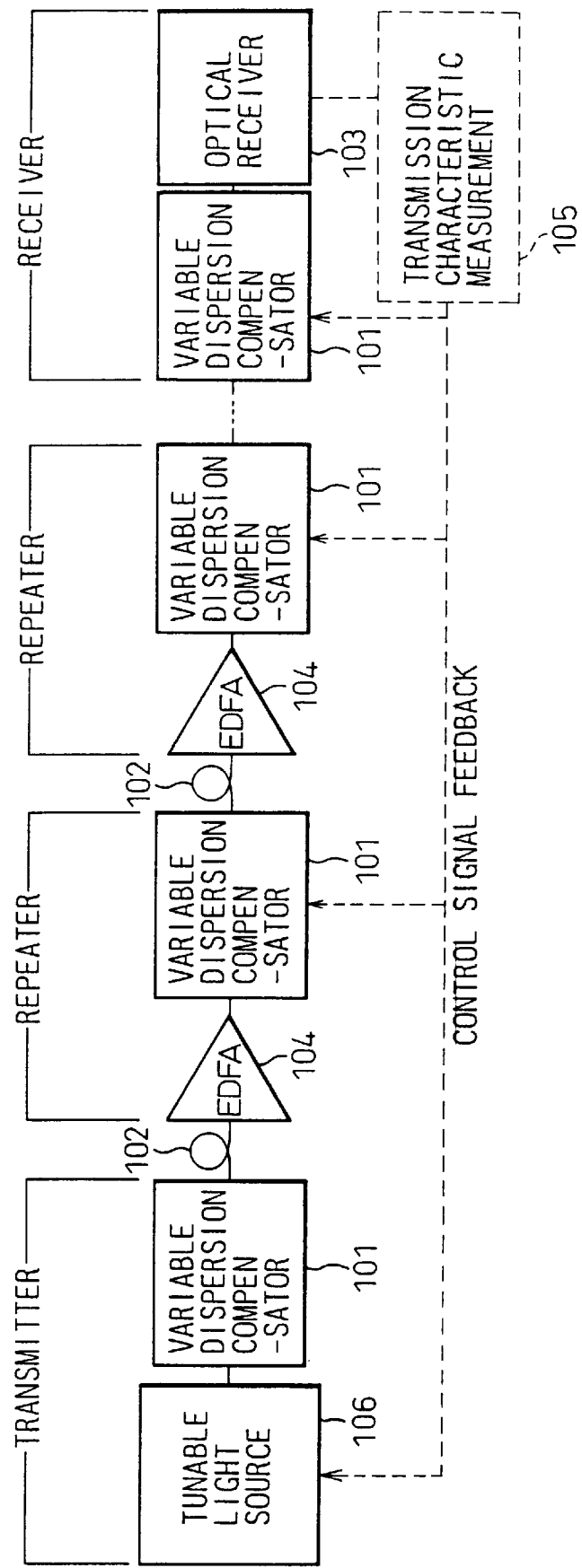
FIG. 19 is a diagram showing another example of the optical transmission system according to the present invention.

FIGS. 18 and 19 show a yet further example. In this example, the variable dispersion compensator is used in conjunction with a tunable light source 106. FIG. 18 shows a configuration for repeaterless transmission system, and FIG. 19 a configuration for an optical amplification multiple repeater transmission system. The invention, however, is not limited to the illustrated configuration where the variable dispersion compensator is installed in the transmitter, the receiver, and in every repeater, but various combinations are possible as mentioned with reference to FIG. 14.

In this optical transmission system, the variable dispersion compensator is used in conjunction with the tunable light source 106 in the transmitter, and while measuring the transmission characteristic at the receiver, the transmission wavelength is swept and set to a value at which good transmission characteristic is obtained, or based on the transmission characteristic measured at the receiver, a control signal is fed back to the transmitter so that the wavelength of the tunable light source 106 is set to the optimum value.

As previously described, when transmission (both repeaterless transmission and multiple repeater transmission) is performed at a relatively high optical power level using an optical amplifier, if the wavelength of signal light is set near the zero dispersion wavelength of the optical-fiber transmission line and in an abnormal (positive) dispersion region, modulation instability occurs due to a four-wave mixing (FWM) phenomenon that occurs between the signal light and the amplified spontaneous emission (ASE). As a result, the ASE is amplified and the S/N ratio of the signal light degrades. It is known that this can be effectively avoided by setting the signal light wavelength within the normal (negative) dispersion region or by applying positive dispersion at the receiver or at the repeater. That is, dispersion compensation is performed by setting the wavelength of the tunable light source to a value that makes the dispersion value negative with respect to the transmission line and that can suppress FWM, while at the same time, setting the dispersion amount of the dispersion compensator to a positive value. Alternatively, dispersion compensation may be performed by setting the wavelength of the tunable light source to a value that makes the dispersion value positive with respect to the transmission line and that can suppress FWM, while at the same time, setting the dispersion amount of the dispersion compensator to a negative value. The setting of the transmission wavelength may be done automatically. Also, the setting of the transmitting wavelength may be done when the system is started up, or while the system is in operation.

If there is a spare line whose dispersion condition and installation environment are approximately equal to those of the operating line, it will be possible to first optimize the dispersion compensation amount and transmission wavelength on the spare lone and then apply the optimization to the operating line by reference to them. This enables the optimization of the respective quantities to be done without affecting the service speed.

Parameters for controlling the conditions of the transmission line may also include the prechirping amount and the optical power to be input to the fiber in addition to the signal light wavelength (FIGS. 1, 3, 4, 8, 9, 18, 19) and dispersion compensation amount (FIGS. 10 to 19) already described.

Figure 20:
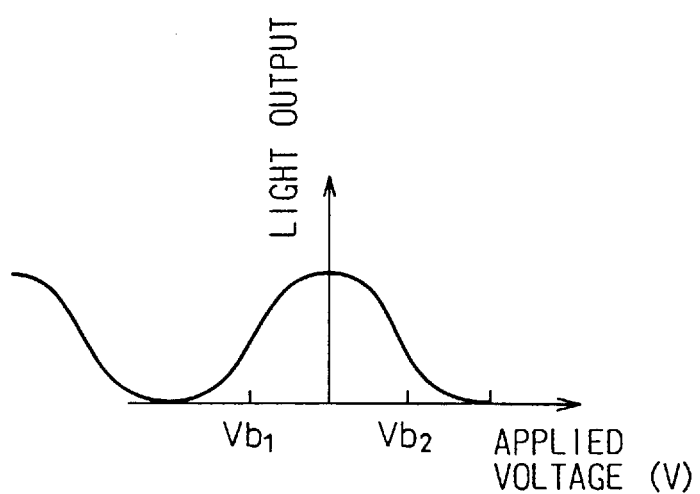
FIG. 20 is a diagram showing a characteristic of a Mach-Zehnder optical modulator.
Figure 21:
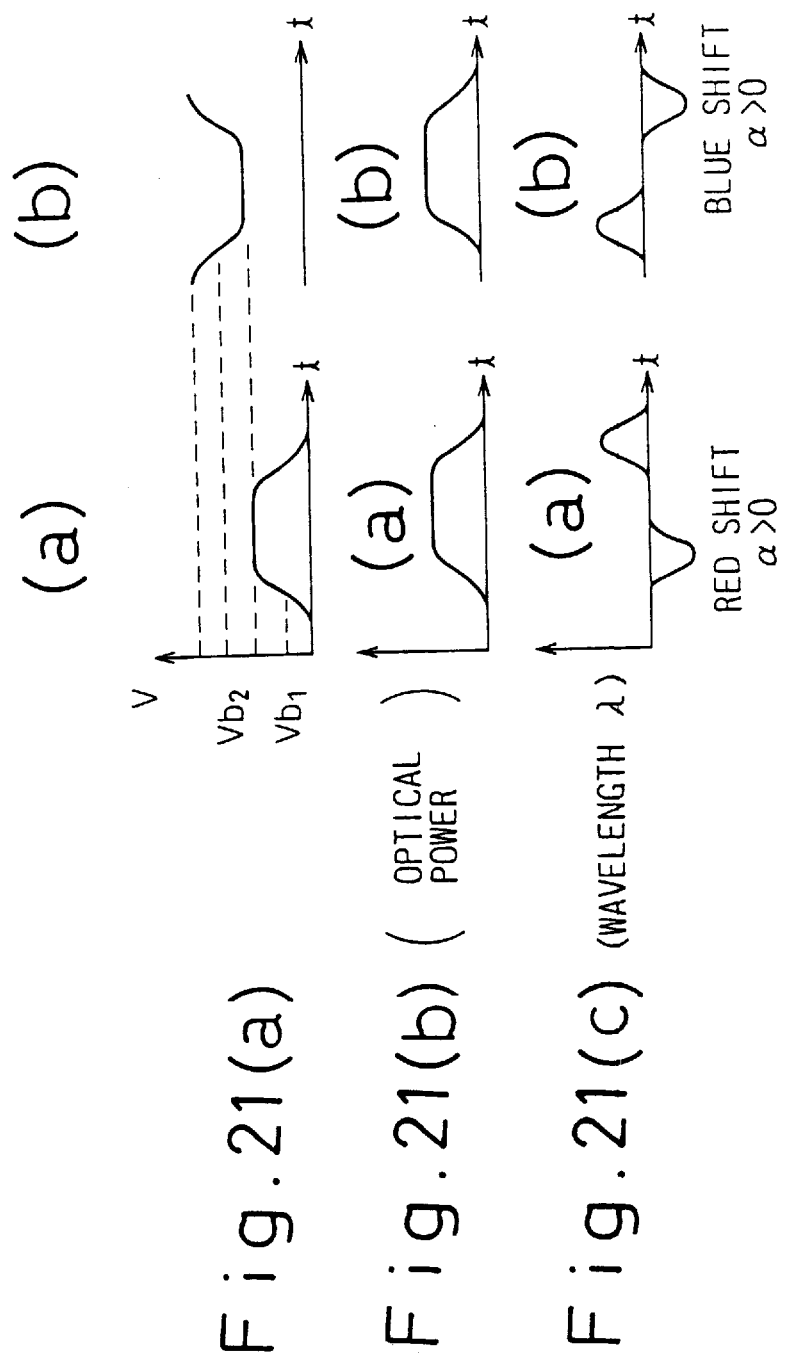
FIG. 21 is a diagram for explaining red shift and blue shift in the Mach-Zehnder optical modulator.
Figure 22:
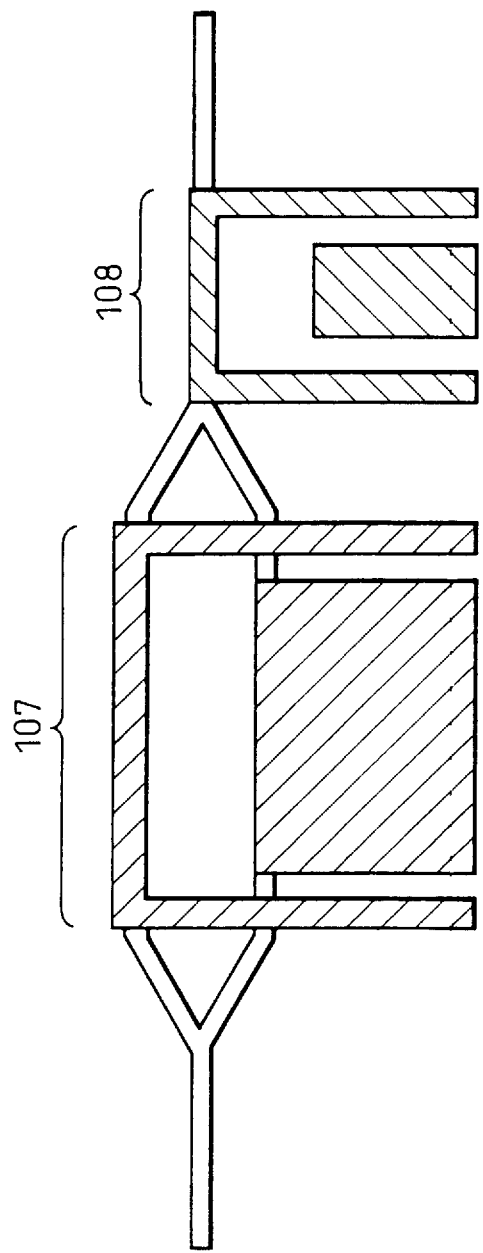
FIG. 22 is a diagram showing a Mach-Zehnder optical modulator in which an intensity modulator and a phase modulator are connected in tandem to control the amount of pre-chirping.

Prechirping is a technique for controlling the change of the transmitted waveform due to wavelength dispersion and nonlinear effects by preproviding a wavelength (frequency) distribution within one pulse of the transmission wavelength, and various methods have been proposed for implementation. When a Mach-Zehnder optical modulator is used as an external modulator, the relationship between applied voltage and optical power will be represented by a sine curve as shown in FIG. 20. When a voltage near Vb1 is selected and applied as a positive pulse, such as shown in part (1)(a) of FIG. 21, a positive light pulse in phase with the applied voltage is output, as shown in part (2)(a) of FIG. 21. At this time, the light wavelength shifts to the shorter value in the rising portion of the light pulse, and to the longer value in the falling portion, as shown in part (3)(a) of FIG. 21. That is, within the duration of one light pulse, the wavelength shifts with time from the shorter wavelength (blue) to the longer wavelength (red). This phenomenon is called a red shift. On the other hand, when a voltage near Vb2 is selected and applied as a negative pulse, such as shown in part (1)(b) of FIG. 21, a positive pulse 180° out of phase with the applied voltage is output, as shown in part (2)(b) of FIG. 21. At this time, the light wavelength shifts to the longer value in the rising portion of the light pulse, and to the shorter value in the falling portion, as shown in part (3)(b0 of FIG. 21. That is, within the duration of one light pulse, the wavelength shifts with time from the longer wavelength (red) to the shorter wavelength (blue). This phenomenon is called a blue shift. When a parameter defining the chirping amount is denoted by $\alpha$, then $\alpha>0$ for the red shift and $\alpha<0$ for the blue shift. When the wavelength of the signal light is shorter than the zero dispersion wavelength and the transmission condition of the optical fiber is within the region of the normal dispersion (D<0), light at longer wavelength travels through the optical fiber faster than light at shorter wavelength; therefore, if a pre-chirping of $\alpha>0$ (red shift) is given in advance, this has the effect of compressing the pulse waveform, and suppresses waveform degradation. Conversely, when the transmission condition is within the region of the abnormal dispersion (D>0), light at shorter wavelength travels faster, so that a prechirping of $\alpha<0$ (blue shift) will serve to suppress waveform degradation. Further, by adjusting the value of $\alpha$ according to the condition of the transmission line, the overall transmission condition of the optical system can be optimized. In a Mach-Zehnder optical modulator, the sign of $\alpha$ can be changed between positive and negative depending on which operating point, Vb1 or Vb2, is used. When a Mach-Zehnder optical modulator is used that consists of a intensity modulator 107 and a phase modulator 108 connected in tandem as shown in FIG. 22, the prechirping amount α can be varied continuously by varying the voltage being applied to the phase modulator 108. In the illustrated example, the intensity modulator and the phase modulator are integrated as a single device, but these may be constructed as separate devices that are connected together.

As for the input optical power to the fiber, by varying the transmitter optical power and the repeater optical output power, the waveform change due to the interaction between self-phase modulation and chromatic dispersion in the transmission line can be regulated. In the case of WDM transmission, the amount of crosstalk (described later) due to FWM can also be changed by varying the optical power. Varying the optical power can be easily accomplished by controlling the optical output powers of the transmitting light source and of the optical amplifiers (optical post-amplifier and in-line optical amplifier).

Control of the prechirping amount and/or control of the optical power can be performed in place of or in conjunction with control of the signal light wavelength and/or control of the dispersion compensation amount, in the examples previously shown in FIGS. 1, 3, 4, 8 to 19.

In the examples thus far described, the transmission characteristic is measured periodically or continuously, and the control parameters, such as the signal light wavelength, etc., are adjusted in such a manner as to compensate for the change of the zero dispersion wavelength $\lambda_0$ in the transmission line. One of factors that change the zero dispersion wavelength $\lambda_0$ is a temperature change in the transmission line. Regarding the temperature change, the transmission conditions can also be optimized by estimating the amount of shift of the zero dispersion wavelength by evaluating the temperature of the transmission line, and by correcting the control parameters based on the estimated shift amount.

Figure 23:
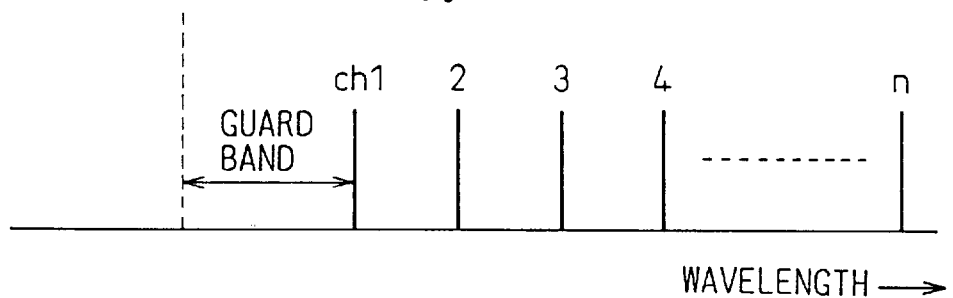
FIG. 23 is a diagram showing an example of signal light wavelength spacing in wavelength multiplexing.

Further, in an optical amplification multiple repeater WDM system using a wavelength band near the zero dispersion wavelength of the optical fiber, crosstalk caused by four-wave mixing between signal lights becomes a factor that can degrade the transmission characteristic. To avoid this crosstalk, the signal wavelength band must be spaced far away from the zero dispersion wavelength of the transmission line, contrary to the case of one-wave transmission. An example of the spacing of signal light wavelengths is shown in FIG. 23. In this case also, it is important to assess the variation of $\lambda_0$ along the longitudinal direction of the actual optical-fiber transmission line.

Figure 24:
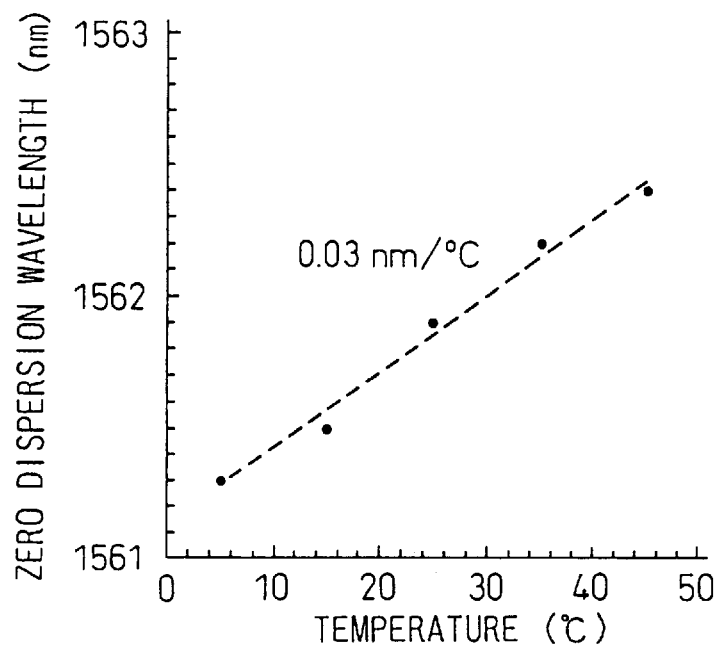
FIG. 24 is a diagram showing the temperature dependence of zero dispersion wavelength $\lambda_0$.

FIG. 24 shows the temperature dependence of $\lambda_0$ actually measured.

Source: II. Onaka et al., "Measuring the Longitudinal Distribution of Four-Wave Mixing Efficiency in Dispersion-Shifted Fibers," IEEE Photonics Technology Letters, Vol. 6, No. 12, 1994.

In this example, for a DSF of 1.1 km length, $\lambda_0$ is obtained from the occurrence efficiency of four-wave mixing (FWM). Here, a change of 2.4 nm (rate of change: 0.03 nm/°C.) is shown over a temperature range of −20° to +60° C. Since the dispersion slope of the DSF used here is 0.07 ps/nm²/km, the wavelength dispersion value changes at a rate of 0.168 ps/nm/km. At transmission speeds 10 Gb/s or over, this change may have to be taken into consideration in system design together with the variation along the longitudinal direction.

Figure 25:
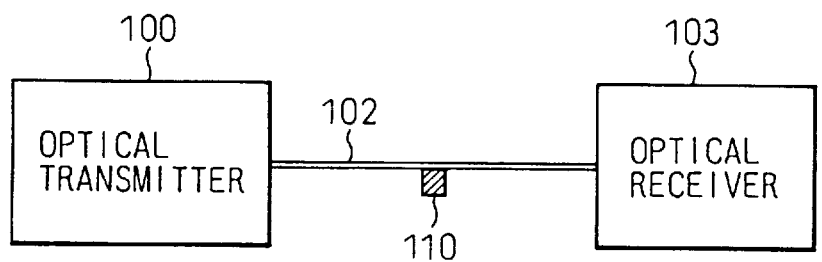
FIG. 25 is a diagram showing an example of temperature evaluation for an optical fiber.
Figure 26:
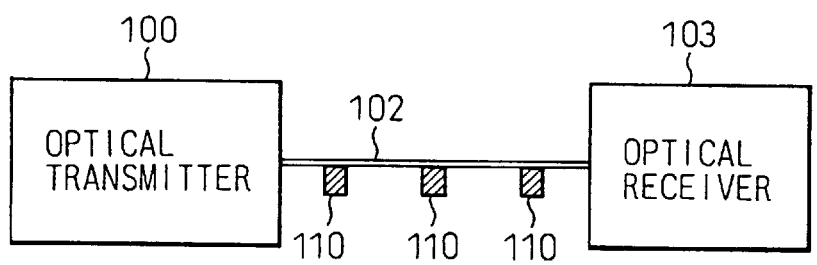
FIG. 26 is a diagram showing another example of temperature evaluation for an optical fiber.
Figure 27:
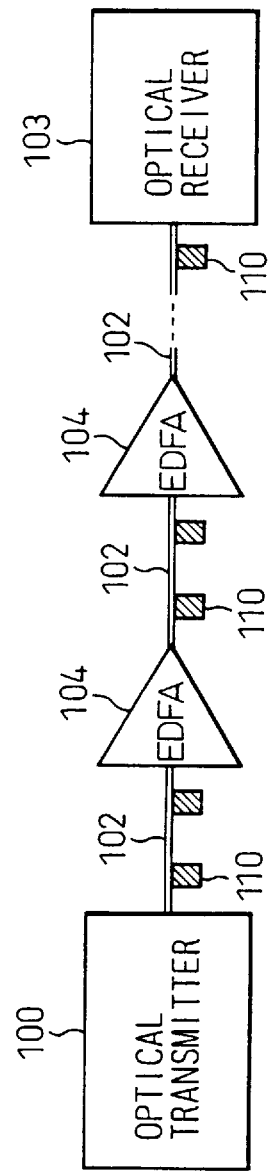
FIG. 27 is a diagram showing another example of temperature evaluation for an optical fiber.

Temperature is evaluated at an appropriate point 110 on the optical-fiber transmission line 102 installed between the optical transmitter 100 and the optical receiver 103, as shown in FIG. 25, or at multiple points as shown in FIG. 26. When temperature is evaluated at multiple points, the distribution of shift amounts of the zero dispersion wavelength can be obtained. In the case of an optical amplification repeater transmission system, temperature is evaluated at one point or at multiple points on every repeater section 102 or on some of the repeater sections.

Temperature evaluation can be accomplished by directly measuring the temperature of the fiber-optic cable of the transmission line using a suitable temperature sensor, or the temperature of the fiber-optic cable can be estimated by measuring the tube temperature, or in the case of an underground optical-fiber cable, by measuring the temperature of the earth surface under which the cable is buried, or in the case of an undersea cable, by measuring the water temperature. Furthermore, the cable temperature can be estimated from the ambient temperature at an end station or at a repeater, or from the temperature of the earth surface. A continuous temperature distribution can be measured by laying an optical fiber for temperature measurement along the fiber-optic cable and by using OTDR (Optical Time Domain Refflectometry) in order to measure Raman scattered light.

From the temperature evaluation value thus obtained, the amount of variation of $\lambda_0$ is computed and based on which, control parameters such as signal light wavelength are corrected. It is also possible to create calendars for average seasonal and day-to-night variations from the past temperature evaluation results and change the control parameters using such calendars (or data may be preprogrammed).

Figure 28:
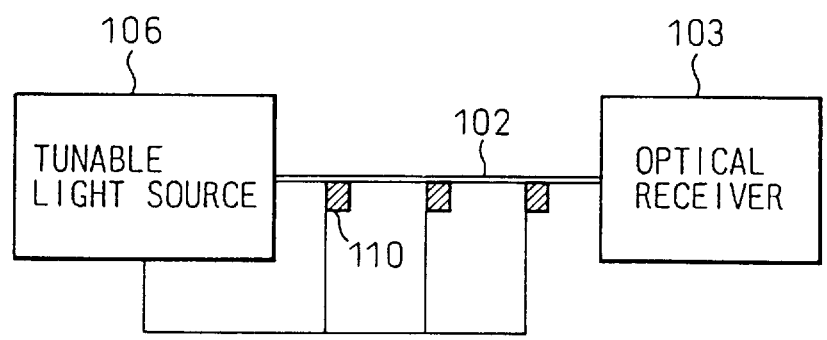
FIG. 28 is a diagram showing an example of an optical transmission system in which the signal light wavelength is changed on the basis of temperature evaluation.
Figure 29:
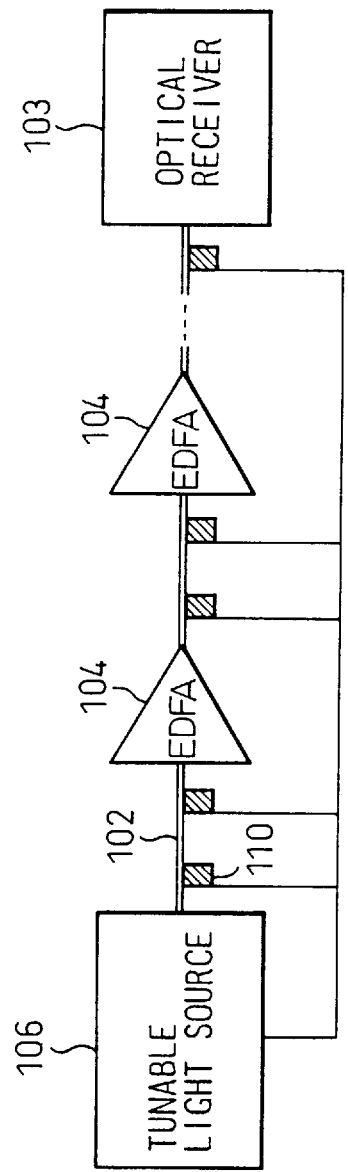
FIG. 29 is a diagram showing another example of the optical transmission system according to the present invention.
Figure 30:
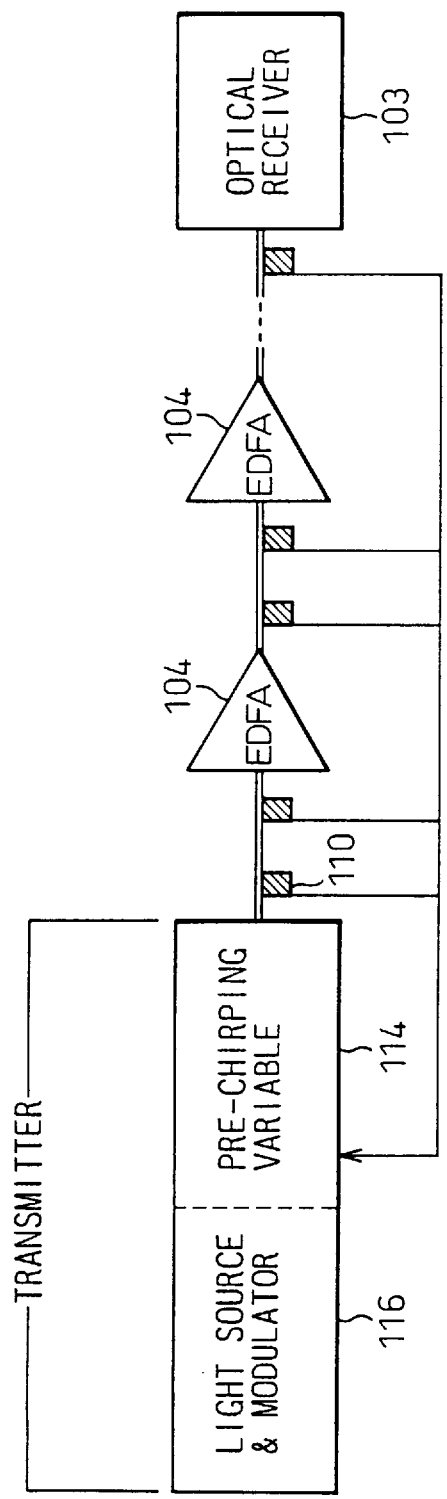
FIG. 30 is a diagram showing an example of an optical transmission system in which the amount of prechirping is changed on the basis of temperature evaluation.

FIGS. 28 and 29 are concerned with an example in which signal light wavelength is corrected for each regenerative repeater section for optimum transmission conditions by controlling the tunable light source 106 based on the temperature evaluation value. FIG. 28 shows an example of a repeaterless transmission system, and FIG. 29 an example of an optical amplification repeater transmission system. FIG. 30 is concerned with an example where the prechirping amount α is corrected based on the temperature evaluation value.

Figure 31:
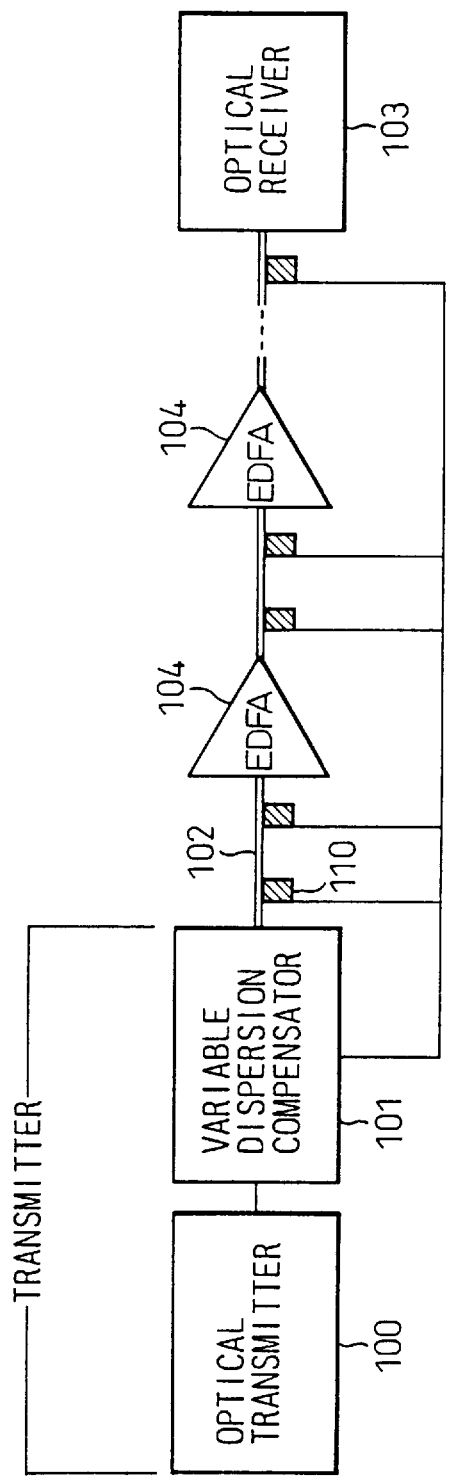
FIG. 31 is a diagram showing an example of an optical transmission system in which the amount of dispersion compensation is changed on the basis of temperature evaluation.
Figure 32:
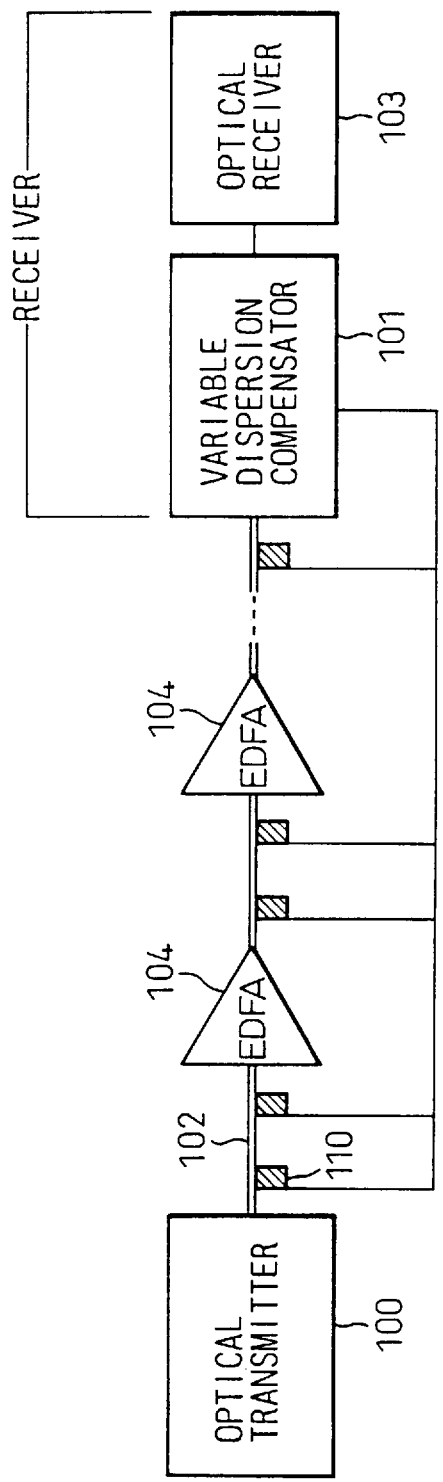
FIG. 32 is a diagram showing an example of an optical transmission system in which a variable dispersion compensator is installed at a receiving end.
Figure 33:
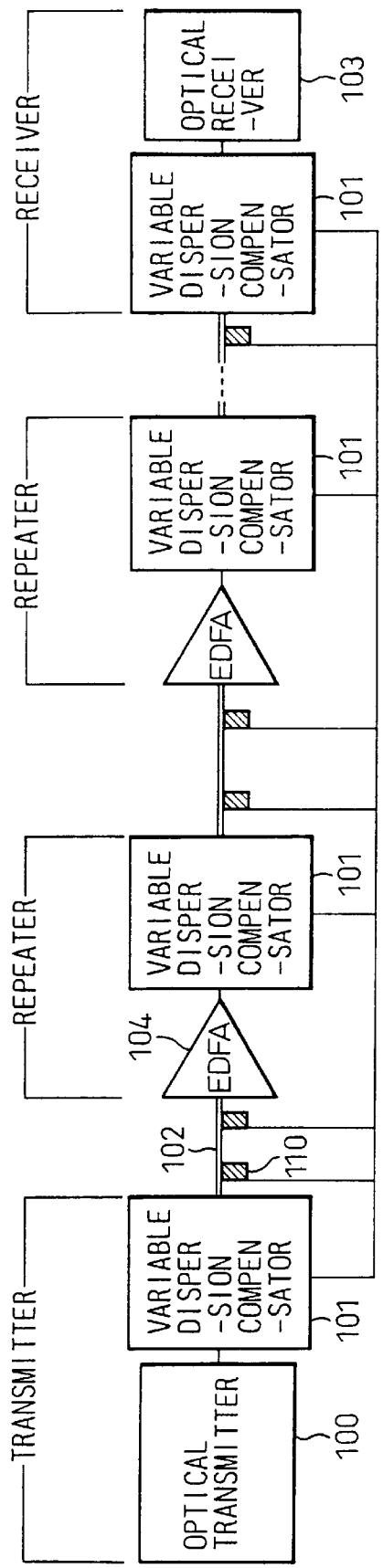
FIG. 33 is a diagram showing an example of an optical transmission system in which variable dispersion compensators are installed at both a transmitter and a receiver and also at a repeater.

FIGS. 31 to 33 are concerned with an example where the dispersion compensation amount is corrected. An optical amplification repeater transmission system is shown here, but it will be recognized that the example is also applicable to a repeaterless transmission system. FIG. 31 shows a configuration where the variable dispersion compensator 101 is installed in the transmitter, FIG. 32 concerns a configuration where the variable dispersion compensator 101 is installed in the receiver, and FIG. 33 illustrates a configuration where the variable dispersion compensator 101 is installed in both the transmitter and receiver, and also in every repeater.

Figure 34:
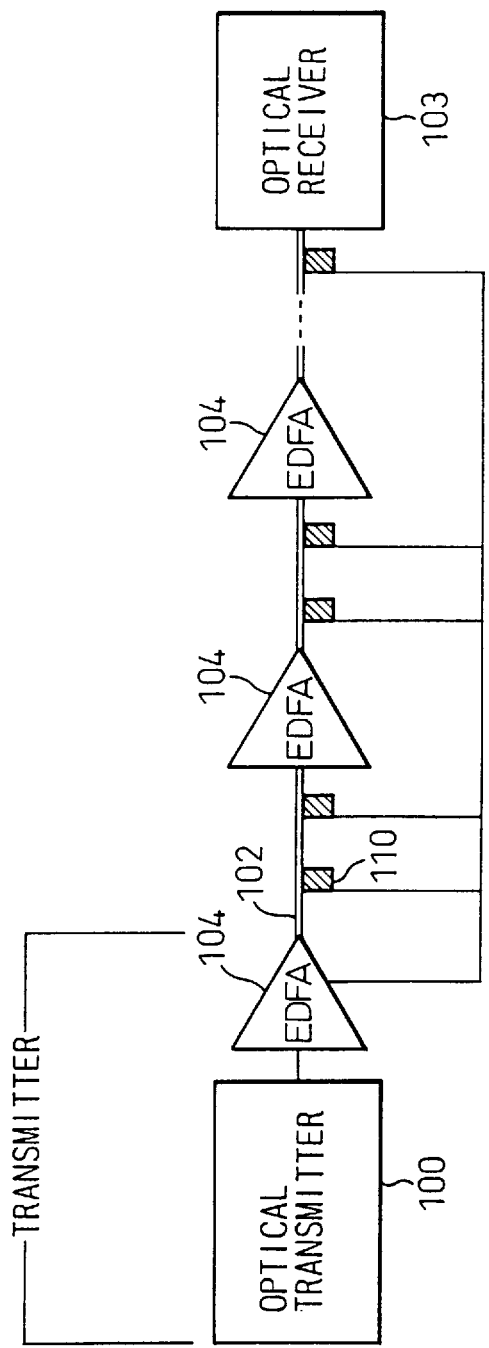
FIG. 34 is a diagram showing an example of an optical transmission system in which the degree of amplification in an optical amplifier is changed on the basis of temperature evaluation.
Figure 35:
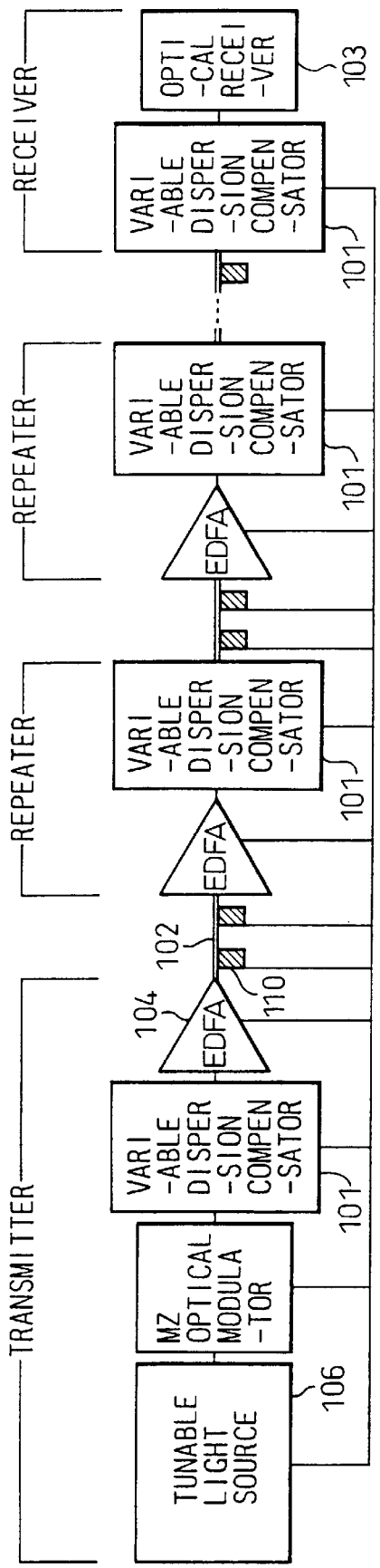
FIG. 35 is a diagram showing an example of an optical transmission system in which the signal light wavelength, the amount of prechirping, the amount of dispersion compensation, and the degree of amplification are changed on the basis of temperature evaluation.

FIG. 34 is concerned with an example in which the waveform degradation due to the SPM-GVD effect is suppressed by correcting transmitter power and repeater optical output power based on the temperature evaluation value. Instead of controlling the amplifier, the light source may be controlled. FIG. 35 is concerned with an example where signal light wavelength, prechirping amount, dispersion compensation amount, and optical power are corrected.

The processing for these corrections may be performed manually or may be automatically performed by the CPU. Furthermore, a separate CPU may be provided for each of the regenerative repeater sections between the optical transmitter and receiver for independent control, or alternatively, control may be performed centrally by a single CPU while adjusting the relationships among the plurality of regenerative repeater sections.

It is believed that the SPM effect is caused by abrupt changes in fiber refractive index due to abrupt changes in light intensity. Therefore, by transmitting optical pulses with the rise time and fall time forcefully stretched and thereby smoothing the variation of optical signal strength, the waveform degradation due to the SPM effect can be reduced. In this case, rather than causing only the light intensity to vary smoothly and stretching the rising/falling transition times, it would be preferable to stretch the transition times by deliberately causing wavelength dispersion, since it would then be possible to compensate for it by dispersion compensation or other means in a later stage. Deliberate wavelength dispersion can be caused either by intentionally shifting the signal light wavelength from the zero dispersion wavelength $\lambda_0$ and thereby causing dispersion by GVD, or by inserting a dispersion compensator in the transmitter.

Figure 36:
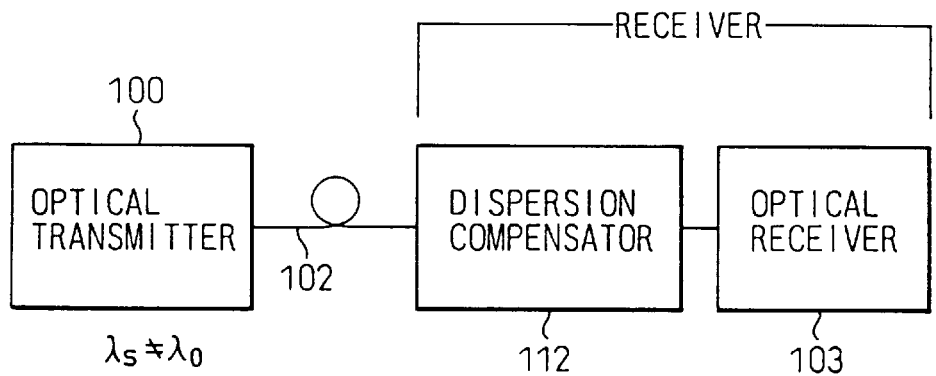
FIG. 36 is a diagram showing an example of an optical transmission system in which a nonlinear effect is reduced by installing a dispersion compensator at receiving end.
Figure 37:
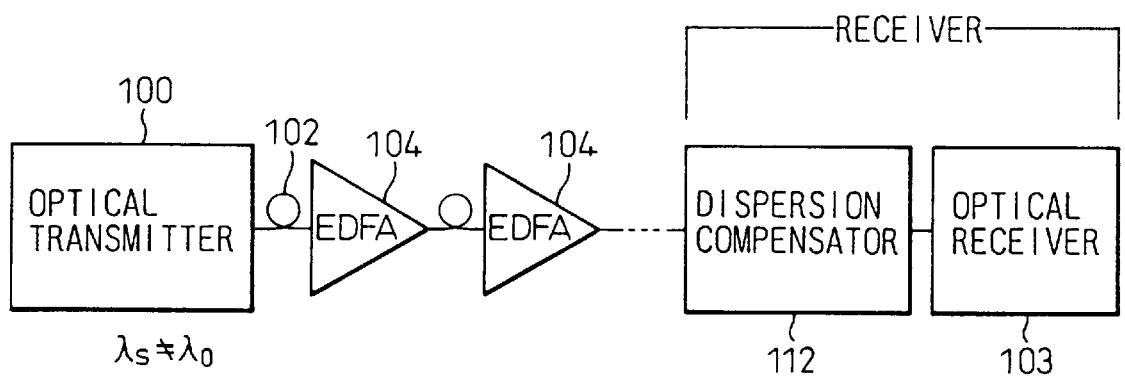
FIG. 37 is a diagram showing another example of the optical transmission system.

FIGS. 36 and 37 are concerned with an example in which the wavelength $\lambda_s$ of signal light is set to a value spaced apart from the zero dispersion wavelength $\lambda_0$ of DSF and a dispersion compensator 112 with a fixed dispersion amount is installed at the receiving end. FIG. 36 shows an example of repeaterless transmission, and FIG. 37 an example of repeaterless transmission, and FIG. 37 an example of multiple repeater transmission. The dispersion amount D of the dispersion compensator 112 is set to a value that can compensate for the GVD caused by $\lambda_s \neq \lambda_0$.

Figure 38:
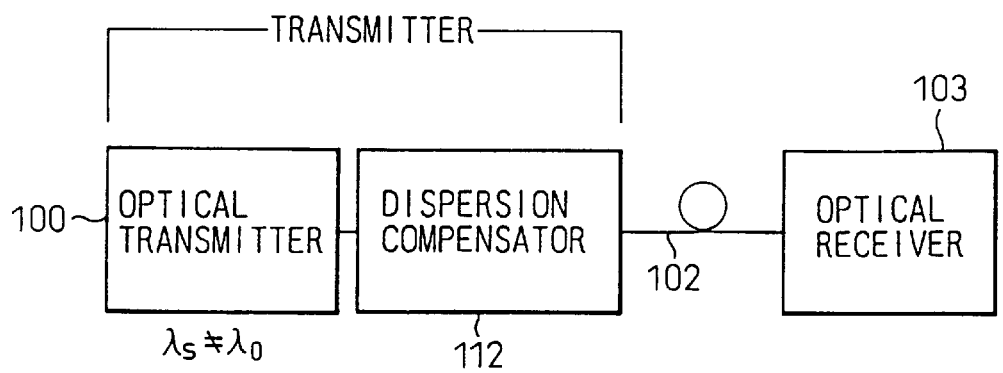
FIG. 38 is a diagram showing an example of an optical transmission system in which a dispersion compensator is installed at a transmitting end.
Figure 39:
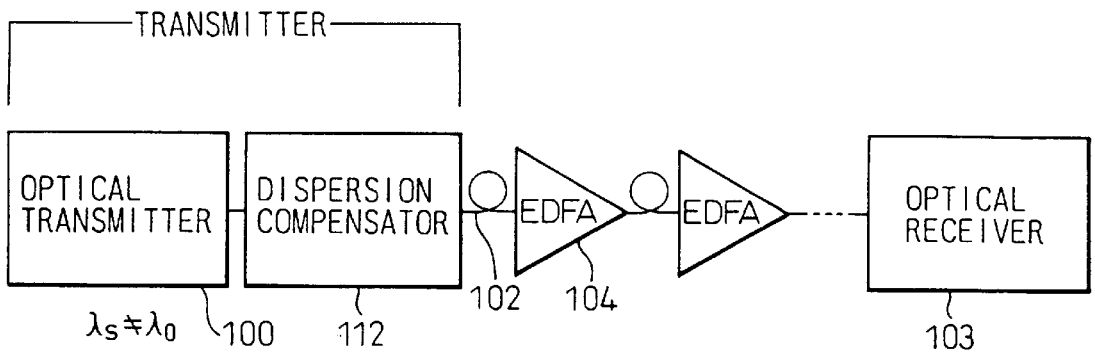
FIG. 39 is a diagram showing another example of the optical transmission system.

FIGS. 38 and 39 are concerned with an example where the dispersion compensator 112 is installed at the transmitted end. FIG. 38 shows an example of repeaterless transmission, and FIG. 39 an example of multiple repeater transmission. In this case also, the dispersion amount D of the dispersion compensator 112 is set to a value that can compensate for the GVD caused by $\lambda_s \neq \lambda_0$.

Figure 40:
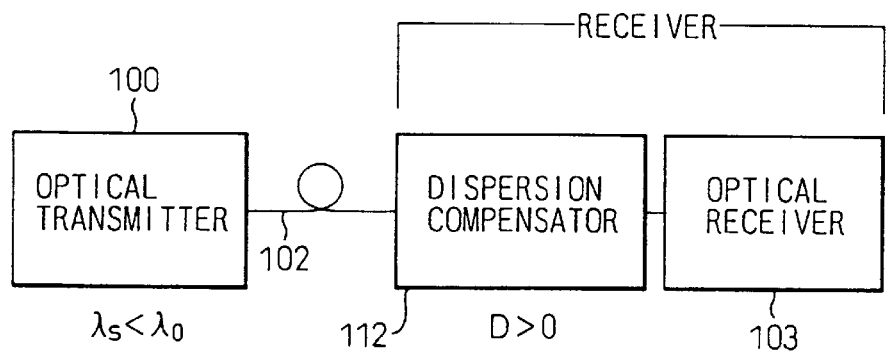
FIG. 40 is a diagram showing an example of an optical transmission system in which the compensation amount D in the dispersion compensator installed at a receiving end is set to a positive value.
Figure 41:
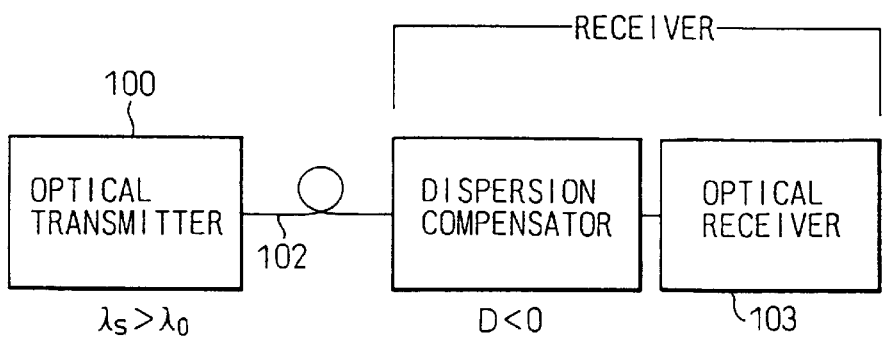
FIG. 41 is a diagram showing an example of an optical transmission system in which the compensation amount D in the dispersion compensator installed at a receiving end is set to a negative value.
Figure 43:
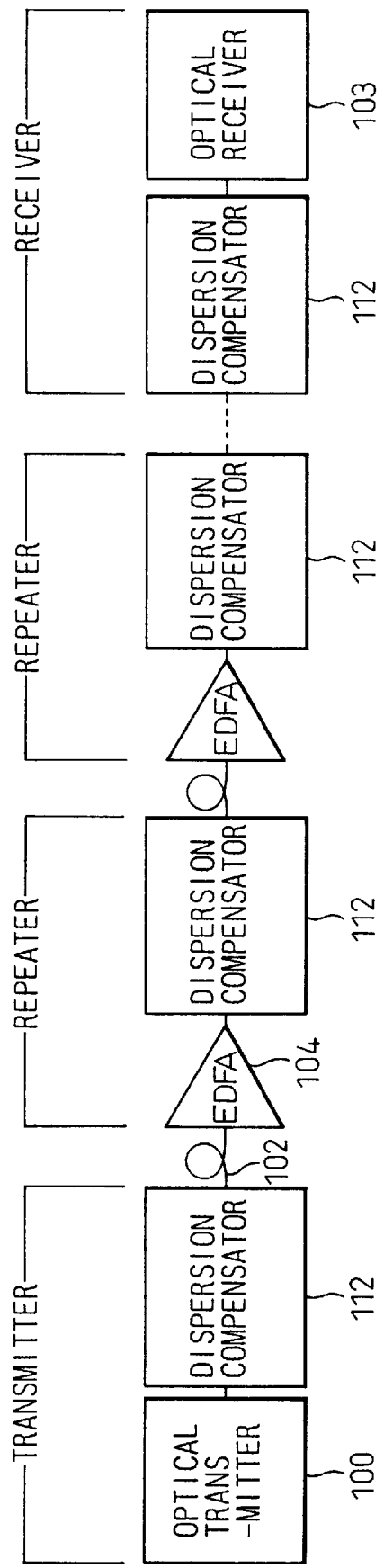
FIG. 43 is a diagram showing an example of an optical transmission system in which a dispersion compensator is also installed at a repeater.

In the example of FIG. 36 or 37, if the system is set expressly for $\lambda_s < \lambda_0$ and D>0, as shown in FIG. 40, since $\lambda_s$ is in the negative dispersion region, four-wave mixing between signal light and spontaneous emission can be prevented. Of course, a combination of $\lambda_s > \lambda_0$ and D<0, as shown in FIG. 41, can also serve the purpose. Furthermore, dispersion compensators with dispersion value D of opposite signs may be installed at the transmitter and receiver, respectively, as shown in part (a) and part (b) of FIG. 42. It is also possible to install a dispersion compensator at the transmitter, at the receiver, and at every repeater or some of the repeaters as shown in FIG. 43.

Figure 44:
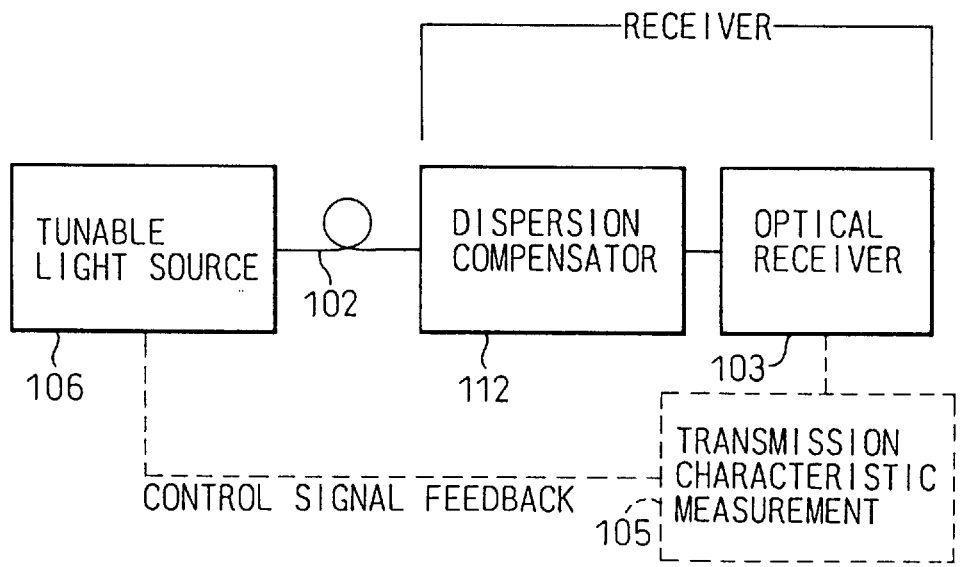
FIG. 44 is a diagram showing an example of an optical transmission system in which a dispersion compensator is installed and further, a transmission characteristic is measured, to optimize the signal light wavelength.
Figure 45:
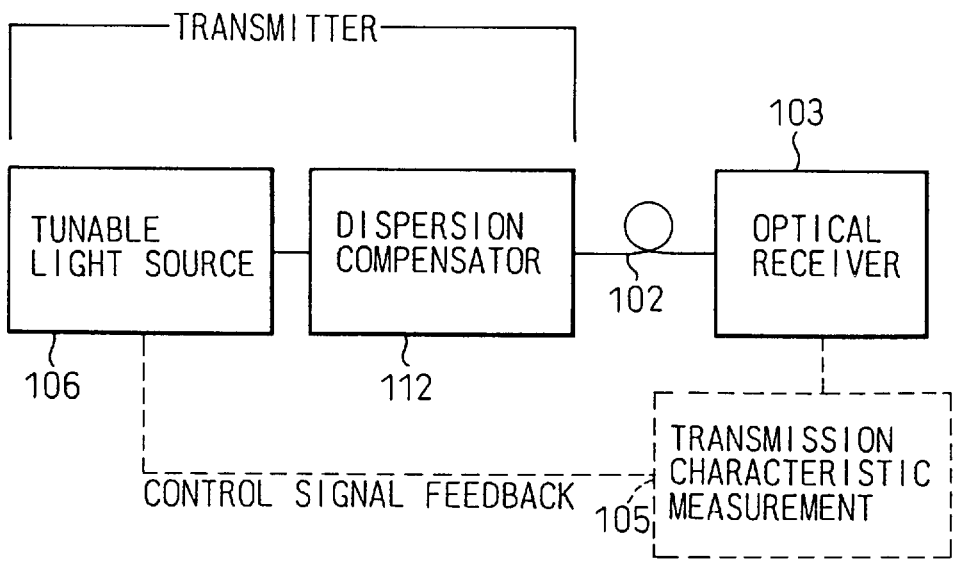
FIG. 45 is a diagram showing an example of an optical transmission system in which a dispersion compensator is installed at a transmitting end.
Figure 46:
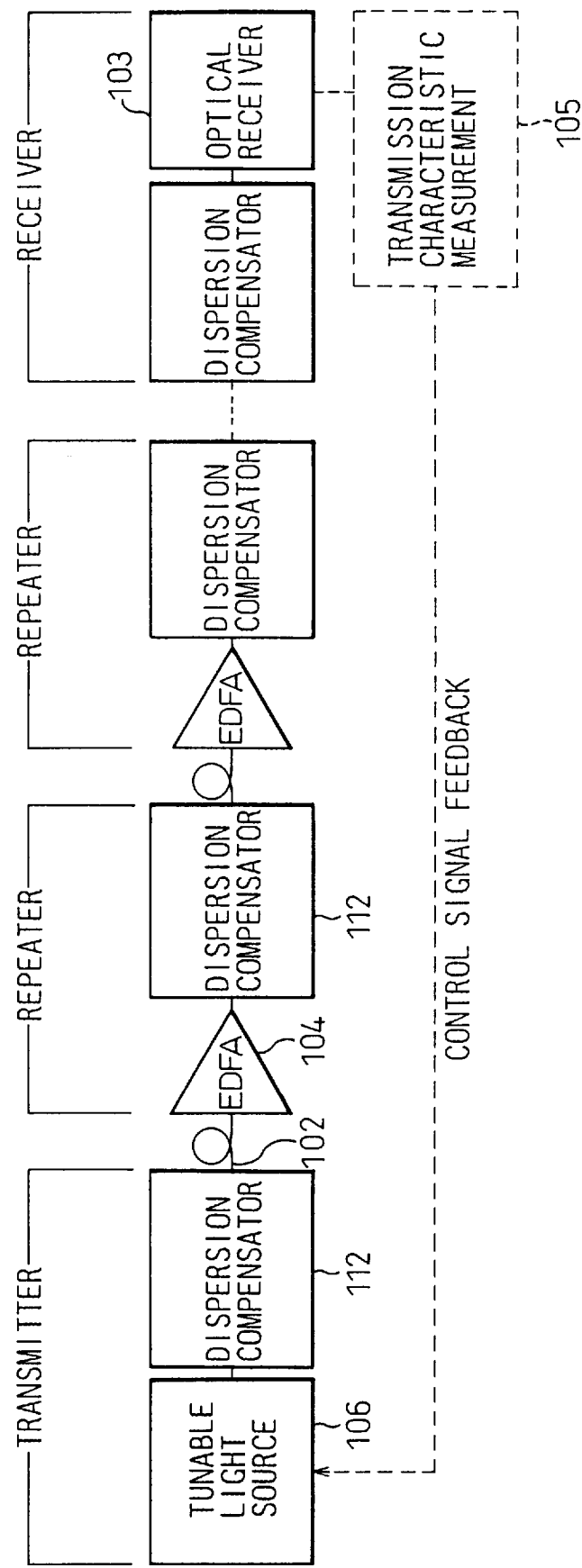
FIG. 46 is a diagram showing an example of an optical transmission system in which dispersion compensators are installed at both a transmitter and a receiver and also at a repeater.
Figure 47:
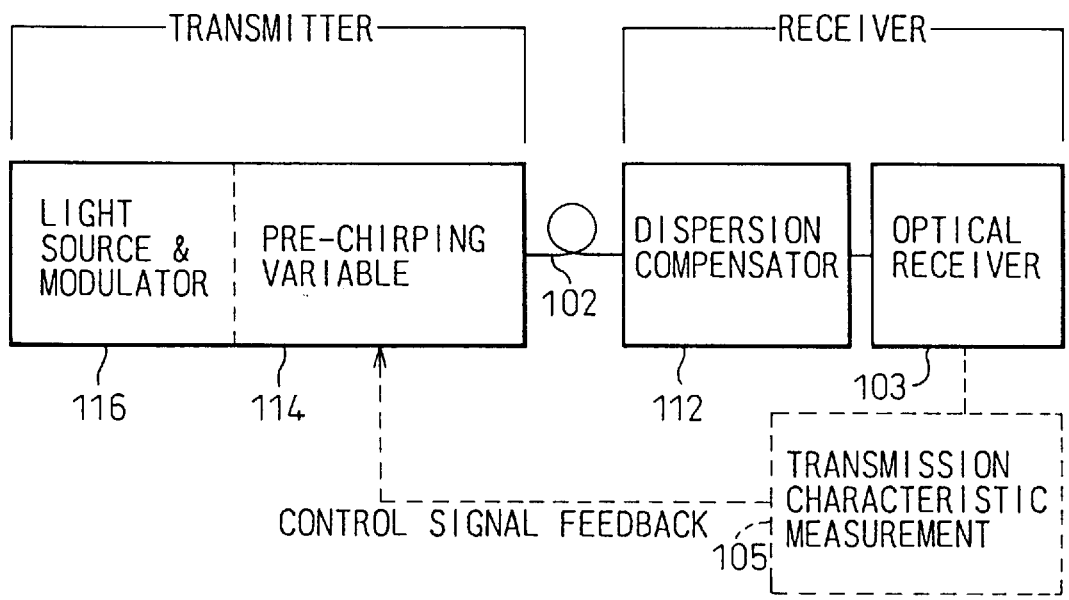
FIG. 47 is a diagram showing an example of an optical transmission system in which a dispersion compensator is installed and, further, a transmission characteristic is measured, to control the amount of prechirping to an optimum value.
Figure 48:
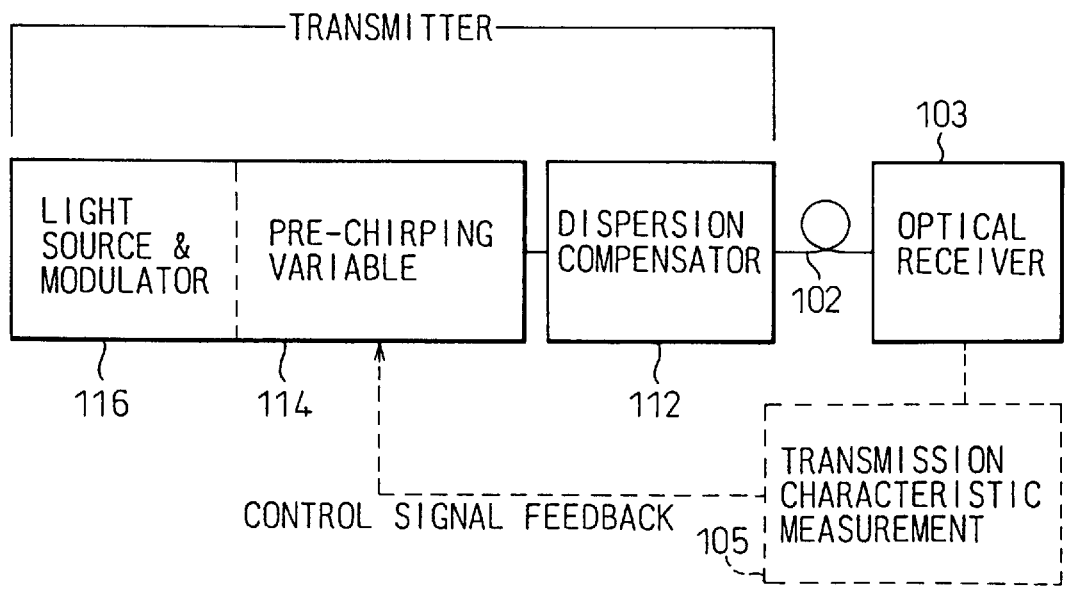
FIG. 48 is a diagram showing an example of an optical transmission system in which a dispersion compensator is installed at a transmitting end.
Figure 49:
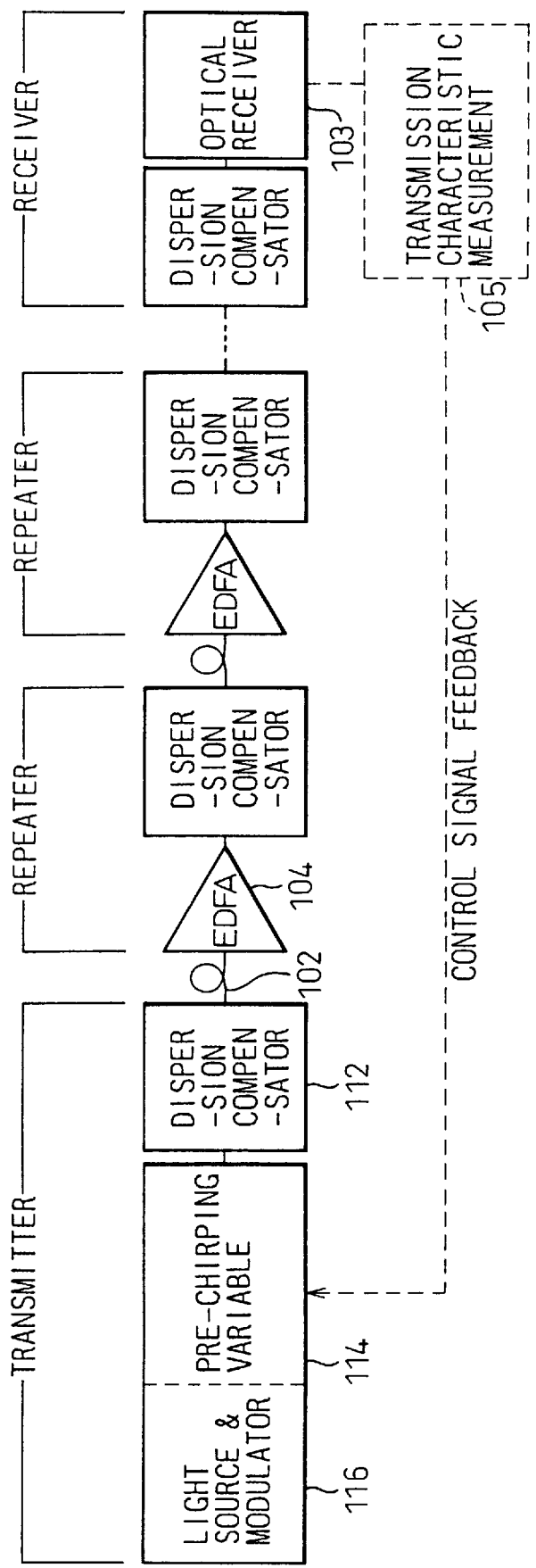
FIG. 49 is a diagram showing an example of an optical transmission system in which dispersion compensators are installed at both a transmitter and a receiver and also at a repeater.
Figure 50:
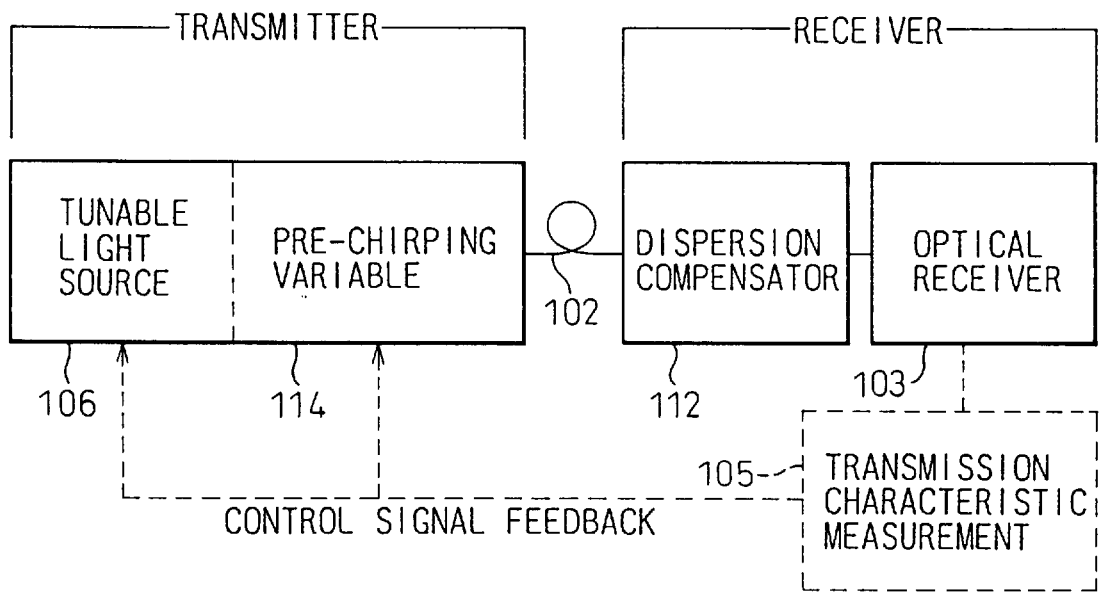
FIG. 50 is a diagram showing an example of an optical transmission system in which a dispersion compensator is installed and further, a transmission characteristic is measured, to control the signal light wavelength and the amount of prechirping to optimum values.
Figure 51:
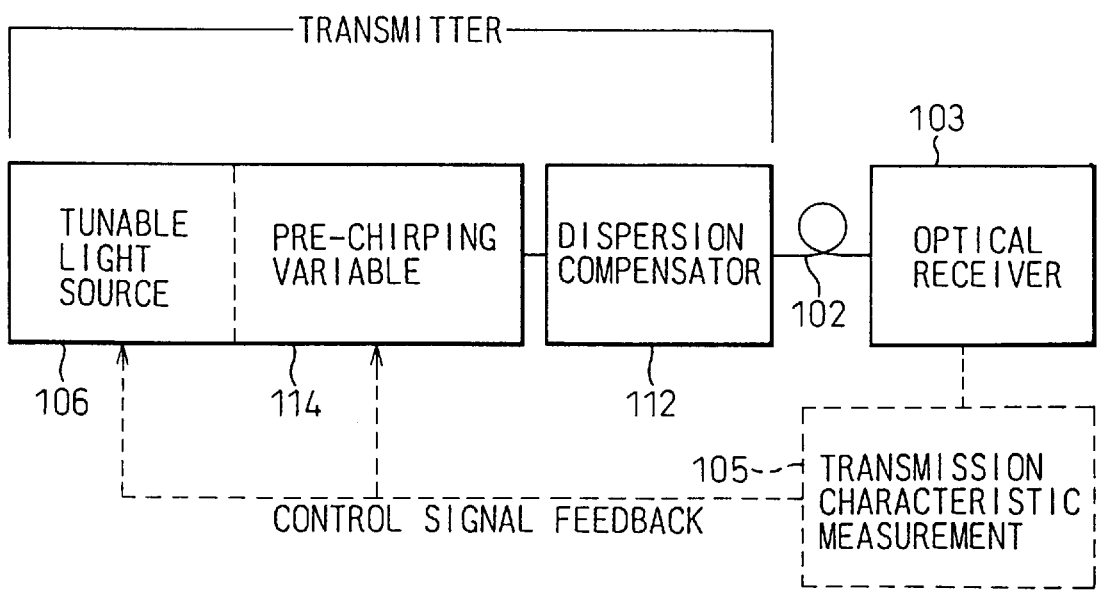
FIG. 51 is a diagram showing an example of an optical transmission system in which a dispersion compensator is installed at a transmitting end.
Figure 52:
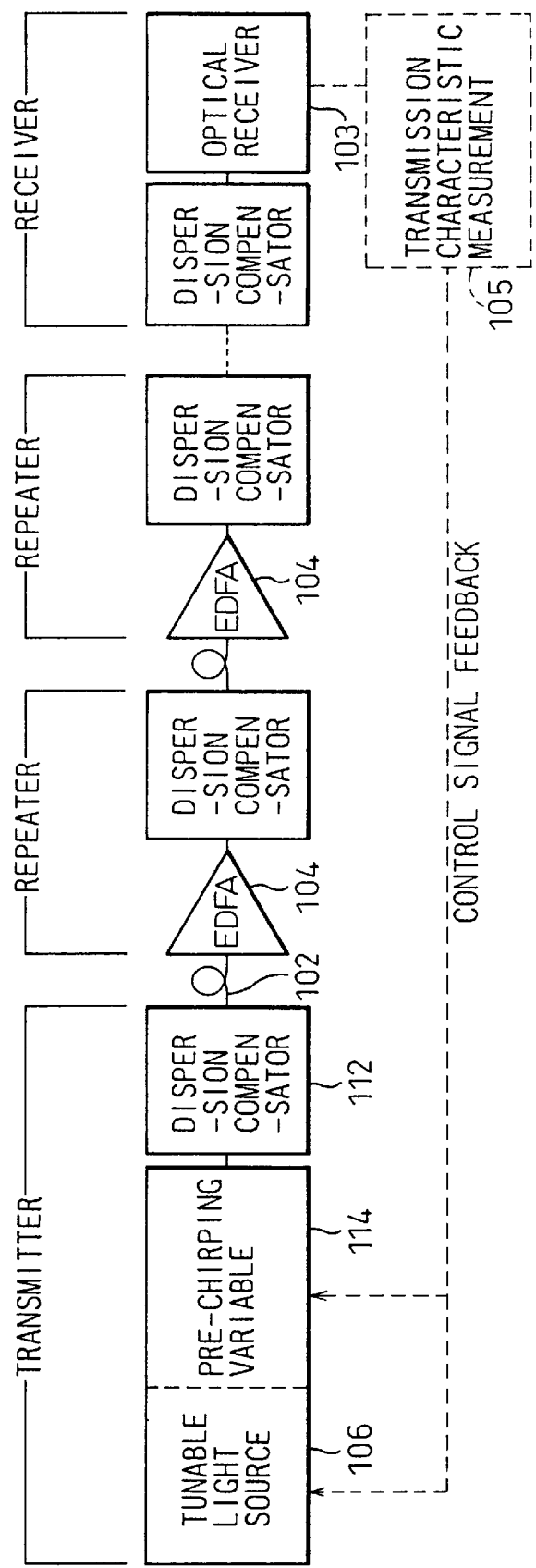
FIG. 52 is a diagram showing an example of an optical transmission system in which dispersion compensators are installed at both a transmitter and a receiver and also at a repeater.

Further optimization can be achieved by measuring the transmission characteristic with the wavelength $\lambda_s$ of signal light first set at a value spaced apart from the zero dispersion wavelength $\lambda_0$ and with the dispersion compensator arranged at an appropriate location to suppress the SPM effect, as described above, and then by correcting $\lambda_s$ to an optimum value based on the result of the measurement. FIGS. 44 and 46 show several examples of such a system configuration. For the method of measuring the transmission characteristic and the mode of control, any of the various methods and modes already described can be applied. As shown in FIGS. 47 to 49, the prechirping amount may be controlled with the signal light wavelength $\lambda_s$ fixed. Alternatively, both the signal light wavelength $\lambda_s$ and the prechirping amount may be controlled, as shown in FIGS. 50 to 52. Control of the prechirping amount can be accomplished using a Mach-Zehnder optical modulator, as previously described.

In the examples thus far described, a single signal light wavelength was used throughout one regenerative repeater section between the optical transmitter and receiver, regardless of the provision of an optical amplification repeater. In the examples hereinafter described, a wavelength converter is installed in every optical amplification repeater and the signal light wavelength $\lambda_s$ is optimized for each amplification repeater section.

Figure 53:
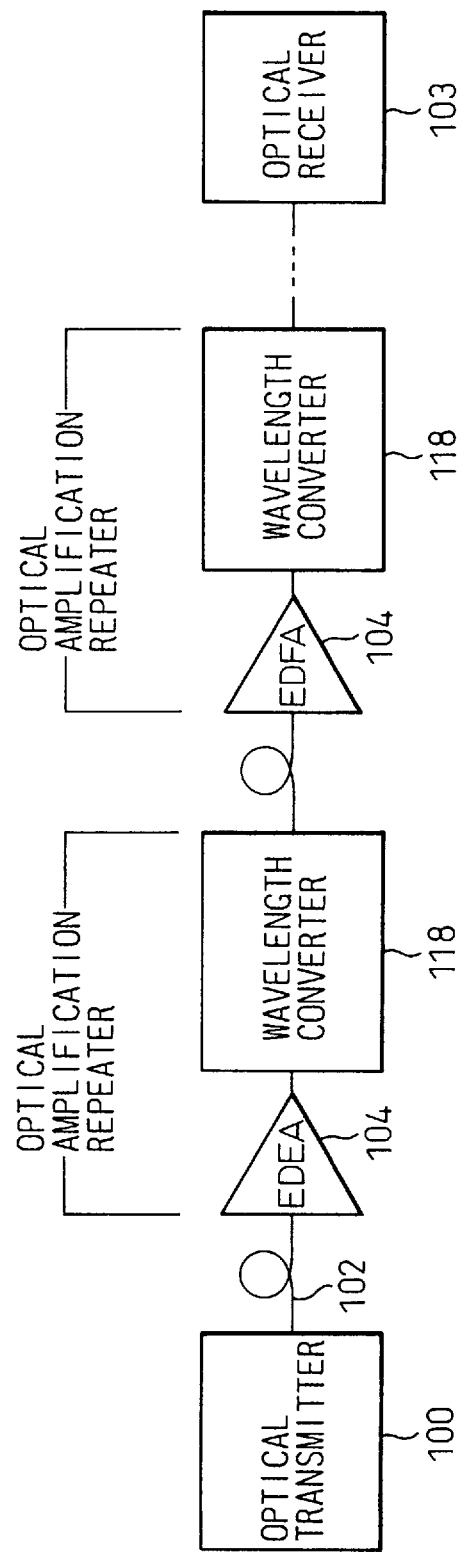
FIG. 53 is a diagram showing an example of an optical transmission system in which a wavelength converter is installed at an optical amplification repeater.
Figure 54:
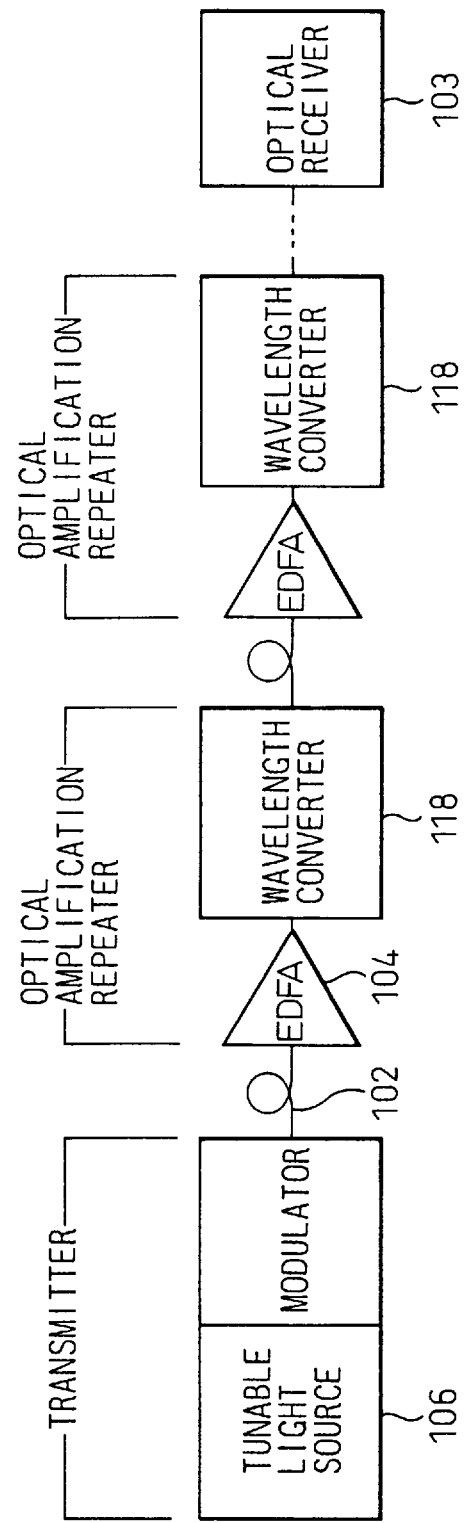
FIG. 54 is a diagram showing an example of an optical transmission system in which the wavelength is also made variable in the transmitter.

FIG. 53 shows an example of an optical transmission system in which a wavelength converter 118 is provided in every optical amplification repeater and the signal light wavelength is optimized for each amplification repeater section. In the example of FIG. 53, the wavelength converter 118 is provided for every amplification repeater section, but the invention is not limited to this configuration. Furthermore, a variable wavelength light source 106 may be provided in the transmitter, as shown in FIG. 54, to further optimize the signal light wavelength for the section between the transmitter and the first optical amplification repeater.

Figure 55:
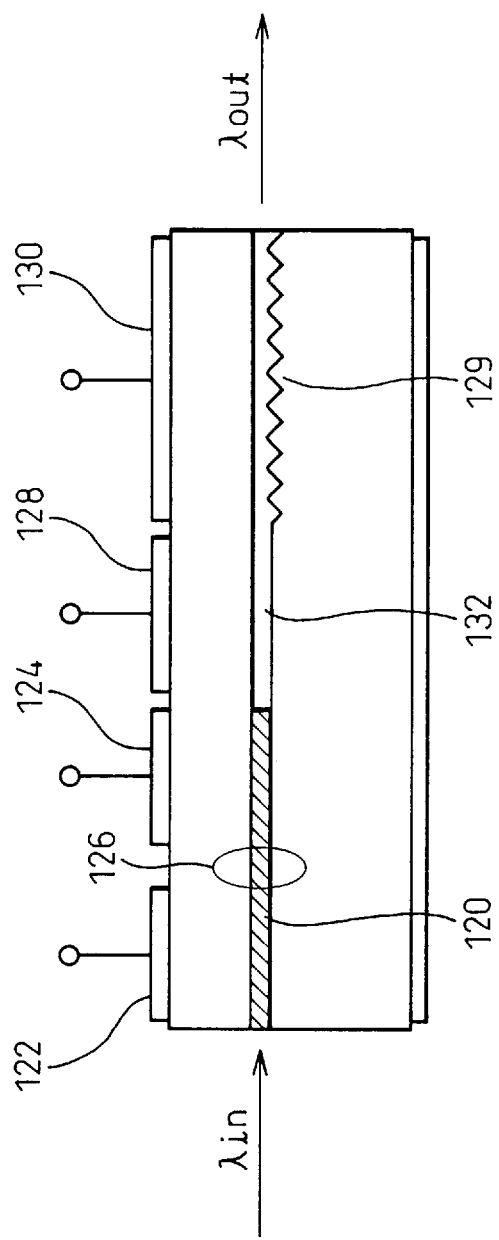
FIG. 55 is a cross-sectional view of a wavelength converting laser as an example of the wavelength converter.

The wavelength converter 118 can be implemented using a wavelength converting laser constructed, for example, from a bistable optical laser such as shown in FIG. 55. The left-hand half of the figure is the region of optical bistability; the electrode above the active layer 120 is divided into two sections, and the portion between them is used as a saturable absorption region. When input light is injected while the device is held in a state about to oscillate by adjusting currents in gain regions 122 and 124, the saturable absorption region 126 becomes transparent and starts lasing, producing output lights at different wavelengths. The right-hand half of the figure is the control region for oscillation wavelength, which consists of a phase shift region 128 and a DBR region 130 having a diffraction grating 129. When current is injected into the DBR region 130, the refractive index of a light guide layer 132 decreases because of the plasma effect caused by carriers, thus making it possible to shift the Bragg wavelength toward the shorter wavelength side. Further, by varying the current being injected to the phase shift region 128, an equivalent light path length of this region can be varied, which makes it possible to match the phase of light to the oscillation condition. Therefore, by suitably varying the currents applied to these two regions, the wavelength of output light can be controlled over a wide range.

In a second implementation of the wavelength converter 112, the phenomenon of four-wave mixing is deliberately made use of. When light at two wavelengths, $\lambda_0$ and $\lambda_{in}$, near the zero dispersion wavelength, is input to the DSF, light of $\lambda_{out} = \lambda_0 + (\lambda_0 + \lambda_{in})$ is produced as a result of four-wave mixing. When a tunable light source is used to emit $\lambda_0$ which is made variable, and only light at $\lambda_{out}$ is extracted from the output light by using a filter, $\lambda_{in}$ can be converted to $\lambda_{out}$ while controlling its wavelength.

By setting signal light wavelength for each optical amplification repeater section, it becomes possible to further increase the transmission speed, since wavelength dispersing can be further reduced, and the transmission line cost can be reduced since the allowable range for the variation of the zero dispersion wavelength $\lambda_0$ can be expanded. Furthermore, by wavelength-converting high-speed optical signals as light at each optical amplification repeater, rather than regenerating and repeating them and setting the signal light wavelength once again for further transmission, two conversions between optical and electrical signals and associated high-speed electronic circuitry can be omitted, thus achieving reductions in the size and cost of the system.

Figure 56:
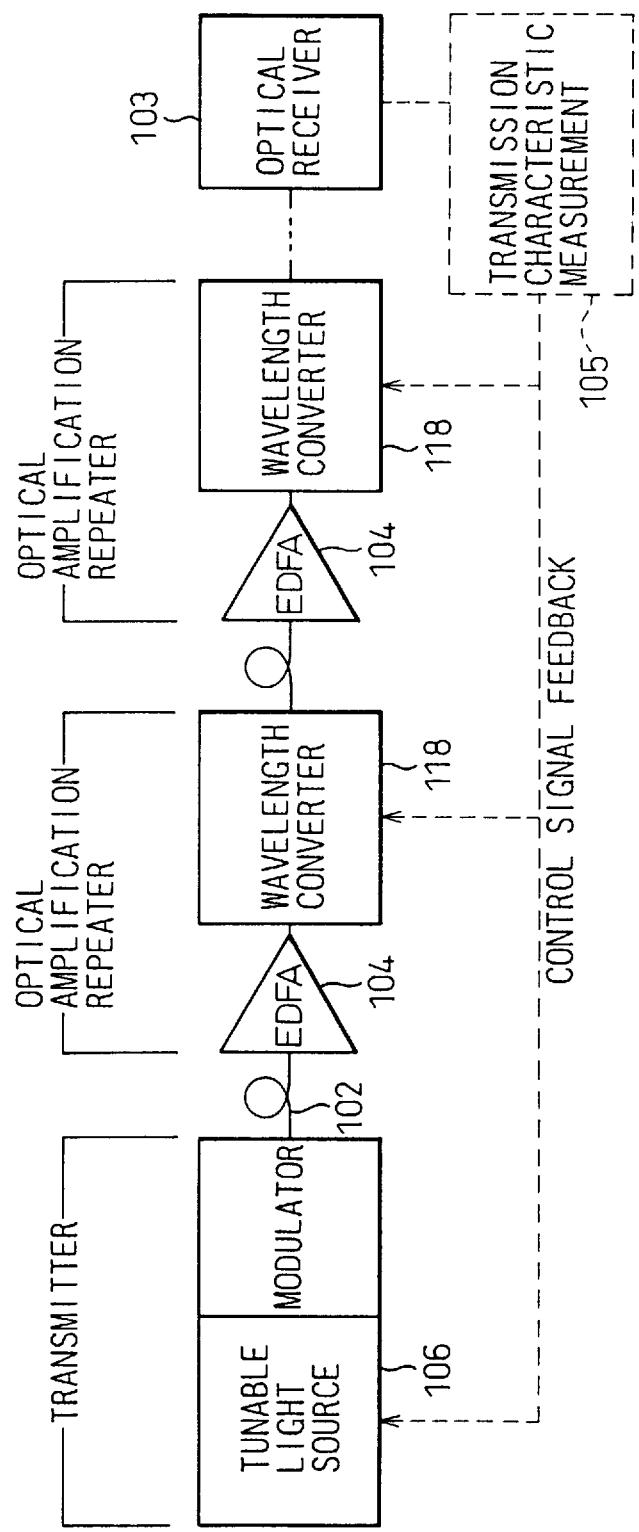
FIG. 56 is a diagram showing an example of an optical transmission system in which a transmission characteristic is measured to optimize the signal light wavelength for each optical amplification repeater section.

When the zero dispersion wavelength of the transmission line, including its variation along the longitudinal direction, is already known, the signal light wavelength is set at an optimum value for each optical amplification repeater section through simulation, etc. On the other hand, when the zero dispersion wavelength of the transmission line is not known, the transmission characteristic is measured at the receiving end when the system is started up, while sweeping the wavelength by the tunable light source and wavelength converter, and the wavelength is set for optimum transmission characteristic. It would also be possible to sweep the wavelength while feeding back the control signal from the transmission characteristic measuring section 105, as shown in FIG. 56. In this case, each wavelength converter is first set to zero wavelength shift amount, and the tunable light source is operated to perform sweeping to determine the wavelength that provides the best transmission characteristic. If the transmission characteristic does not meet the specification at this time, then the wavelength converters could be operated to perform sweeping, for example, in sequence first starting with the wavelength converter closest to the transmitter, then the next closest one, and so on, setting each to the wavelength that provides the best transmission characteristic. For the method of measuring the transmission characteristic and the mode of control during system startup and during system operation, any of the various methods and modes already described can be applied.

Figure 57:
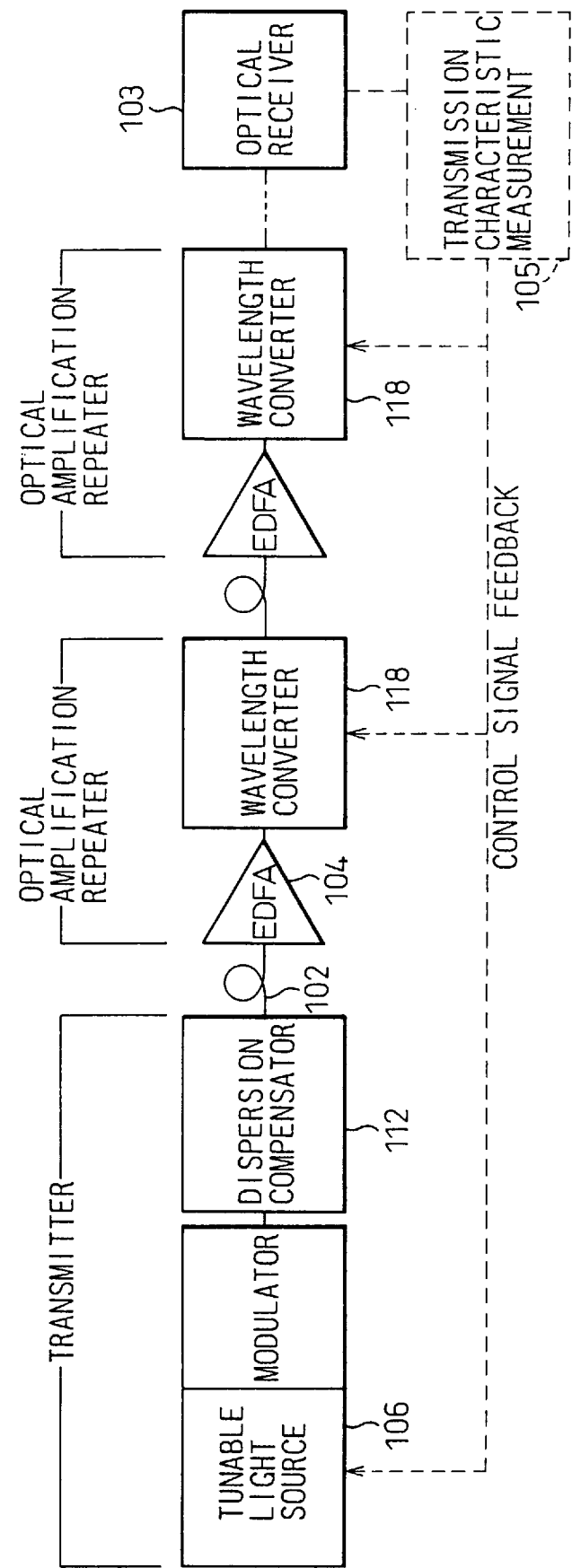
FIG. 57 is a diagram showing an example of an optical transmission system in which a dispersion compensator is installed.

In the example shown in FIG. 57, a dispersion compensator 112 for deliberately causing GVD is provided in the transmitter to reduce the SPM effect as already described. The dispersion compensator may also be installed at each repeater.

Next, peripheral techniques for implementing optical multiplexing will be described.

Figure 58:
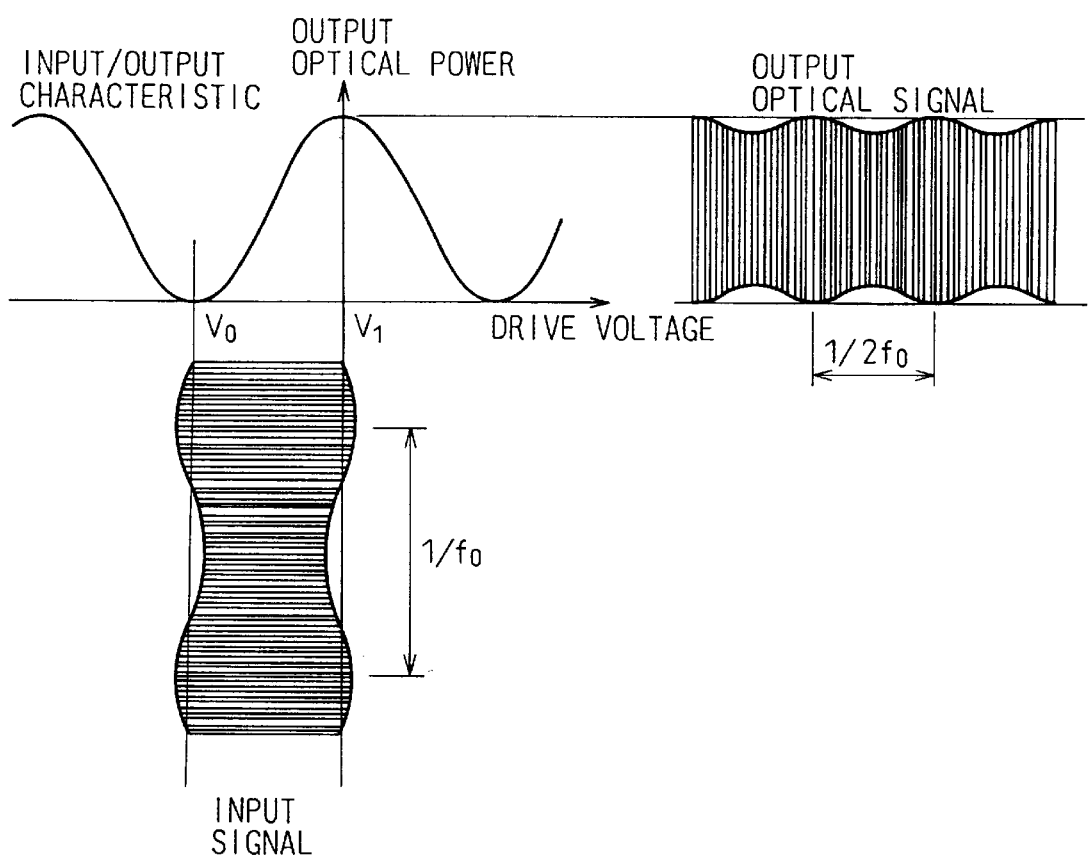
FIG. 58 is a diagram for explaining the operation of the drift compensation circuit when the operating point.
Figure 59:
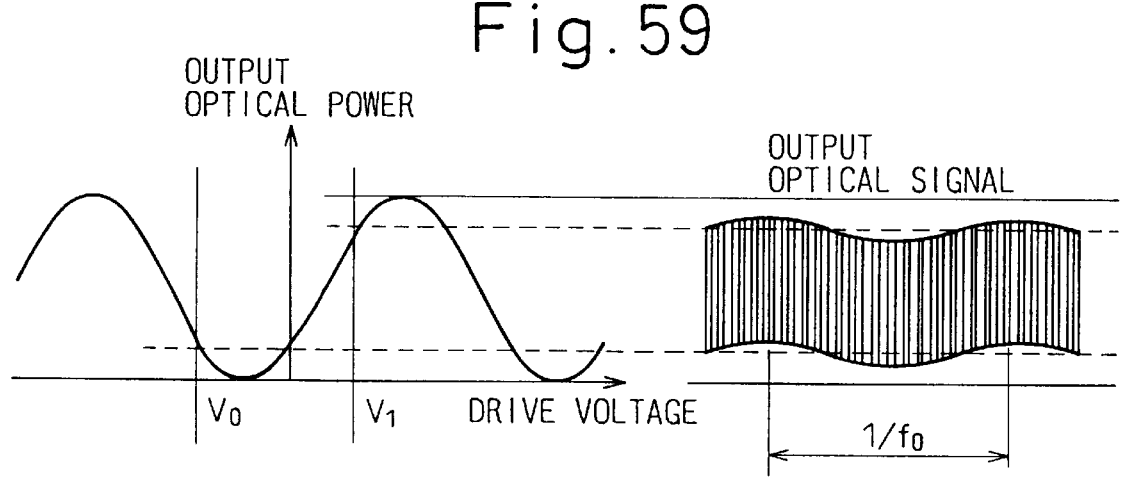
FIG. 59 is a diagram for explaining the operation of the drift compensation circuit when the operating point has shifted.
Figure 60:
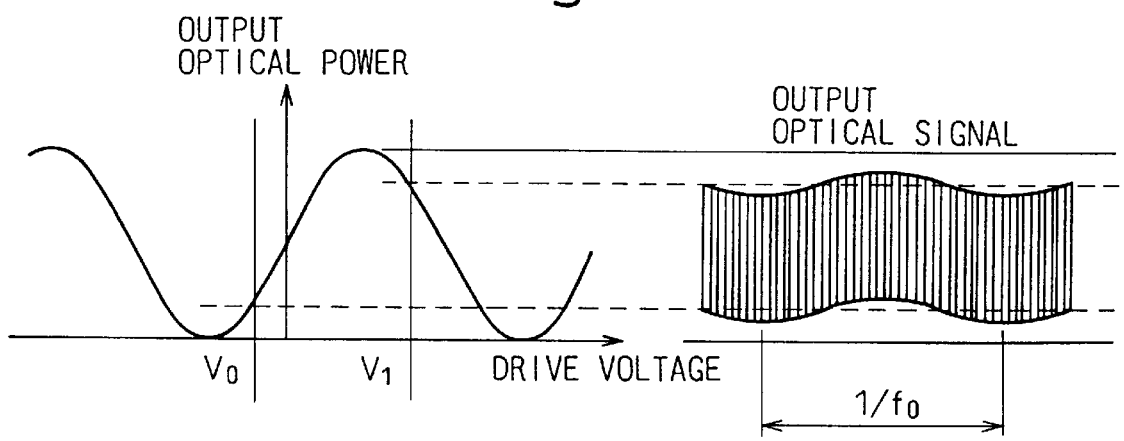
FIG. 60 is a diagram for explaining the operation of the drift compensation circuit when the operating point has shifted.

The Mach-Zehnder optical modulator, used to produce an optical signal by modulating a light beam from a light source with an electrical signal, has a sinusoidal characteristic as previously described with reference to FIG. 20, but since the characteristic drifts with changing temperature and aging, the drift must be compensated for so that the variation range (operating point) of the applied voltage is always held within specified limits. Japanese Patent Unexamined Publication No. 3-251815 discloses a technique whereby the drift of a Mach-Zehnder modulator is compensated for by amplitude-modulating the applied voltage (high-frequency electrical signal) with low-frequency signal of frequency $f_0$ and by controlling the bias of the applied voltage so that the $f_0$ component contained in the output light becomes zero. That is, when the driving voltage range $V_0$–$V_1$ is within the proper limits, the upper and lower envelopes of the output light signal vary with frequency $2f_0$, their phases being opposite from each other, as shown in FIG. 58, so that no $f_0$ component is contained; on the other hand, when the operating point has shifted outside the proper range, the upper and lower envelopes of the output light signal vary with frequency $f_0$ and in phase with each other, as shown in FIGS. 59 and 60, so that the $f_0$ component is contained. To prevent this, part of the output light signal is separated using a coupler and converted to an electrical signal, and the bias of the optical modulator is controlled using an output phase-detected at $f_0$, to stabilize the operating point.

When such a drift compensation technique is applied to an optical multiplexing system, since each optical channel requires the provision of an optical modulator, an equal number of drift compensation circuits need to be provided. Accordingly, if the above drift compensation technique is directly applied to an optical multiplexing system, there arises the problem that couplers for splitting optical signals and optical detectors for converting separated optical signals into electrical signals become necessary in large numbers.

Figure 61:
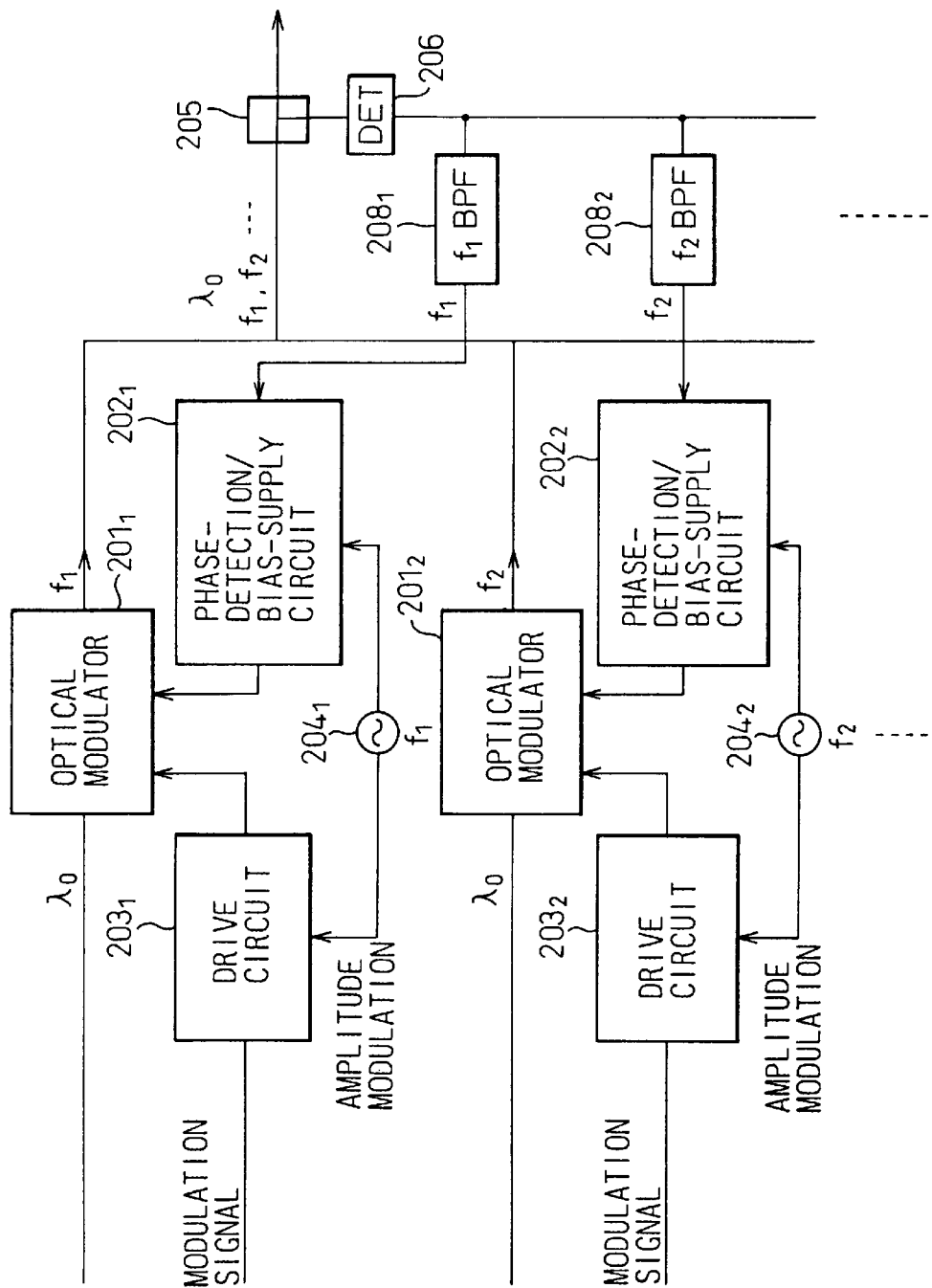
FIG. 61 is a block diagram showing an example of an optical multiplexing transmission system having a drift compensation circuit of the present invention.

FIG. 61 shows an example of an optical multiplexing system equipped with a drift compensation circuit according to the present invention. In this example, laser beams of the same wavelength $\lambda_0$ are input to a plurality of Mach-Zehnder optical modulators $201_1$, $201_2$, . . . , arranged in parallel, and drive circuits, $203_1$, $203_2$, . . . , for the optical modulators $201_1$, $201_2$, . . . , amplitude-modulate drive signals (modulation signals) with low-frequency signals of different frequencies $f_1$, $f_2$, . . . , generated by low-frequency oscillators, $204_1$, $204_2$, . . . .

Output lights from the optical modulators, $201_1$, $201_2$, . . . , are optically combined and transmitted onto an optical transmission line, while part of the combined light is separated as monitor light by using an optical coupler 205; the separated light is then converted to an electrical signal and further divided into a plurality of signals which are passed through band filters $208_1$, $208_2$, . . . , and applied to corresponding phase-detection/bias-supply circuits $202_1$, $202_2$, . . . The band filter $208_k$ (k=1, 2, . . . , the same applies hereinafter) transmits frequency $f_k$ of the low-frequency-superimposed components of the corresponding optical modulator $201_k$.

The phase-detection/bias-supply circuit $202_k$ phase-detects the low-frequency component of the output light extracted by the band filter $208_k$ with the output of the oscillator $204_k$, and generates a signal to control the operating point of the optical modulator $201_k$. This control is performed simultaneously in all the optical modulators $201_1$, $201_2$, . . .

In the above configuration, the phase-detection/bias-supply circuit $202_1$ for the optical modulator $201_1$ is controlled using the low-frequency component $f_1$ extracted by the band filter $208_1$, and likewise, the phase-detection/bias-supply circuit $202_2$ for the optical modulator $201_2$ is controlled using the low-frequency component $f_2$ extracted by the band filter $208_2$. Accordingly, bias control for each of the optical modulators, $201_1$, $201_2$, . . . , arranged in parallel, can be performed independently of each other.

The above configuration is effective when performing optical time-division multiplexing (OTDM) of a plurality of optical signals. By performing output light separation and optical/electrical conversion at one location, simultaneous control of a plurality of optical modulators can be accomplished. In this example, the band filters, $208_1$, $208_2$, . . . , are used to extract the corresponding frequency components after optical/electrical conversion and separation, but if stable operation can be ensured, these filters may be omitted.

In the example of FIG. 61, control of the operating point drift by low-frequency amplitude modulation is performed simultaneously in all the optical modulators, $201_1$, $201_2$, . . . , operating in parallel. Alternatively, the system may be constructed in such a manner that each of the drive circuits for performing low-frequency amplitude modulation is switched into operation in turn at certain intervals of time so that at any given time only one drive circuit is performing low-frequency amplitude modulation; in that case, the operating point drift only of the optical modulator currently performing the low-frequency modulation is detected and controlled, while the operating points of the other optical modulators are held fixed. In this manner, signals of the same frequency can be used as the low-frequency signals.

Figure 62:
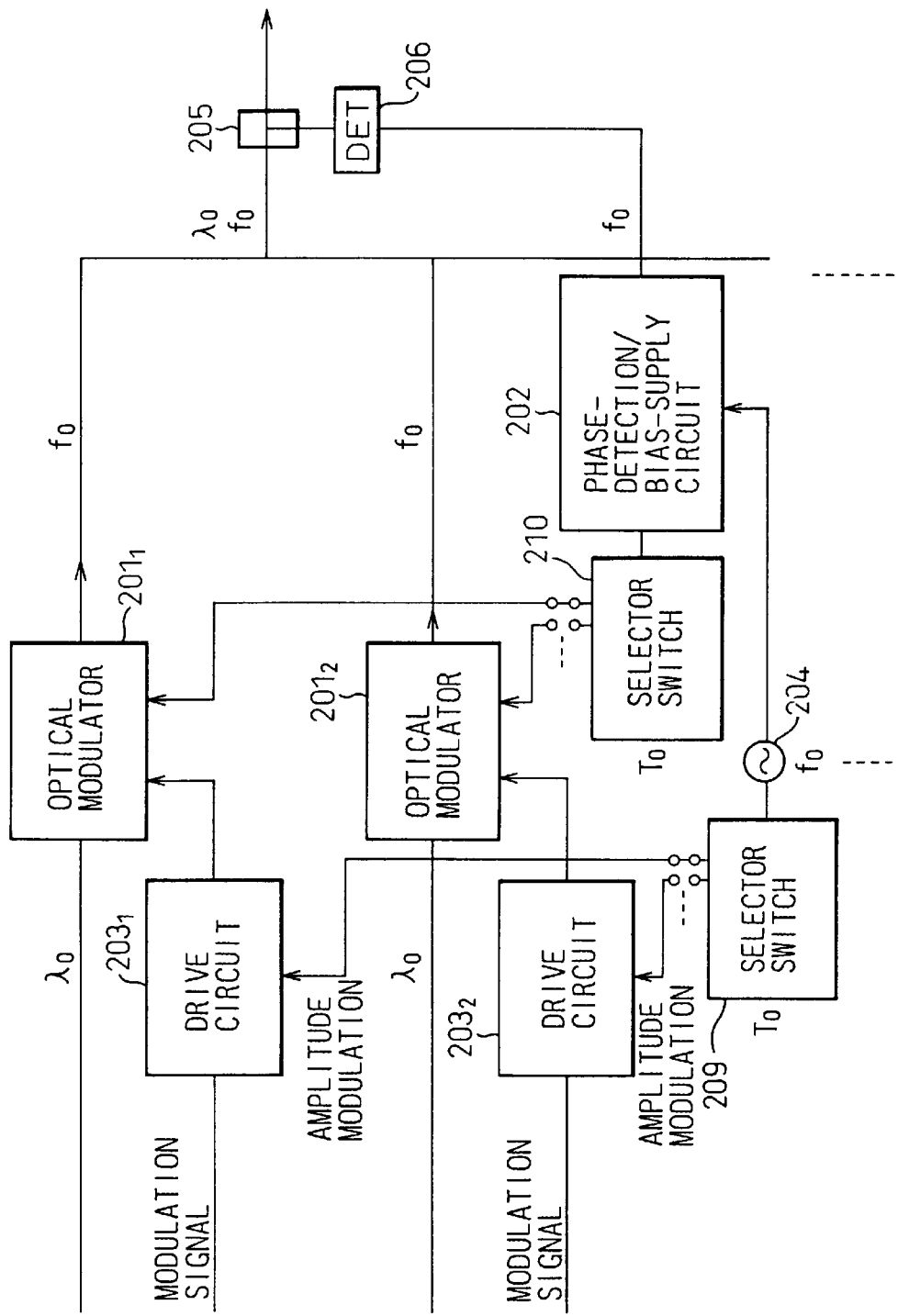
FIG. 62 is a block diagram showing another example of the optical multiplexing transmission system having a drift compensation circuit of the present invention.

FIG. 62 shows an example of such an optical multiplexing system. In this example, control is switched, at fixed intervals of time $T_0$, between optical modulators arranged in parallel. More specifically, a plurality of Mach-Zehnder optical modulators, $201_1$, $201_2$, . . . , are arranged in parallel; first, optical signals of the same wavelength $\lambda_0$ are modulated by the optical modulators, $201_1$, $201_2$, ..., and then, the modulated signals are combined together. Only one low-frequency generator 204 is provided that generates a single low frequency $f_0$ which is supplied via a selector switch 209 to the drive circuits, $203_1$, $203_2$, ..., each of which is switched into operation in turn at fixed intervals of time $T_0$. Each drive circuit thus switched into operation in turn at fixed time intervals performs low-frequency amplitude modulation with the single frequency $f_0$.

On the output side of the optical modulators, $201_1$, $201_2$, ..., the combined output light is split by the optical coupler 205 and converted by the optical detector 206 into an electrical signal which is supplied to the phase-detection/bias-supply circuit 202. The phase-detection/bias-supply circuit 202 phase-detects the low-frequency component in the electrical signal converted from the separated output light with the low-frequency $f_0$ signal from the low-frequency oscillator 204, and generates a bias voltage for output.

The output of the phase-detection/bias-supply 202 is supplied via a selector switch 210 to the optical modulators $201_1$, $201_2$, ... The selector switch 210, which operates in interlocking fashion with the selector switch 209, controls the operating point drift by supplying the bias voltage only to the optical modulator whose associated drive circuit is performing low-frequency amplitude modulation. During that time, the operating points of the other optical modulators are held fixed (for example, using a latch or the like: the same applies hereinafter).

This example, as with the example of FIG. 61, is effective when optical time-division multiplexing a plurality of optical signals, and has an additional advantage that control can be accomplished using one phase-detection/bias supply-circuit. To prevent occurrence of drifts in the optical modulators not under control, the time $T_0$ is set as short as possible but sufficiently longer than the time constant of control.

Figure 63:
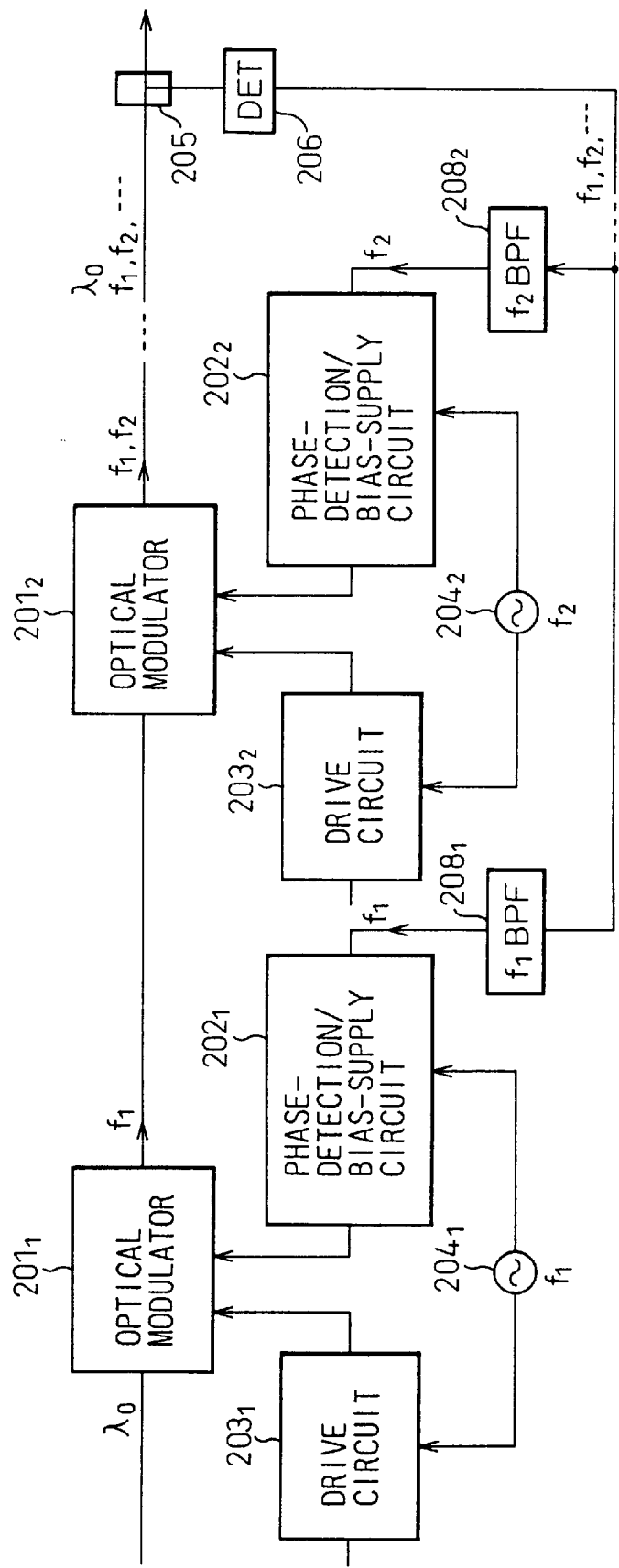
FIG. 63 is a block diagram showing another example of the optical multiplexing transmission system having a drift compensation circuit of the present invention.

FIG. 63 shows another example of the optical multiplexing system of the invention. In this example, the optical modulators $201_1$, $201_2$, ..., are arranged in series. That is, the system is constructed with a plurality of Mach-Zehnder optical modulators $201_1$, $201_2$, ..., arranged in series so that the light of wavelength $\lambda_0$ from the light source undergoes modulation two or more times. This system should not be called an optical multiplexing system because optical signals are not multiplexed. In this specification, however, the system is called an optical multiplexing system, for convenience.

The drive circuits, $203_1$, $203_2$, ..., for the optical modulators, $201_1$, $201_2$, ..., are constructed to perform low-frequency amplitude modulation with respectively different frequencies $f_1$, $f_2$, ... The output light from the final-stage optical modulator is split by the optical coupler 205 and converted by the optical detector 206 into an electrical signal which is supplied to the phase-detection/bias-supply circuits, $202_1$, $202_2$, ..., via the respective band filters $208_1$, $208_2$, ... The band filter $208_k$ transmits the frequency $f_k$ of the low-frequency-superimposed components of the corresponding optical modulator $201_k$.

The phase-detection/bias-supply circuit $202_k$ phase-detects the low-frequency component in the signal separated from the output light with the low-frequency $f_k$ signal from the oscillator $204_k$, and thus detects an operating point drift and controls the operating point of the corresponding optical modulator $201_k$. Control of the operating point is performed simultaneously in all the optical modulators, $201_1$, $201_2$, ... If stable operation can be ensured, the band filters, $208_1$, $208_2$, ..., may be omitted.

In the example of FIG. 63, control of the operating point drift using low-frequency superimposition is performed simultaneously in all the optical modulators, $201_1$, $201_2$, ... Alternatively, the system may be constructed in such a manner that each of the drive circuits for performing low-frequency amplitude modulation is switched into operation in turn at certain intervals of time so that at any given time only one drive circuit is performing low-frequency amplitude modulation; in that case, the operating point drift only of the optical modulator currently performing the low-frequency modulation is detected and controlled, while the operating points of the other optical modulators are held fixed.

Figure 64:
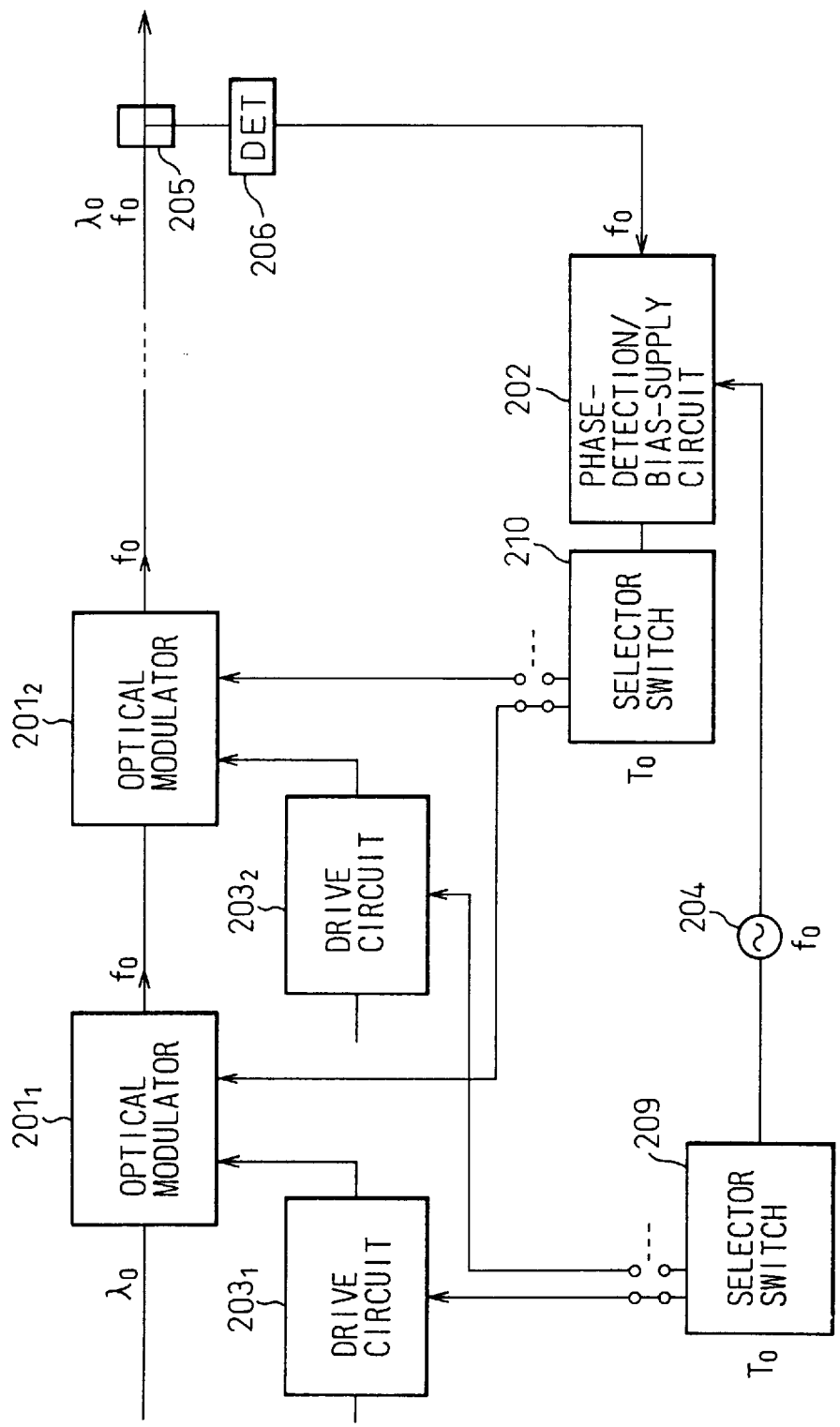
FIG. 64 is a block diagram showing another example of the optical multiplexing transmission system having a drift compensation circuit of the present invention.

FIG. 64 shows an example of such an optical multiplexing system. In this example, control is switched, at fixed intervals of time $T_0$, between optical modulators, $201_1$, $201_2$, ..., arranged in series. More specifically, a plurality of Mach-Zehnder optical modulators, $201_1$, $201_2$, ..., are arranged in series to construct a system in which light from the light source undergoes modulation two or more times. Only one low-frequency generator 204 is provided that generates a single low frequency $f_0$ which is supplied via the selector switch 209 to the drive circuits, $203_1$, $203_2$, ..., each of which is switched into operation in turn at fixed intervals of time $T_0$. Each drive circuit thus switched into operation in turn at fixed time intervals performs low-frequency amplitude modulation with the single frequency $f_0$.

The output light from the final-stage optical modulator is split by the optical coupler 205 and converted by the optical detector 206 into an electrical signal which is supplied to the phase-detection/bias-supply circuit 202. The phase-detection/bias-supply circuit 202 phase-detects the low-frequency component in the electrical signal converted from the separated output light with the single low-frequency $f_0$ signal from the low-frequency oscillator 204, and generates a bias voltage for output.

The output of the phase-detection/bias-supply 202 is supplied via the selector switch 210 to the optical modulators $201_1$, $201_2$, ... The selector switch 210, which operates in interlocking fashion with the selector switch 209, controls the operating point drift by supplying the bias voltage only to the optical modulator whose associated drive circuit is performing low-frequency amplitude modulation. During that time, the operating points of the other optical modulators are held fixed.

This example, as with the example of FIG. 63, is effective for optical time-division multiplexing, and has an additional advantage that control can be accomplished using one phase-detection/bias-supply circuit.

Figure 65:
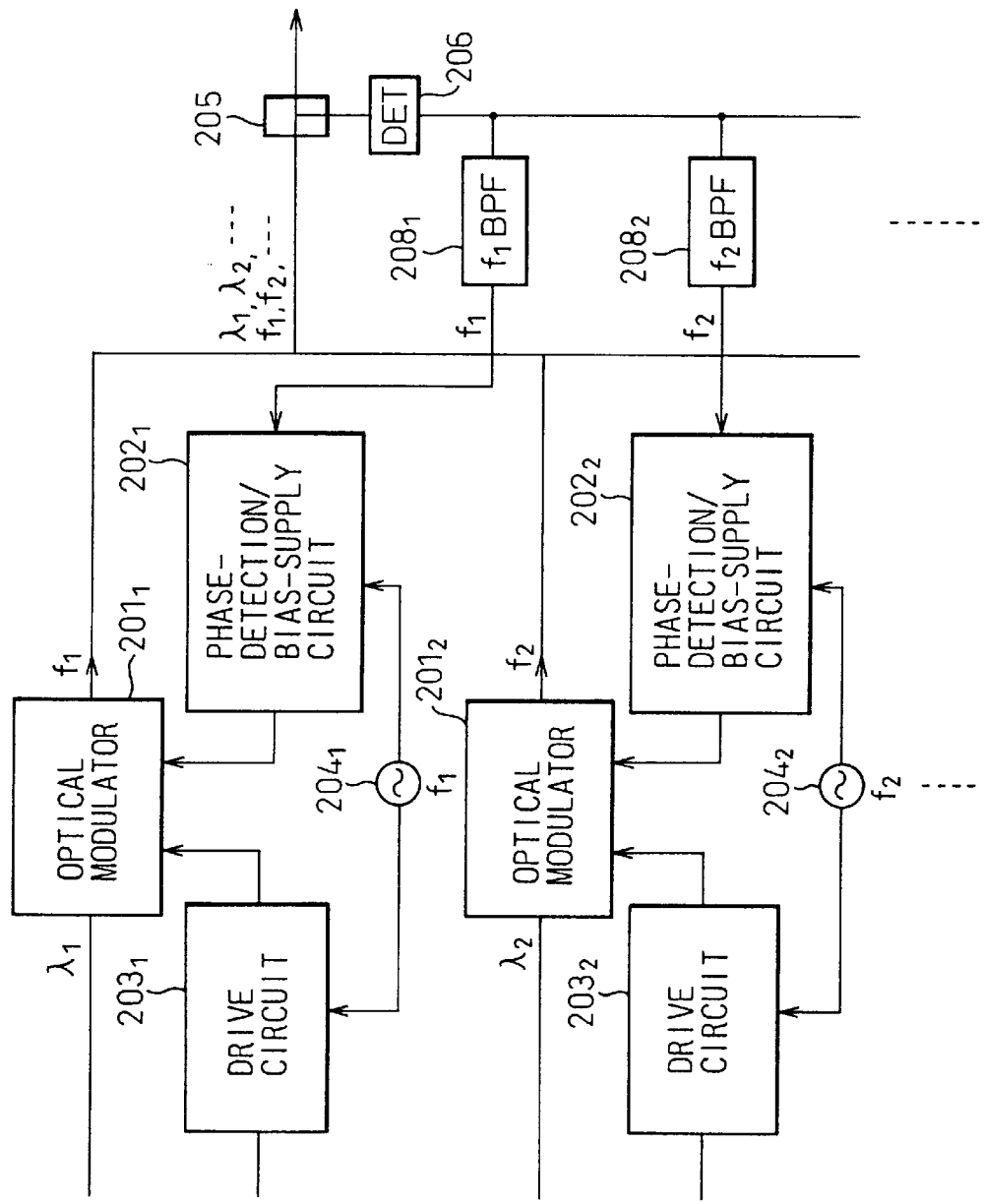
FIG. 65 is a block diagram showing another example of the optical multiplexing transmission system having a drift compensation circuit of the present invention.

FIG. 65 shows another example of the optical multiplexing system of the invention. In this example, the optical modulators, $201_1$, $201_2$, ..., arranged in parallel, modulate lights of respectively different wavelengths, $\lambda_1$, $\lambda_2$, ..., which are then wavelength-multiplex. The drive circuits, $203_1$, $203_2$, ..., for the optical modulators, $201_1$, $201_2$, ..., perform low-frequency amplitude modulation with respectively different frequencies $f_1$, $f_2$, ... That is, a plurality of Mach-Zehnder optical modulators, $201_1$, $201_2$, ..., are arranged in parallel to construct a system in which optical signals of different wavelengths, $\lambda_1$, $\lambda_2$, ..., are wavelength-multiplexed. The drive circuits, $203_1$, $203_2$, ..., for the optical modulators, $201_1$, $201_2$, ..., perform low-frequency amplitude modulation with respectively different frequencies $f_1$, $f_2$, ..., and the optical outputs from the optical modulators, $201_1$, $201_2$, ..., are combined together to produce wavelength-multiplexed output light.

The wavelength-multiplexed output light is split by the optical coupler 205 and converted by the optical detector 206 into an electrical signal which is supplied to the phase-detection/bias-supply circuits, $202_1$, $202_2$, ..., via the respective band filters $208_1$, $208_2$, ... The band filter $208_k$ transmits the frequency $f_k$ of the low-frequency-superimposed components of the corresponding optical modulator $201_k$. The phase-detection/bias-supply circuit $202_k$ phase-detects the low-frequency component in the signal split from the output light with the low-frequency $f_k$ signal from the oscillator $204_k$, and thus detects an operating point drift and controls the operating point of the optical modulator $201_k$. This control is performed simultaneously in all the optical modulators, $201_1$, $201_2$, ...

This example is effective for wavelength multiplexing, and allows simultaneous control of a plurality of optical modulators, in the same principle as that of the example shown in FIG. 61. If stable operation can be ensured, the band filters, $208_1$, $208_2$, ..., may be omitted.

In the example of FIG. 65, control of the operating point drift using low-frequency amplitude modulation is performed simultaneously in all the optical modulators, $201_1$, $201_2$... Alternatively, the system may be constructed in such a manner that each of the drive circuits for performing low-frequency amplitude modulation is switched into operation in turn at certain intervals of time so that at any given time only one drive circuit is performing low-frequency amplitude modulation; in that case, the operating point drift only of the optical modulator currently performing the low-frequency modulation is detected and controlled, while the operating points of the other optical modulators are held fixed.

Figure 66:
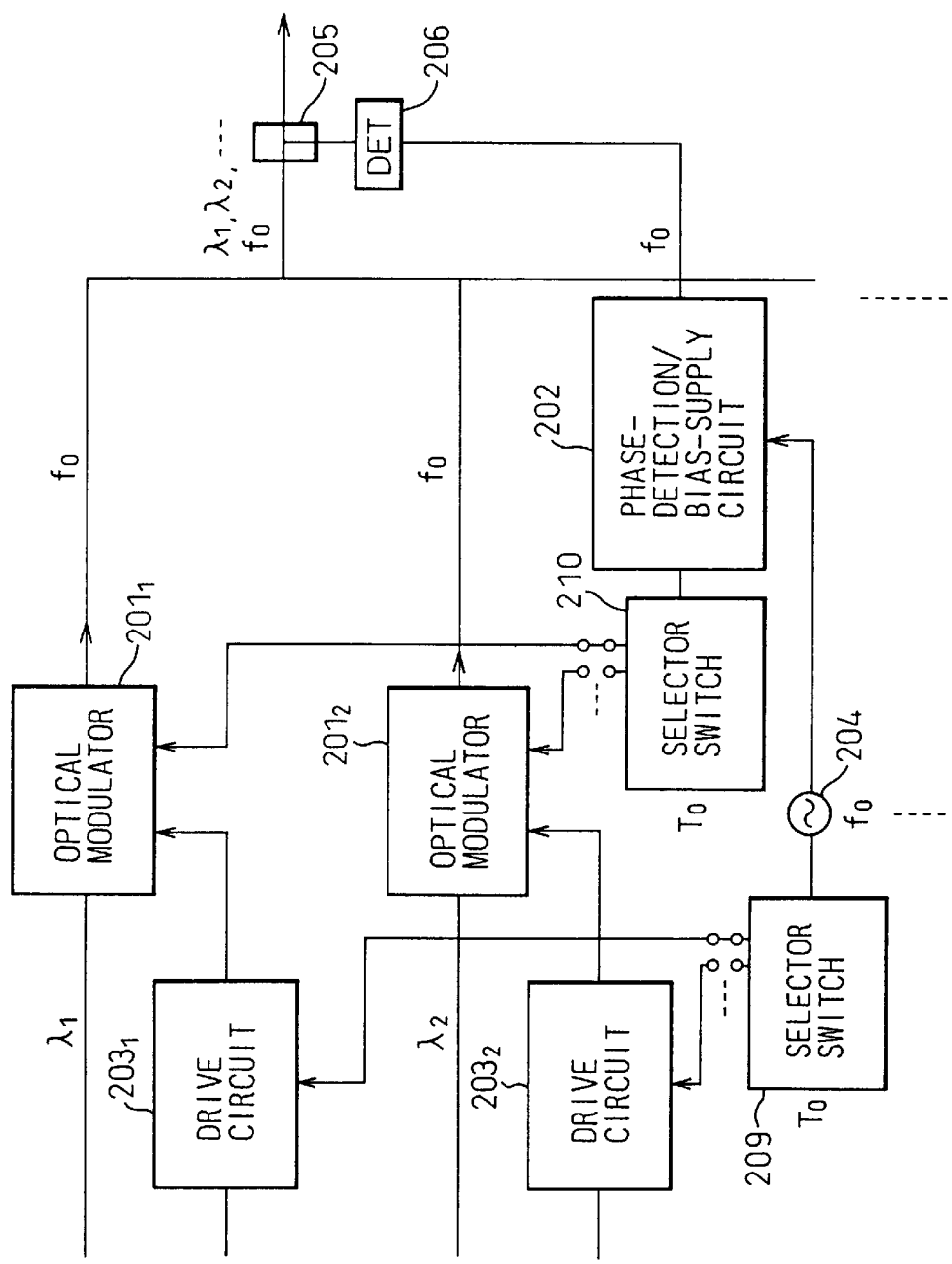
FIG. 66 is a block diagram showing another example of the optical multiplexing transmission system having a drift compensation circuit of the present invention.

FIG. 66 shows an example of such an optical multiplexing system. In this example, control is switched, at fixed intervals of time $T_0$, between optical modulators, $201_1$, $201_2$, ..., arranged in parallel and to which optical signals of different wavelengths, $\lambda_1$, $\lambda_2$, ..., are input. More specifically, a plurality of Mach-Zehnder optical modulators, $201_1$, $201_2$, ..., are arranged in parallel; first optical signals of different wavelengths $\lambda_1$, $\lambda_2$, ... are modulated by the respective optical modulators, $201_1$, $201_2$, ..., and then, the modulated signals are combined together. Only one low-frequency generator $204$ is provided that generates a single low frequency $f_0$ which is supplied via the selector switch $209$ to the drive circuits, $203_1$, $203_2$, ..., each of which is switched into operation in turn at fixed intervals of time $T_0$. Each drive circuit thus switched into operation in turn at fixed time intervals performs low-frequency amplitude modulation with the single frequency $f_0$.

On the output side of the optical modulators, $201_1$, $201_2$, ..., the combined output light is split by the optical coupler $205$ and converted by the optical detector $206$ into an electrical signal which is supplied to the phase-detection/bias-supply circuit $202$. The phase-detection/bias-supply circuit $202$ phase-detects the low-frequency component in the electrical signal converted from the separated output light with the single low-frequency $f_0$ signal from the low-frequency oscillator $204$, and generates a bias voltage for output.

The output of the phase-detection/bias-supply $202$ is supplied via the selector switch $210$ to the optical modulators $201_1$, $201_2$, ... The selector switch $210$, which operates in interlocking fashion with the selector switch $209$, controls the operating point drift by supplying the bias voltage only to the optical modulator whose associated drive circuit is performing low-frequency amplitude modulation. During that time, the operating points of the other optical modulators are held fixed.

This example, as with the example of FIG. 65, is effective for wavelength multiplexing, and has an additional advantage that control can be accomplished using one phase-detection/bias-supply circuit.

Figure 67:
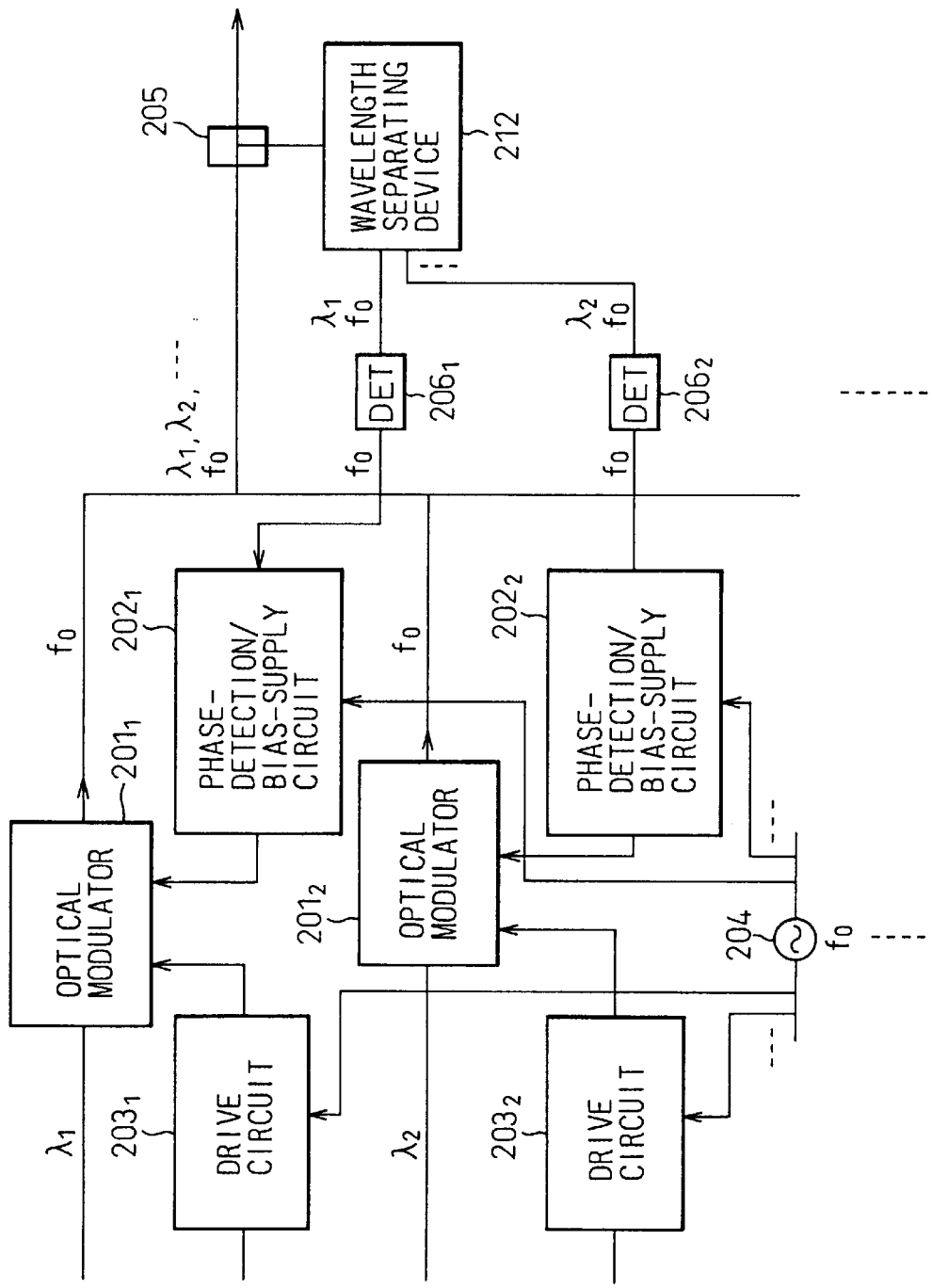
FIG. 67 is a block diagram showing another example of the optical multiplexing transmission system having a drift compensation circuit of the present invention.

FIG. 67 shows another example of the optical multiplexing system according to the present invention. In this example, optical outputs from the optical modulators, $201_1$, $201_2$, ..., arranged in parallel and to which optical signals of different wavelengths $\lambda_1$, $\lambda_2$, ..., are input, are combined together to produce combined output light which is then separated by a wavelength separating device $212$ into the signals of wavelengths, $\lambda_1$, $\lambda_2$, ..., as originally supplied from the optical modulators $201_1$, $201_2$, ..., before converting them to electrical signals. That is, a plurality of Mach-Zehnder optical modulators, $201_1$, $201_2$, ..., are arranged in parallel to construct a system in which optical signals of respectively different wavelengths, $\lambda_1$, $\lambda_2$, ..., are wavelength-multiplexed. Only one low-frequency oscillator $204$ is provided that generates a single low frequency $f_0$. The drive circuits, $203_1$, $203_2$, ..., perform low-frequency amplitude modulation with the single frequency $f_0$.

Optical outputs from the optical modulators, $201_1$, $201_2$, ..., are combined together to produce wavelength-multiplexed output light. This wavelength-multiplexed output light is split by the optical coupler $205$ and is passed through the wavelength separating device $212$ for separation into the optical signals of wavelengths $\lambda_1$, $\lambda_2$, ... These separated optical signals are fed to the optical detectors, $206_1$, $206_2$, ..., for conversion into electrical signals which are supplied to the phase-detection/bias-supply circuits $202_1$, $202_2$, ..., respectively. The phase-detection/bias-supply circuits $202_k$ phase-detects the low-frequency component in the wavelength-separated signal with the low-frequency $f_0$ signal, and thus detects an operating point drift and controls the operating point of the corresponding optical modulator $201_k$. This control is performed simultaneously in all the optical modulators $201_1$, $201_2$, ... This example, as with the example of FIG. 65, is effective for wavelength multiplexing, and is particularly applicable where light wavelength provides better separability.

Figure 68:
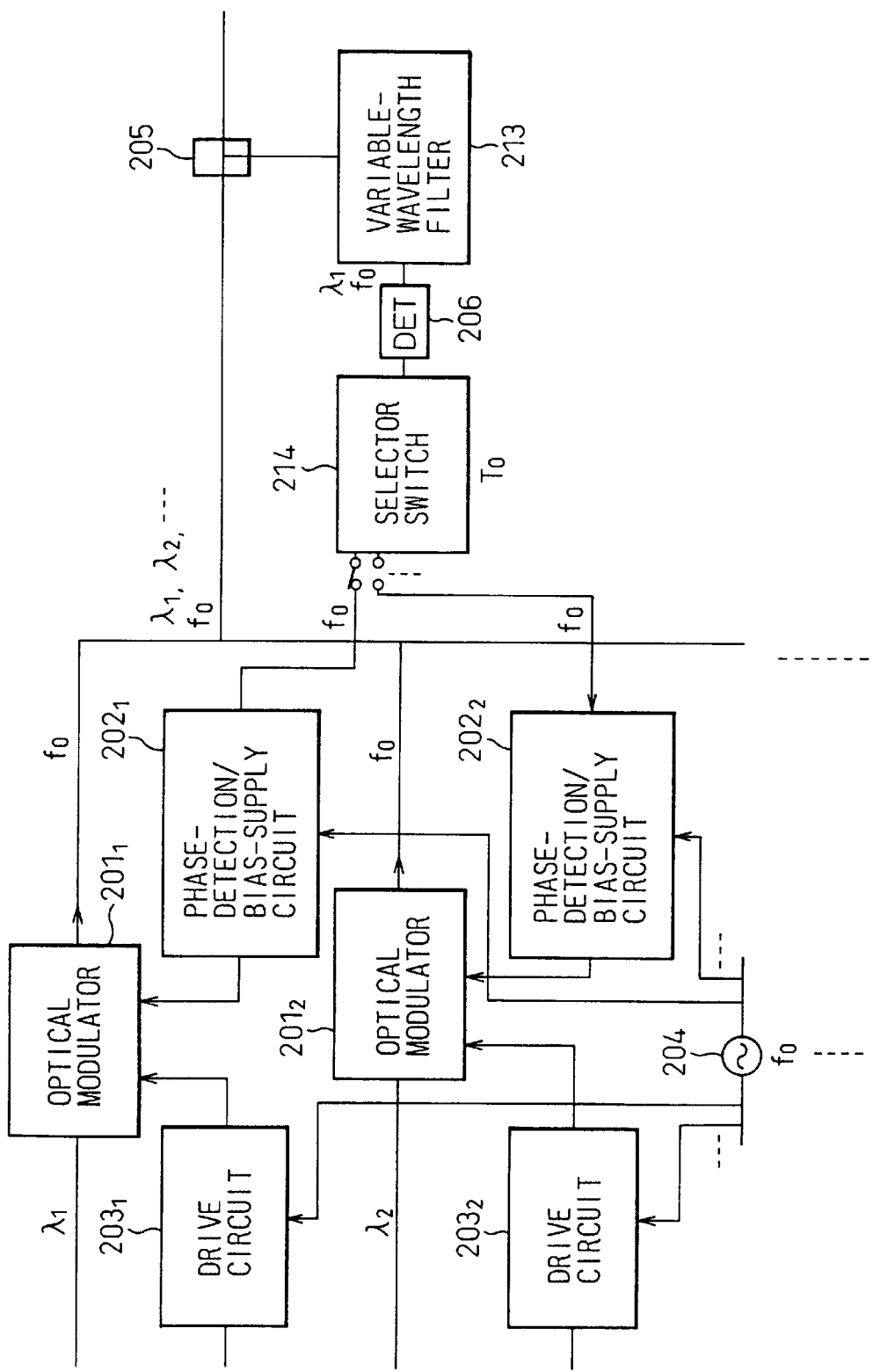
FIG. 68 is a block diagram showing another example of the optical multiplexing transmission system having a drift compensation circuit of the present invention.

FIG. 68 shows another example of the optical multiplexing system according to the present invention. In this example, control is switched, at fixed intervals of time $T_0$, between optical modulators, $201_1$, $201_2$, ..., arranged in parallel and to which lights of different wavelengths, $\lambda_1$, $\lambda_2$, ..., are input, and using a tunable filter $213$ whose transmission wavelength varies with time, the wavelength component only of the optical modulator currently under control is extracted.

More specifically, a plurality of Mach-Zehnder optical modulators, $201_1$, $201_2$, ..., are arranged in parallel to construct a system in which optical signals of different wavelengths, $\lambda_1$, $\lambda_2$, ..., are wavelength-multiplexed. Only one low-frequency oscillator $204$ is provided that generates a single low frequency $f_0$. The drive circuits, $203_1$, $203_2$, ..., perform low-frequency amplitude modulation with the signal frequency $f_0$.

Optical outputs from the optical modulators, $201_1$, $201_2$, ..., are combined together to produce wavelength-multiplexed output light. This wavelength-multiplexed output light is split by the optical coupler $205$, passed through the tunable optical filter $213$, and converted by the optical detector $206$ into an electrical signal. The tunable optical filter $213$ is a filter whose transmission wavelength varies with time, and at any given time, extracts only one wavelength component for output. An output signal from the optical detector $206$ is supplied via a selector switch $214$ to phase-detection/bias-supply circuits, $202_1$, $202_2$, ..., each of which is switched into operation in turn at fixed intervals of time. The selector switch 214 operates in interlocking fashion with the tunable optical filter 213 so that when the tunable optical filter 213 is switched so as to transmit wavelength $\lambda_k$, the selector switch 214 is set so as to supply its output signal to the phase-detection/bias supply circuit $202_k$.

This phase-detection/bias-supply circuit $202_k$ phase-detects the low-frequency component in the optical/electrical converted signal with the low-frequency $f_0$ signal, and detects and controls the operating point drift of the optical modulator $201_k$ corresponding to the extracted wavelength $\lambda_k$. during that time, the operating points of the other optical modulators are held fixed.

This example, as with the example of FIG. 65, is effective for wavelength multiplexing, and is particularly applicable where wavelength selection using a tunable optical filter is easier than using other means. In this example, the drive circuits for performing low-frequency modulation need not be switched in sequence at fixed time intervals, but such switching may be performed to ensure clear separation of the low-frequency component appearing as a result of the operating point drift of each optical modulator.

Figure 69:
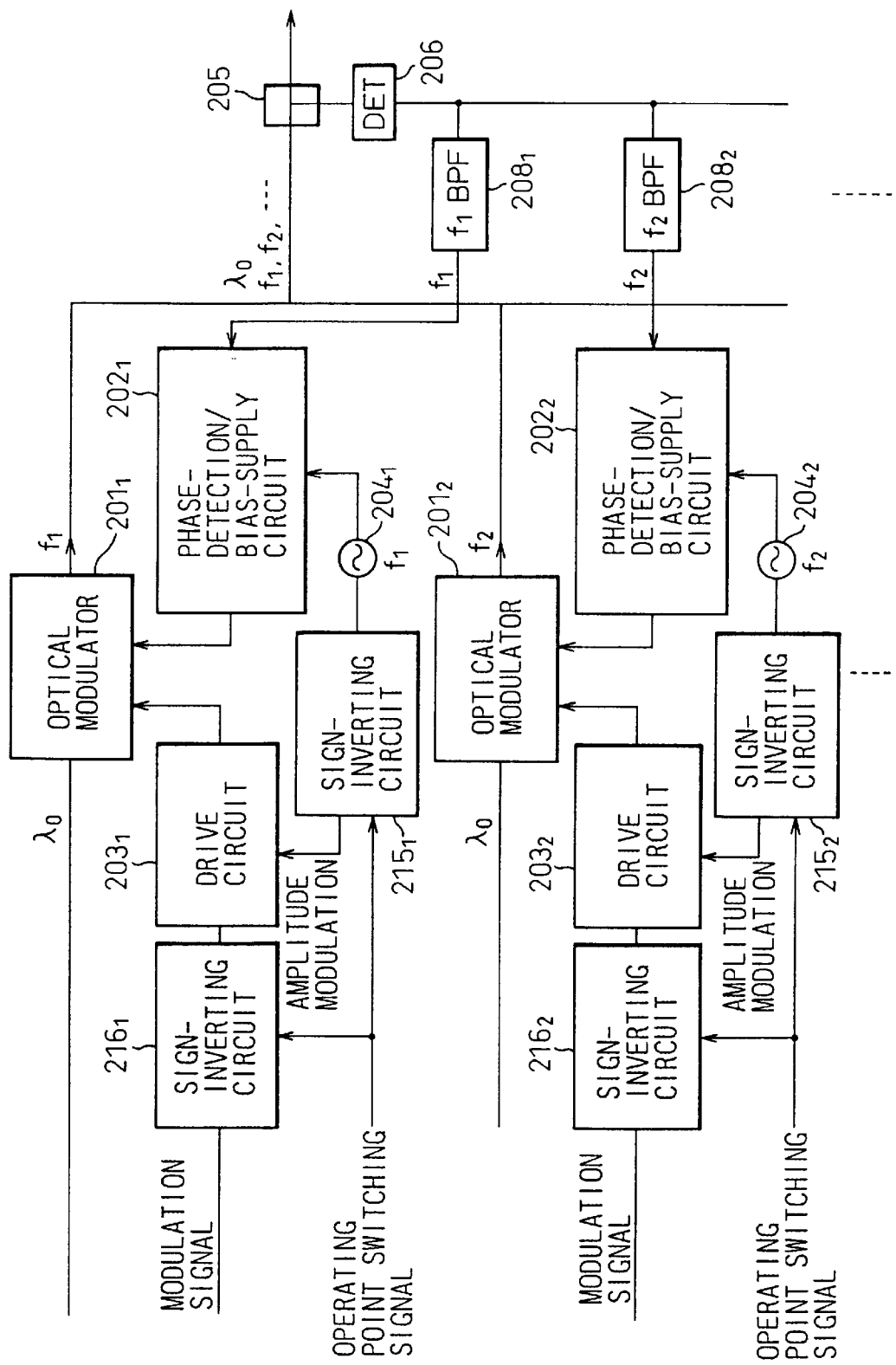
FIG. 69 is a block diagram showing another example of the optical multiplexing transmission system having a drift compensation circuit of the present invention.

FIG. 69 shows another example of the optical multiplexing system according to the present invention. The optical multiplexing system shown here is constructed by adding sign-inverting circuits $215_k$ and $216_k$, describe din Japanese Unexamined Patent Publication No. 4-140712, to the system shown in FIG. 61. As described with reference to FIGS. 20 and 21, in the Mach-Zehnder optical modulator the direction of prechirping can be changed from red shift to blue shift by changing the operating point from Vb1 to Vb2. When the wavelength of the signal light is in the normal dispersion region of the DSF, red shift is provided, and when it is in the abnormal dispersion region, blue shift is provided, to improve the waveform. The sign-inverting circuit $215_k$ changes the operating point from Vb1 to Vb2 by inverting, in accordance with an operating point switching signal, the polarity of the low-frequency signal being applied from the oscillator $204_k$ to the drive circuit $203_k$. When the operating point is changed to Vb2, the logic of the optical signal are reversed, so that the logic of the modulation signal is inverted by the sign-inverting circuit $216_k$ in synchronism with the switching operation of the sign-inverting circuit $215_k$. Instead of inverting the logic of the signal supplied from the oscillator $204_k$ to the drive circuit $203_k$, the logic of the signal supplied from the oscillator $204_k$ to the phase-detection/bias-supply circuit $202_k$, or the result of phase detection in the phase-detection/bias-supply circuit $202_k$, may be inverted. Furthermore, the switching of the operating point may be performed simultaneously for all the optical modulators $201_k$.

In the example of FIG. 69, sign-inverting circuits are added to the optical multiplexing system of FIG. 61, but the invention is not limited to this particular example. Rather it will be appreciated that the sign-inverting circuits can be added likewise to any of the optical multiplexing systems thus far described (FIGS. 62 to 68), in which case the switching operation of the sign-inverting circuits may be performed individually or together in interlocking fashion.

Changing the operating point by the sign-inverting circuit (operating-point shift circuit) can be implemented in several ways; for example, an external selector switch may be provided, or automatic switching may be performed in the system by checking the transmission characteristic, for example, at the receiving end. When transmitting at a wavelength near the zero dispersion wavelength of the fiber, the sign of wavelength dispersion during transmission can become positive or negative, depending on the variation of the zero dispersion wavelength of the fiber, the variation of the light source wavelength, etc. In such cases, it may be useful if the operating point in each optical modulator is changed independently. In the case of wavelength multiplexing, when the relationship of magnitude between the zero dispersion wavelength of the fiber and each signal light wavelength is already known, it may be useful if the operating points in the optical modulators having the same relationship of magnitude are changed together at a time. n the case of optical time-division multiplexing also, the chirping of the output light wavelength can be reversed by changing the operating points of the serially arranged optical modulators at the same time.

Next, a clock extraction technique in optical time-division multiplexing (OTDM) will be described.

Figure 70:
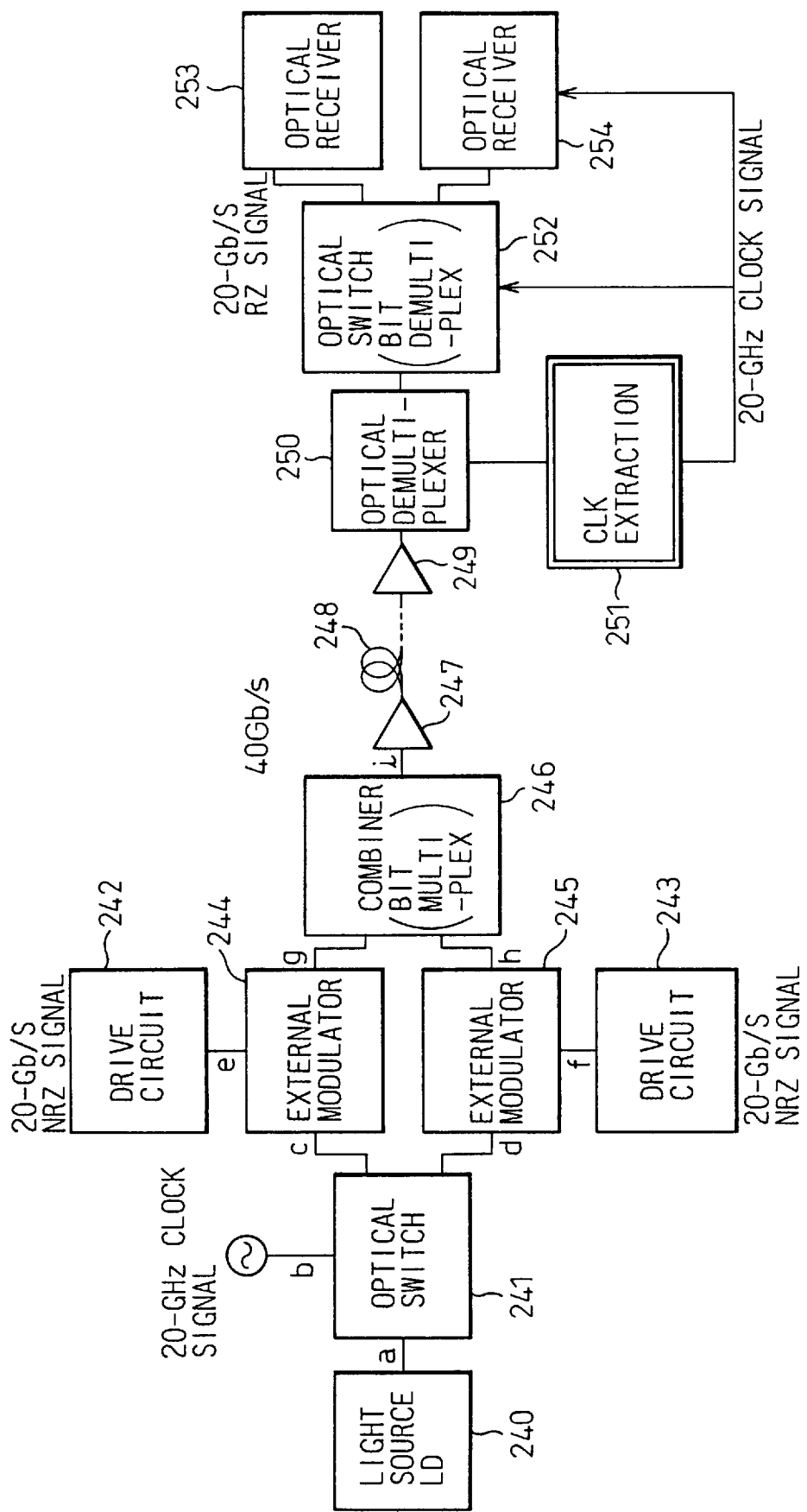
FIG. 70 is a block diagram showing an example of an optical time-division multiplexing system to which a technique of clock extraction according to the present invention is applied.
Figure 71:
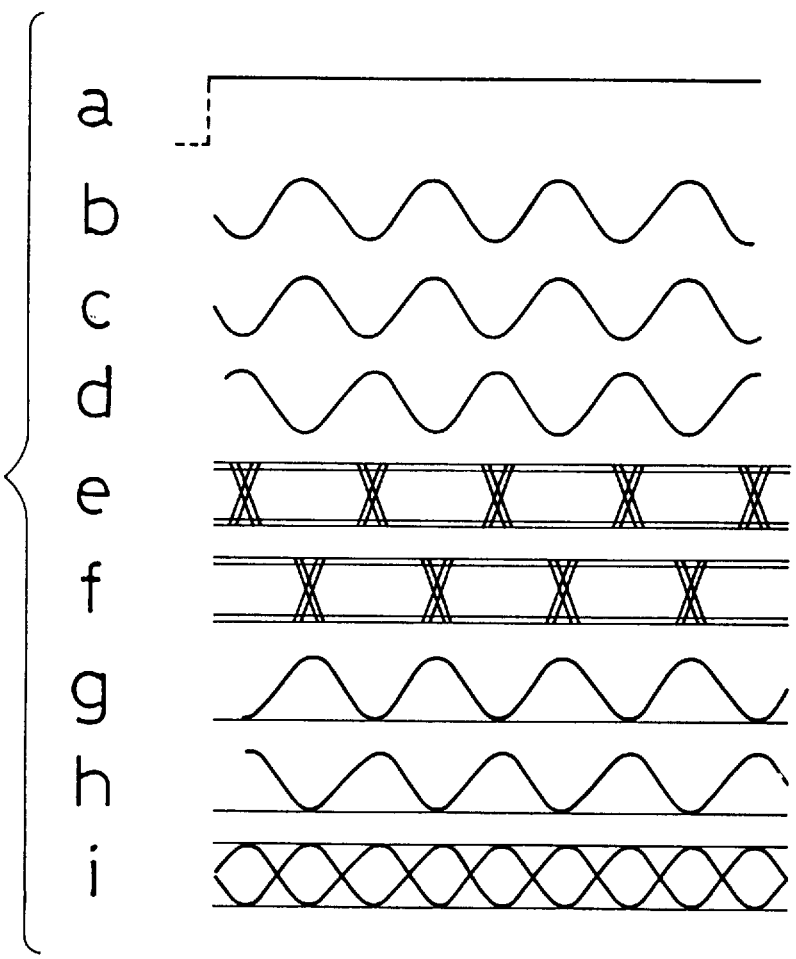
FIG. 71 is a timing chart for explaining the operation of the system shown in FIG. 70.

FIG. 70 hows an optical time-division multiplexing transmission system in which the clock signal extraction according to the invention is applied. This embodiment is concerned with a system configuration that achieves a transmission rate of 40 Gb/s by two-wave multiplexing. FIG. 71 is a timing chart for various signals used in the receiver of this system, showing the waveforms of the signals designated by reference signs, a to i, in FIG. 70.

First, using a one-input, two-output optical switch 241 that operates on a single 20-GHz sine wave b, 20-GHz optical signals, c an d, whose phases are opposite from each other, are created from an optical signal, a, output from a light source LD (laser diode) 240. The optical clock signals, c and d, are then applied to external modulators 244 and 245, respectively, where they are externally modulated by 20-Gb/s NRZ signals, e and f, producing 20-Gb/s RZ optical signals g and h. Then, these signals are bit-multiplexed (optical MUX) by a wave combiner 246 which outputs a 40-Gb/s optical multiplexed signal i. With this optical time-division multiplexing (OTDM) method, 40-Gb/s optical transmission can be achieved without requiring an ultra-wideband electronic device capable of 40 Gb/s.

In an alternative configuration, a short-pulse light source or an LD with a semiconductor optical modulator may be used instead of the light source LD 240 and optical switch 241 shown in FIG. 70, or the beam splitting optical switch 241 at the transmitting end may be replaced by a simple optical power splitting device or an external modulator which is driven by a sine wave.

At the receiving end, on the other hand, the 40-Gb/s optical multiplexed signal, i, must be demultiplexed into two 20-Gb/s RZ optical signal (optional DEMUX). Recent years have seen many proposals and experiments on optical DEMUX techniques using ultra-fast PLLs utilizing nonlinear effects such as four-wave mixing and cross-phase modulation (XPM), but any of the proposed techniques requires large-scale circuitry and furthermore, there are stability problems yet to be overcome.

Figure 82:
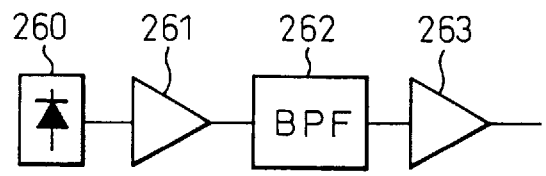
FIG. 82 is a block diagram showing the details of a clock extraction circuit.

The simplest method that can be considered is therefore by performing bit-demultiplexing alternately on a bit-by-bit basis using a one-input, two-output optical switch such as the one used in the transmitter shown in FIG. 70. In FIG. 70, the optical multiplexed signal received from the transmission line 240 is input to a bit-demultiplexing optical switch 252 via an optical preamplifier 249, while part of it is separated by an optical coupler 250 and input to a clock extraction circuit 251. In the clock extraction circuit 251, as shown in FIG. 82 for example, the input signal is first converted to electrical form by an optical detector 260, and then a clock signal is directly extracted using a narrowband electrical filter (dielectric resonance filter, SAW filter, etc.)

262. The extracted clock signal is applied to the optical switch 252 as a signal for providing bit-demultiplexing timing. In synchronism with this clock signal, the optical switch 252 demultiplexes the received 40-Gb/s optical multiplexed signal, i, into two 20-Gb/s RZ optical signals (optical DEMUX) and supplies them to respective optical receivers 253 and 254.

In this receiver configuration, however, a 20-GHz clock signal synchronized to the data main signal is required not only for the identification of the sign but for the optical switching operation of the optical switch 252; therefore, the received optical multiplexed signal needs to contain a 20-GHz component.

Figure 72:
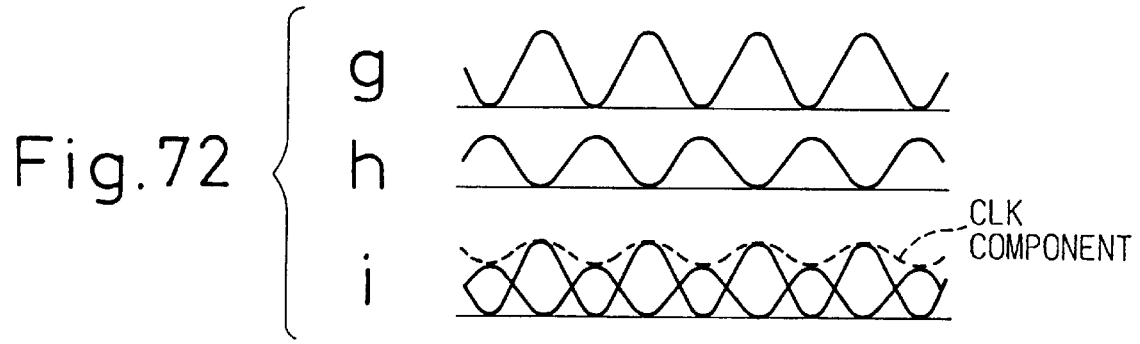
FIG. 72 is a waveform diagram for explaining the clock extraction technique of the present invention.

In the present invention, a 20-GHz component of a magnitude sufficient for the extraction of the clock signal is carried on the transmitted optical multiplexed signal, i, in the following way. That is, as shown in FIG. 72, at the transmitter the two RZ signals, g and h, are generated with different amplitudes, and the clock signal is extracted from the resulting 40-GHz optical multiplexed signal i. As shown, the optical multiplexed signal, i, thus produced carries a 20-GHz clock signal component of sufficient magnitude as shown by a dotted line in the figure.

The following describes various methods for providing the optical signals with different amplitudes which are multiplexed to produce an optical multiplexed signal containing a clock signal component. For convenience of explanation, the following description deals with two cases: case A where separate light source LDs are used whose optical outputs are first modulated externally and then combined together, and case B where output light from one light source LD is split and the resulting signals are combined after external modulation, as in the example of FIG. 70.

Figure 74:
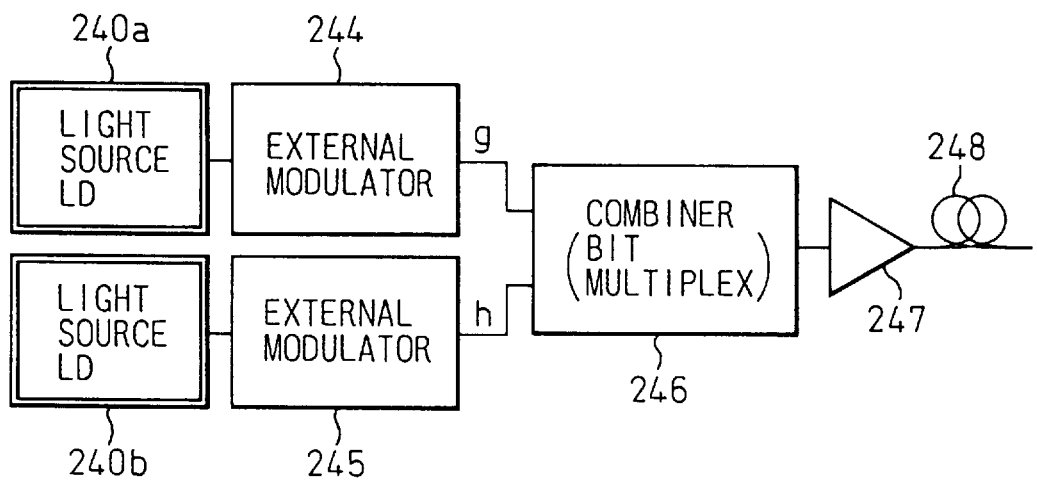
FIG. 74 is a block diagram showing an example of an optical transmitter according to the present invention.

FIG. 74 shows one example of case A. Separate light source LDs are provided that supply respective optical signals to external modulators 244 and 245; if these light source LDs, 240a and 240b, are set to different output powers, the optical signals, g and h, to be multiplexed can be provided with different amplitudes.

Figure 75:
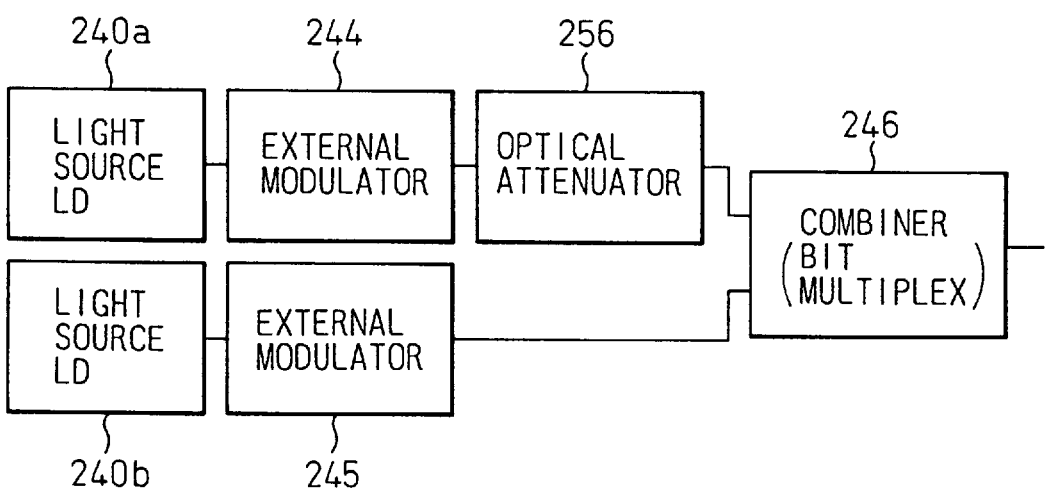
FIG. 75 is a block diagram showing another example of the optical transmitter according to the present invention.

FIG. 75 shows another example of case A. As shown, by inserting an optical attenuator 256 in one or other of the light paths leading from the light source LDs to the wave combiner 246, the optical signals, g and h, to be multiplexed can be provided with different amplitudes. In the illustrated example, the optical attenuator 256 is inserted between the external modulator 244 and the wave combiner 246, but it may be inserted between the light source LD 240a and the external modulator 244. Of course, the optical attenuator 256 may be inserted in the light path where the external modulator 245 is located. It would be possible to use an optical amplifier instead of the optical attenuator 256. Furthermore, these methods are applicable not only to external modulation but also to LD direct modulation or direct modulation using a modulator-incorporated LD.

Figure 76:
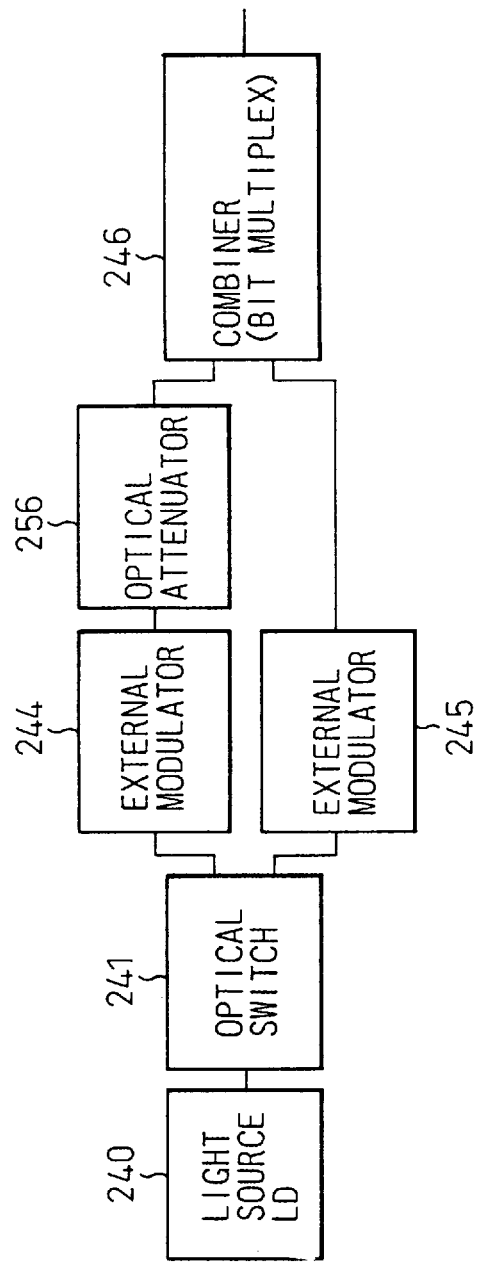
FIG. 76 is a block diagram showing another example of the optical transmitter according to the present invention.

FIG. 76 shows an example in which the method of FIG. 75 is applied to case B. This example of case B is identical to the foregoing example, except that only one light source LD is used, and therefore, detailed explanation is not given here.

In either case A or B, in an optical time-division multiplexing transmission system using external modulation, light intensity amplitude differences between a plurality of optical signals can be realized by using external modulators, 244 and 245, having different insertion losses.

Figure 77:
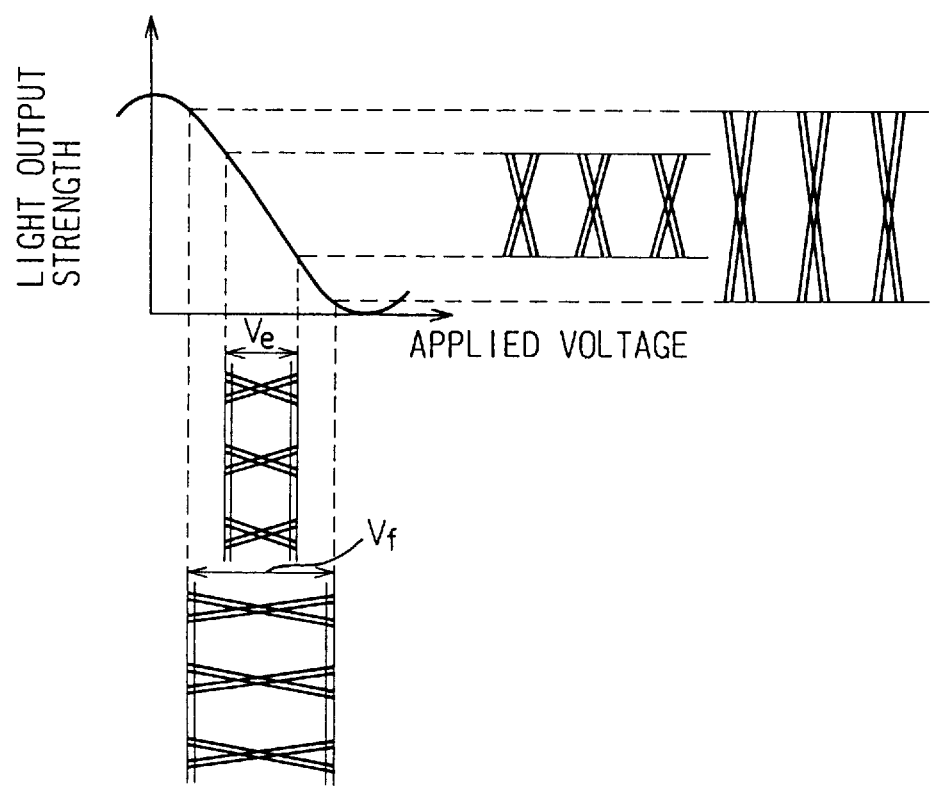
FIG. 77 is a diagram for explaining how light output strength changes when the amplitude of a drive voltage for a Mach-Zehnder optical modulator is changed.
Figure 78:
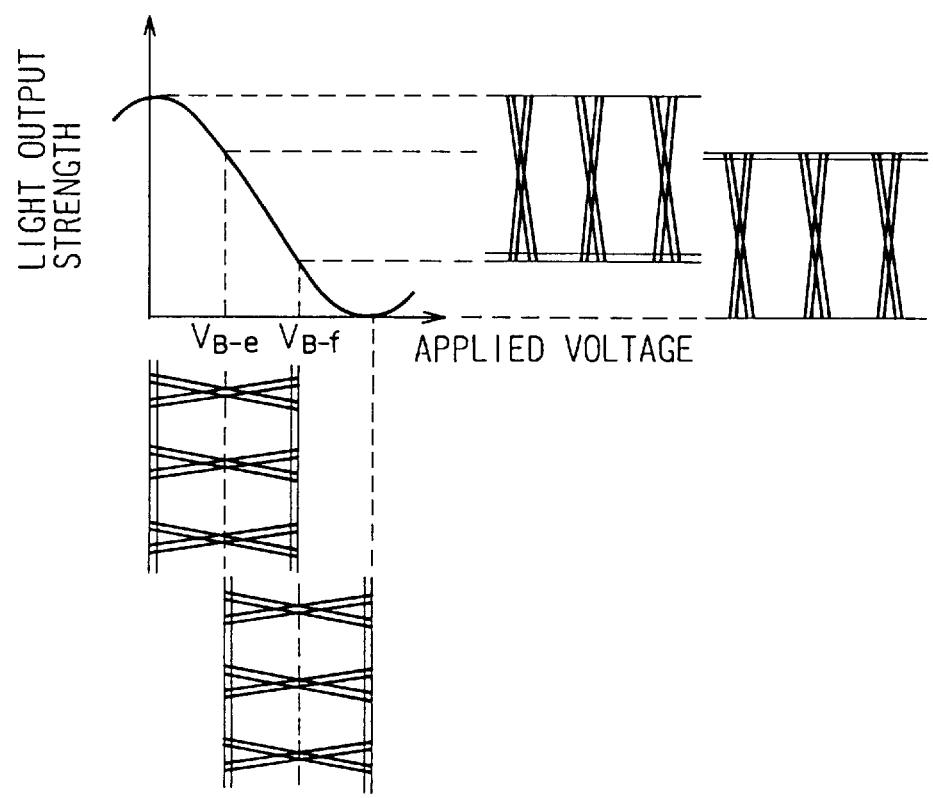
FIG. 78 is a diagram for explaining how light output strength changes when the bias of a drive voltage for a Mach-Zehnder optical modulator is changed.

When a Mach-Zehnder optical modulator is used as the external modulator, the amplitude of the output light can be changed by changing the amplitude of the voltage for driving the optical modulator or by changing its bias point. FIGS. 77 and 78 are diagrams for explaining how this can be achieved. FIG. 77 shows how the light output strength changes when the amplitude value of the drive voltage (applied voltage) is changed from Ve to Vf. FIG. 78 shows how the light output intensity changes when the bias voltage of the drive voltage is changed from VB-e to VB-f. In this way, as long as a Mach-Zehnder light modulator is used for each external modulator, the output light intensities of the external modulators 244 and 245 can be changed by changing the drive voltage amplitude or the bias voltage.

Furthermore, in case B, it is also possible to provide the optical outputs of the external modulators with different amplitudes by setting the split ratio of the output light of the light source LD 240, in the optical switch 241 (or a passive optical power splitting device that can be used in its place), to a value other than 1:1.

Figure 79:
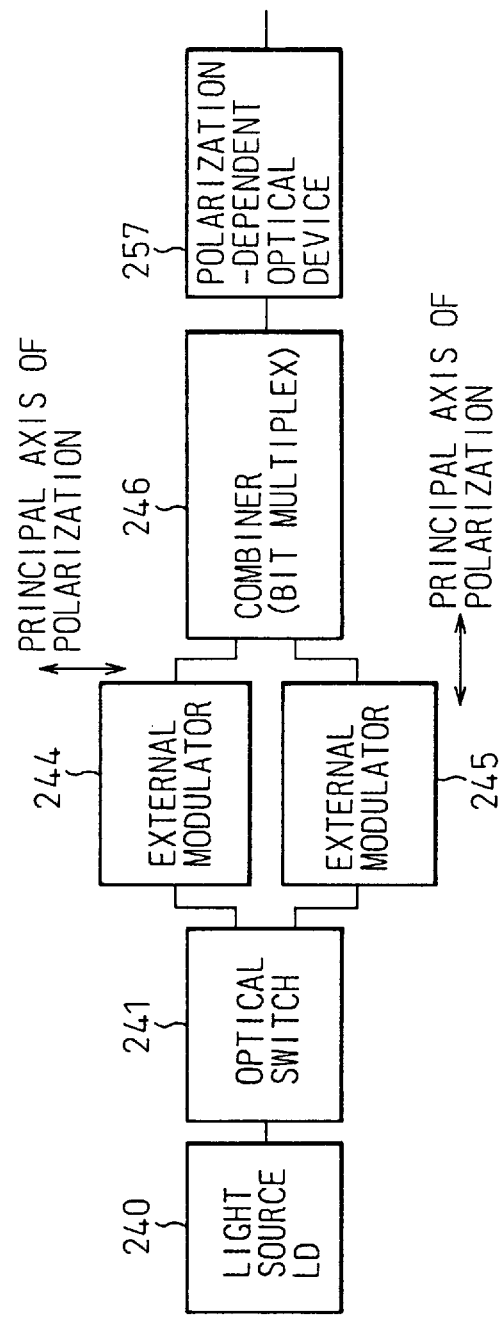
FIG. 79 is a block diagram showing another example of the optical transmitter according to the present invention.

FIG. 79 shows another example of case B. In this example, the external modulators 244 and 245 are set so that their optical outputs are linearly polarized with their principal axes of polarization perpendicular to each other. When optical-multiplexing the two RZ signals having different polarization conditions, for example, with their principal axes of linear polarization at right angles to each other, as described above, if a polarization-dependent optical device 257 is inserted in a light path after the optical multiplexing in the transmitter (wave combiner 246), the multiplexed two optical signals will emerge from the optical device 257 with their amplitudes of light intensity different from each other, thus producing an optical multiplexed signal with its light amplitude varying between alternate bits.

Instead of inserting the polarization-dependent optical device 257 as described above, it would be possible to replace the wave combiner by a wave combiner whose combining ratio is dependent on polarization either structurally or by the incident polarization axes of the optical signal.

Figure 80:
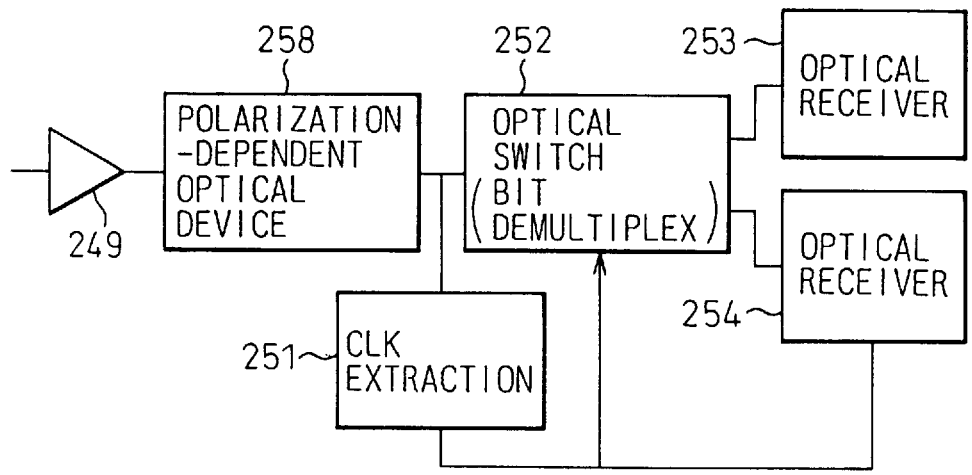
FIG. 80 is a block diagram showing an example of an optical receiver according to the present invention.
Figure 81:
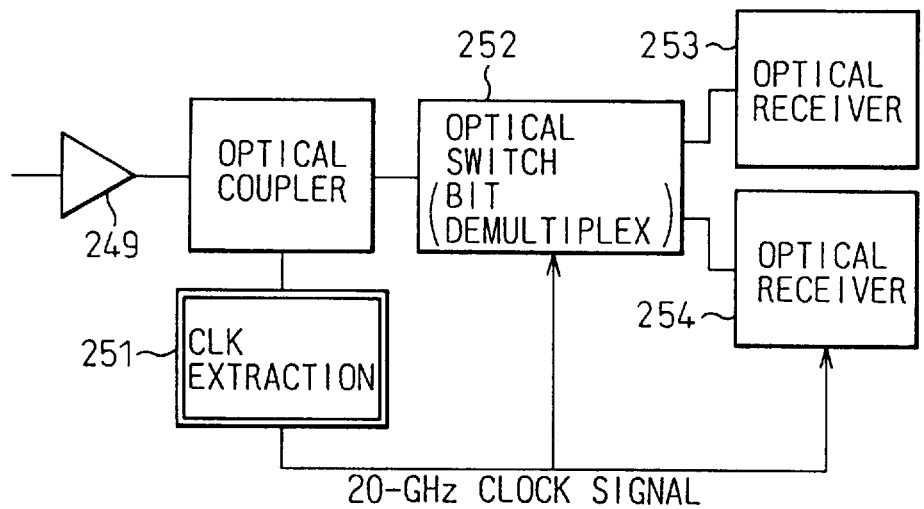
FIG. 81 is a block diagram showing another example of the optical receiver according to the present invention.

Furthermore, in a transmission system in which the polarization relationship between alternate bits at the transmitter is maintained to a certain degree through to the receiver, a polarization-dependent optical device 258 may be inserted before the optical demultiplexing in the optical switch 252 in the receiver, as shown in FIG. 80.

Figure 73:
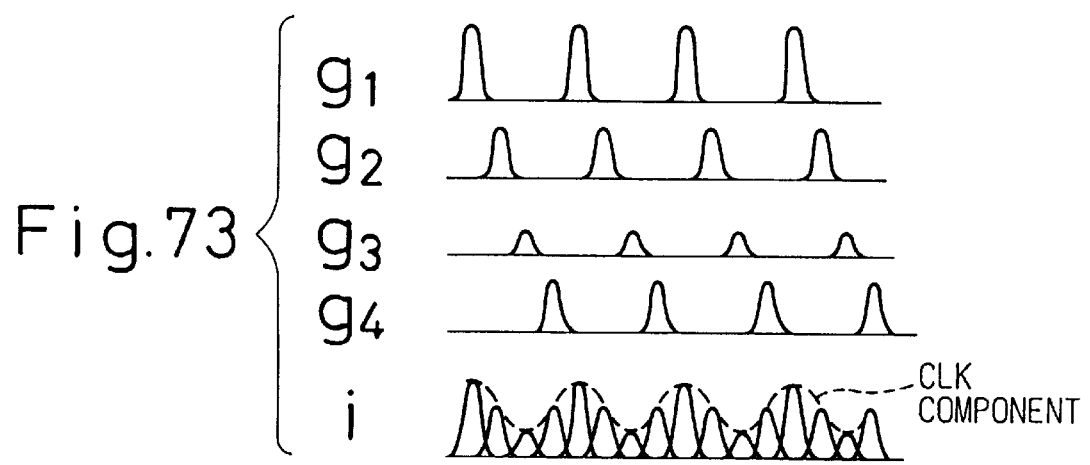
FIG. 73 is a waveform diagram for explaining another example of the clock extraction technique of the present invention.

This embodiment has described two-wave multiplexing having a difference in light intensity amplitude between alternate bits, but an N-wave multiplexing configuration is also possible. For example, in the case of a four-wave optical multiplexing transmission system also, a clock signal can be extracted from an optical multiplexed signal. FIG. 73 shows an example of such four-wave multiplexed are designated as g1, g2, g3, and g4, amplitude differences are set so that the relation g1>g2=g4>g3 holds. When these signals are combined to produce an optical multiplexed signal i, the optical multiplexed signal, i, will contain a clock signal component as shown by a dotted line in the figure. Further, in this example, it is possible to produce a multiplexed signal containing a plurality of clock signal components, depending on how the amplitude differences are set.

Another characteristic of the invention lie sin the following point. That is, in conventional optical transmission systems at transmission rates up to 10 Gb/s, clock extraction is performed by splitting the main signal in the electrical stage after detecting (converting to electrical form) the signal light. By contrast, in the present invention, using one of the above-described methods a clock signal is extracted from the optical multiplexed signal separated from the main signal in the optical stage, and optical demultiplexing is performed using the thus extracted clock signal.

Another problem that arises in the multiplexing transmission system is that it is generally required that the correspondence between the channels at the transmitter before multiplexing and the channels at the receiver after demultiplexing be predetermined in fixed fashion. For example, in FIG. 70, it is required that the signal supplied to the drive circuit 242 be always received by the optical receiver 253 and the signal supplied to the drive circuit 243 be always received by the optical receiver 254. However, in conventional OTDM transmission systems, since channel identification is not done at the receiver, the correspondence may change each time the system is started, making transmission line management impossible.

Figure 83:
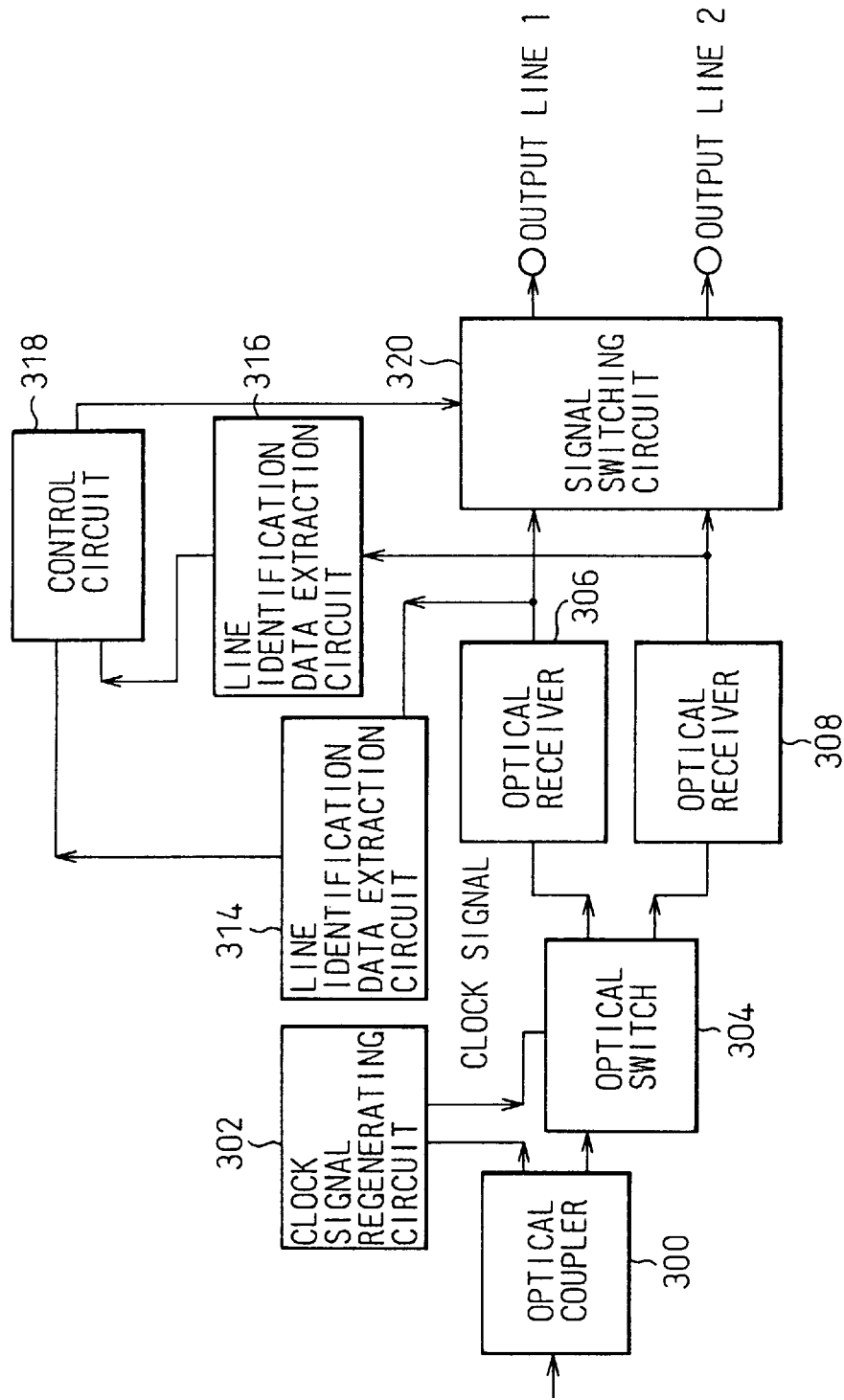
FIG. 83 is a block diagram showing an example of an optical demultiplexer according to the present invention.

FIG. 83 shows the configuration of an optical demultiplexser suitable for use at the receiving end of the OTDM communication system according to the present invention. The optical demultiplexer comprises an optical coupler 300 for splitting the received optical signal into two signals, a clock signal regenerating circuit 302 for regenerating a clock signal from one of the splitted signals, an optical switch 304 for separating the received optical signal as optical signal corresponding to each optical signal channel by using the regenerated clock signal, and two optical receivers, 306 and 308, each for recovering data from the optical signal on each separated channel. This configuration is fundamentally the same as that of the receiving section of the system shown in FIG. 70.

Figure 84:
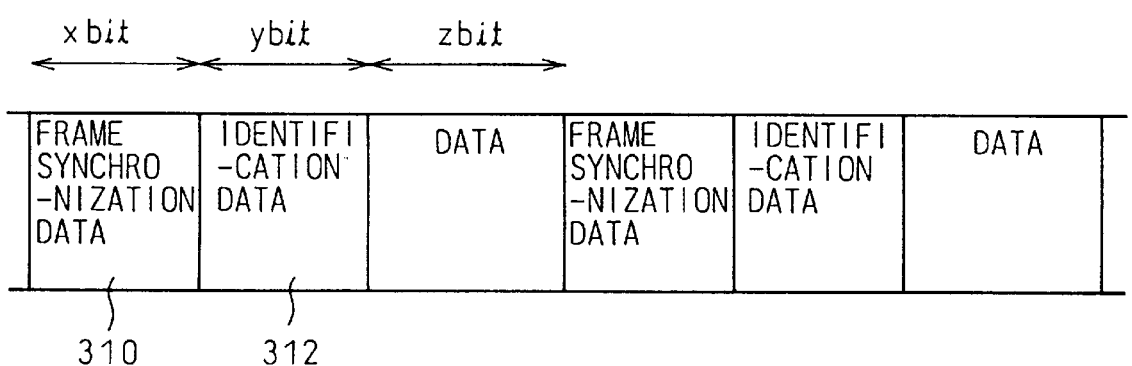
FIG. 84 is a diagram showing an example of a transmission data format containing channel identification data.

Data on each optical signal channel is structured, for example, in the format shown in FIG. 84. Data on each optical signal channel are optically multiplexed by bit-interleaving, and transmitted from the transmitter. In FIG. 84, reference numeral 310 indicates frame synchronization data used to establish frame synchronization at the optical receiver 306 or 308, and 312 designates identification data for identifying the channel. Line identification data extraction circuits, 314 and 316, extract the identification data 312; in accordance with the identification data extracted by the line identification data extraction circuits 314 and 316, a control circuit 318 controls a signal switching circuit 320 to control the connection in the signal switching circuit 320 so that the data intended for an output line 1 is output onto the output line 1 and the data for an output line 2 is output onto the output line 2. Input signals to the line identification data extraction circuits 314 and 316 may be derived from the outputs of the signal switching circuit 320. The control circuit 318 is easily implemented using a microprocessor.

Figure 85:
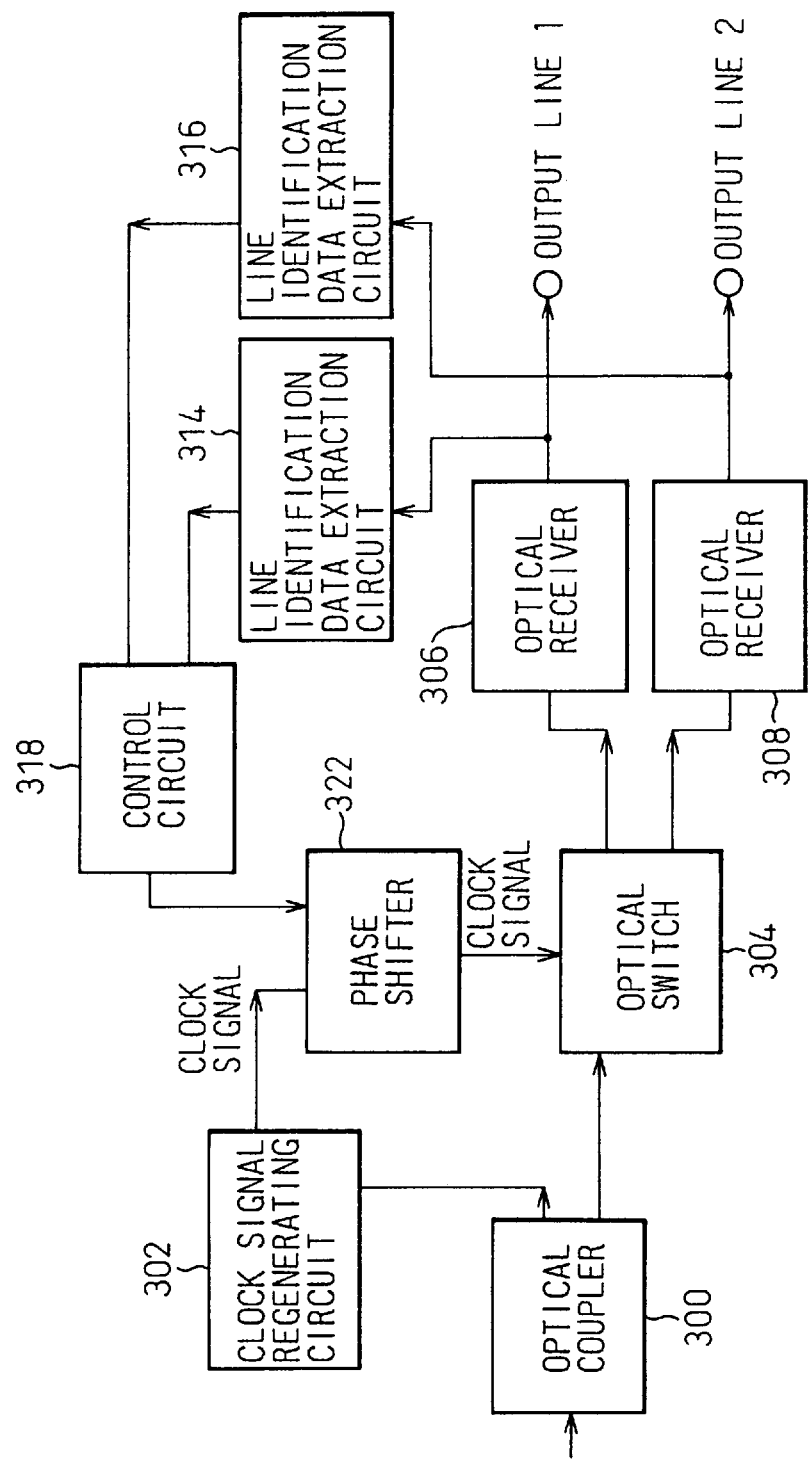
FIG. 85 is a block diagram showing another example of an optical demultiplexer according to the present invention.

In the optical demultiplexer shown in FIG. 85, instead of switching the output connection in each optical receiver the phase of the clock signal applied to the optical switch 304 is changed by controlling a phase shifter 322, thereby essentially achieving the same effect as connection switching. In the case of two-wave multiplexing, switching between the connections can be accomplished essentially by shifting the phase of the clock signal by 180°.

Figure 86:
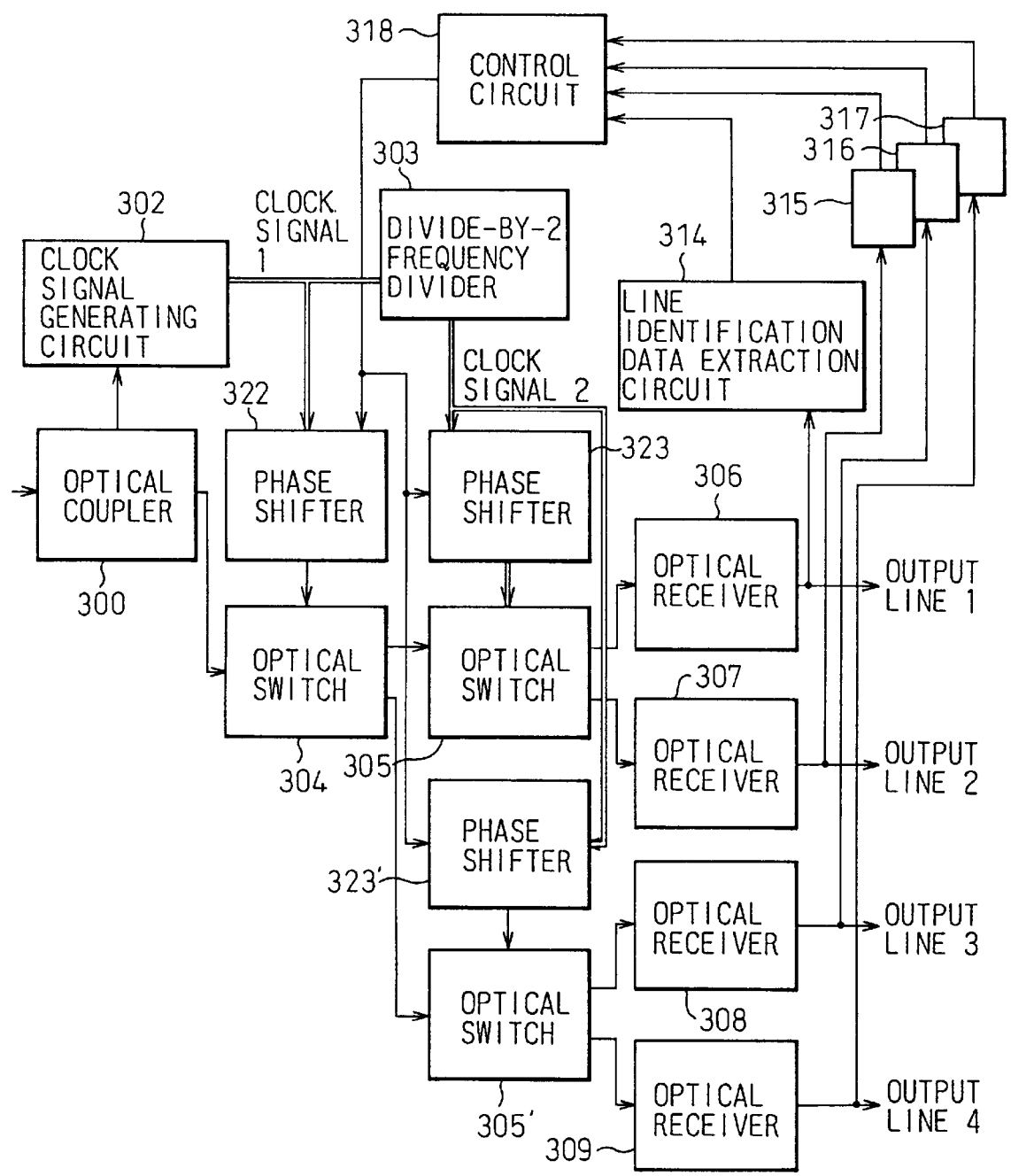
FIG. 86 is a block diagram showing another example of an optical demultiplexer according to the present invention.
Figure 115:
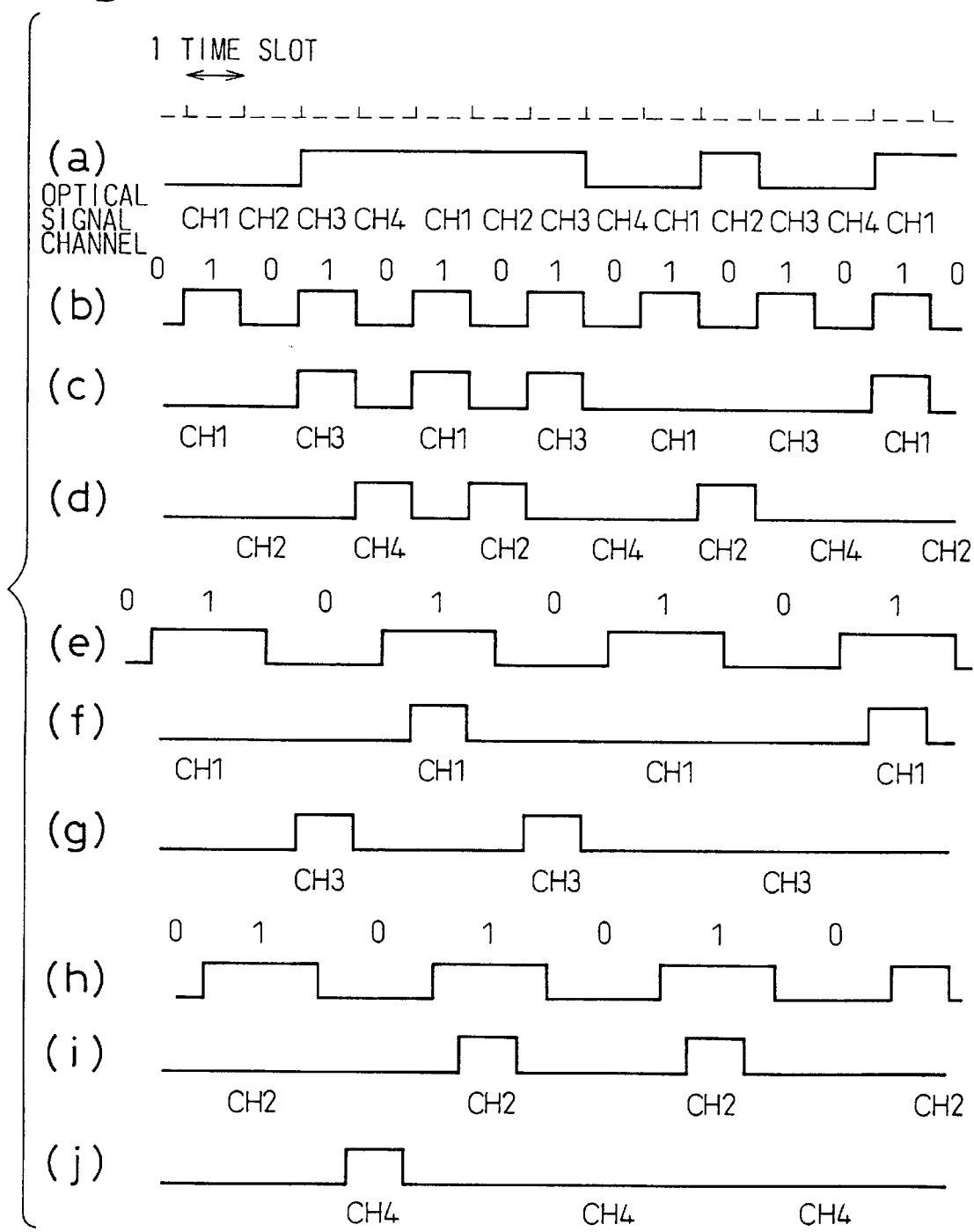
FIG. 115 is a timing chart explaining an operation of the circuit of FIG. 86.

FIG. 86 shows an example in which the optical demultiplexer of FIG. 85 is expanded from the two-channel to the four-channel configuration. The clock signal reconstructed by the clock signal generating circuit 302 is supplied to the optical switch 304 via the phase change 322. The clock signal is also supplied to a divide-by-2 frequency divider 303 where it is divided by 2, and the divided signal is then supplied to optical switches 305 and 305' via phase changes 323 and 323', respectively. Assuming that four-channel optical signals, CH1 to CH4, are multiplexed in the order of CH1, CH2, CH3, and CH4, as shown n part (a) of FIG. 115, since the optical switch 304 is switched for each time slot by a clock signal shown in part (b) of FIG. 115, CH1 and CH3 are output from one output as shown in part (c) of FIG. 115 and CH2 and CH4 are output from the other output as shown in part (d) of FIG. 115 in alternating fashion. Since the optical switches 305 and 305' are each switched for every two time slots by a clock signal shown in part (e) and part (h) of FIG. 115, CH1 and CH3 are separated as shown in part (f) and (g) of FIG. 115 and CH2 and CH4 are separated as shown in part (i) and part (j) of FIG. 115, respectively. In accordance with the identification data extracted by the line identification data extraction circuits 314 to 317, the control circuit 318 controls the phase shifters 322, 323, and 323', for example, in such a manner that CH1 is output from output line 1, CH2 from output line 2, CH3 from output line 3, and CH4 from output line 4.

Figure 87:
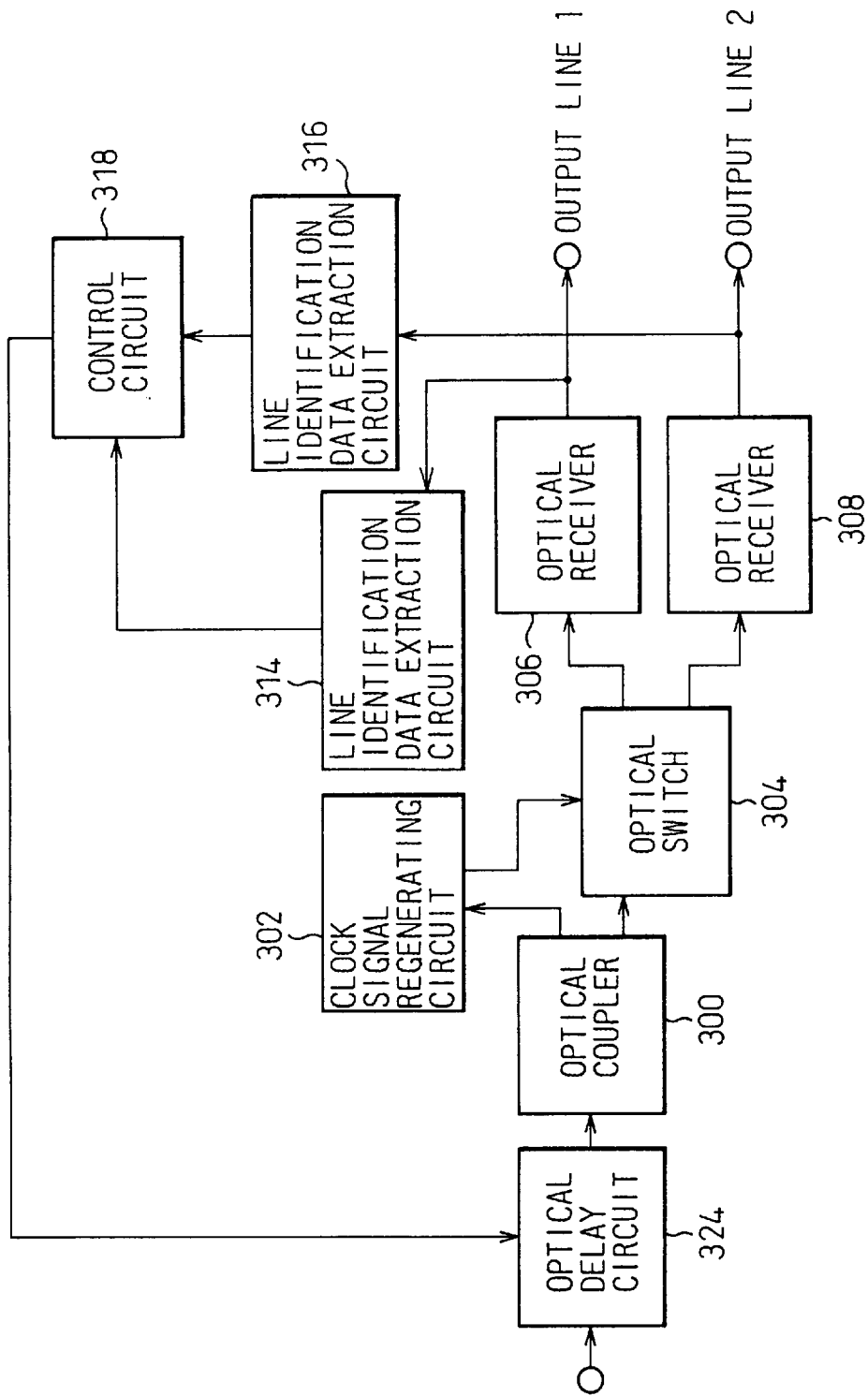
FIG. 87 is a block diagram showing another example of an optical demultiplexer according to the present invention.
Figure 88:
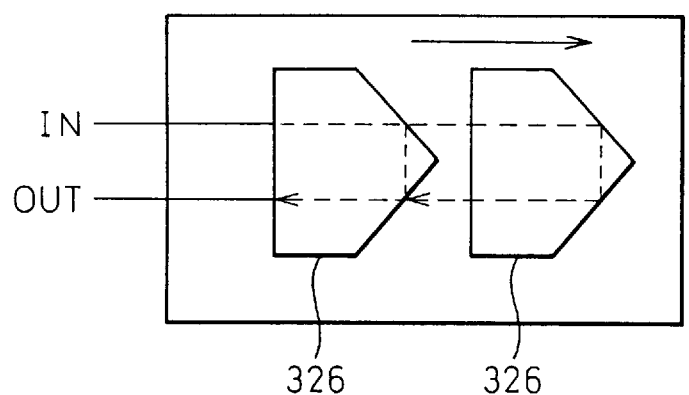
FIG. 88 is a diagram showing an example of an optical delay circuit.

While the phase of the clock signal is shifted by 180° by the phase shifter 322 in FIG. 85, in the optical demultiplexer shown in FIG. 87 the optical signal before demultiplexing is delayed or advanced through an optical delay circuit 324 by the amount of time equivalent to a 180° phase shift of the clock signal. Instead of changing the phase of the clock signal, the same effect can be obtained by delaying or advancing the optical signal by the amount of time equivalent to it. The optical delay circuit 324 can be implemented using, for example, a corner cube 326, as shown in FIG. 88, which is moved by mechanical means to change the light path length.

Figure 89:
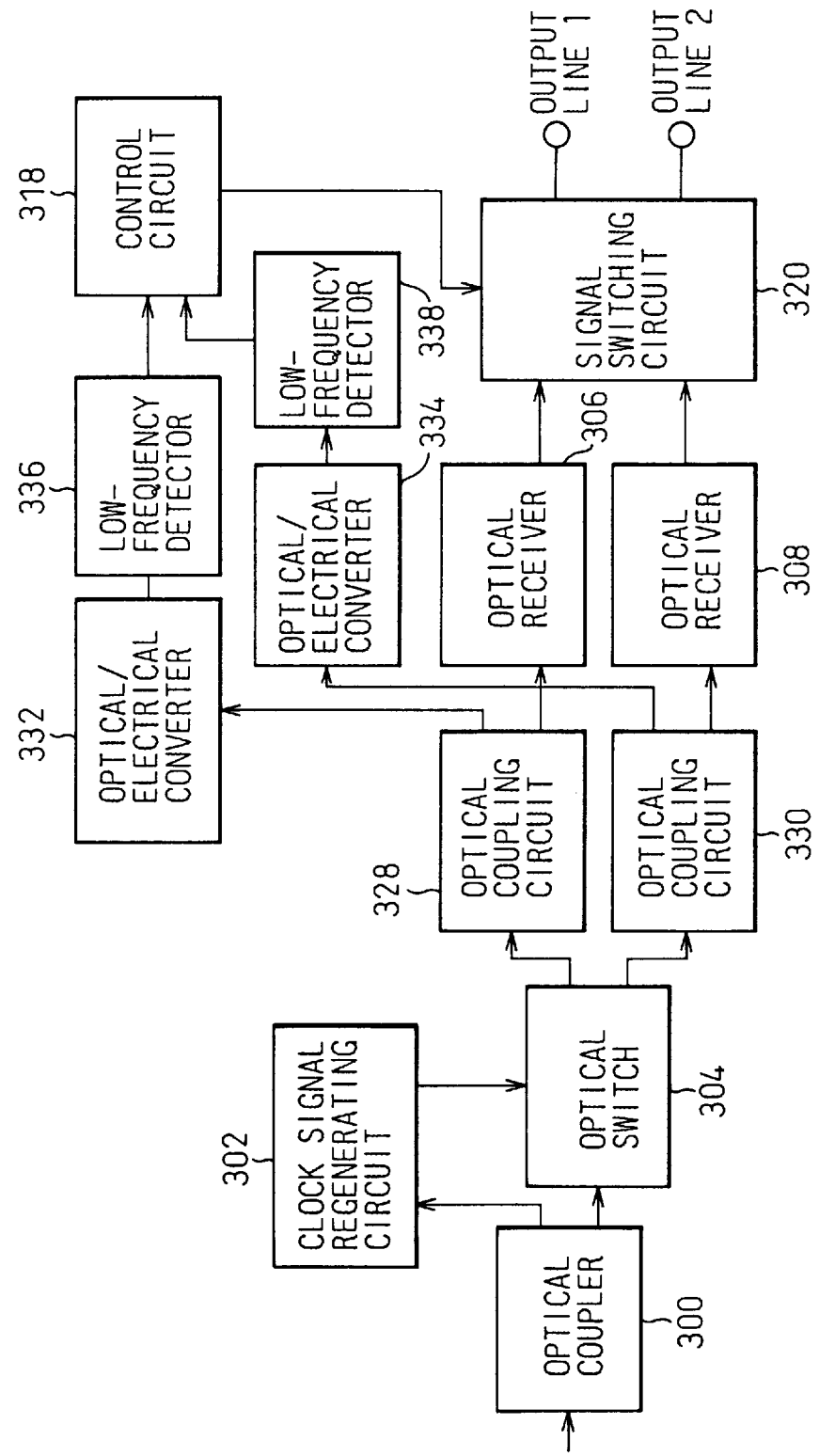
FIG. 89 is a block diagram showing another example of an optical demultiplexer according to the present invention.
Figure 90:
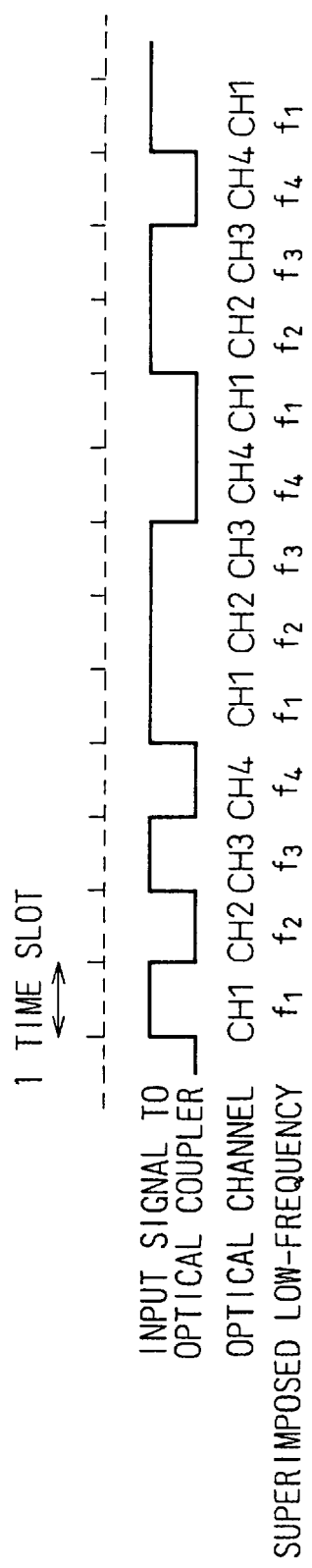
FIG. 90 is a diagram showing a low-frequency signal multiplexed on an optical signal.

FIG. 89 shows another example of the optical demultiplexer of the present invention. In the example of FIG. 89, low-frequency signals, $f_1$–$f_4$, of different frequencies for different channels, are superimposed, as shown in FIG. 90, for channel identification, instead of suing the identification data 312 in FIG. 84. FIG. 89 shows a case of two-wave multiplexing.

Figure 91:
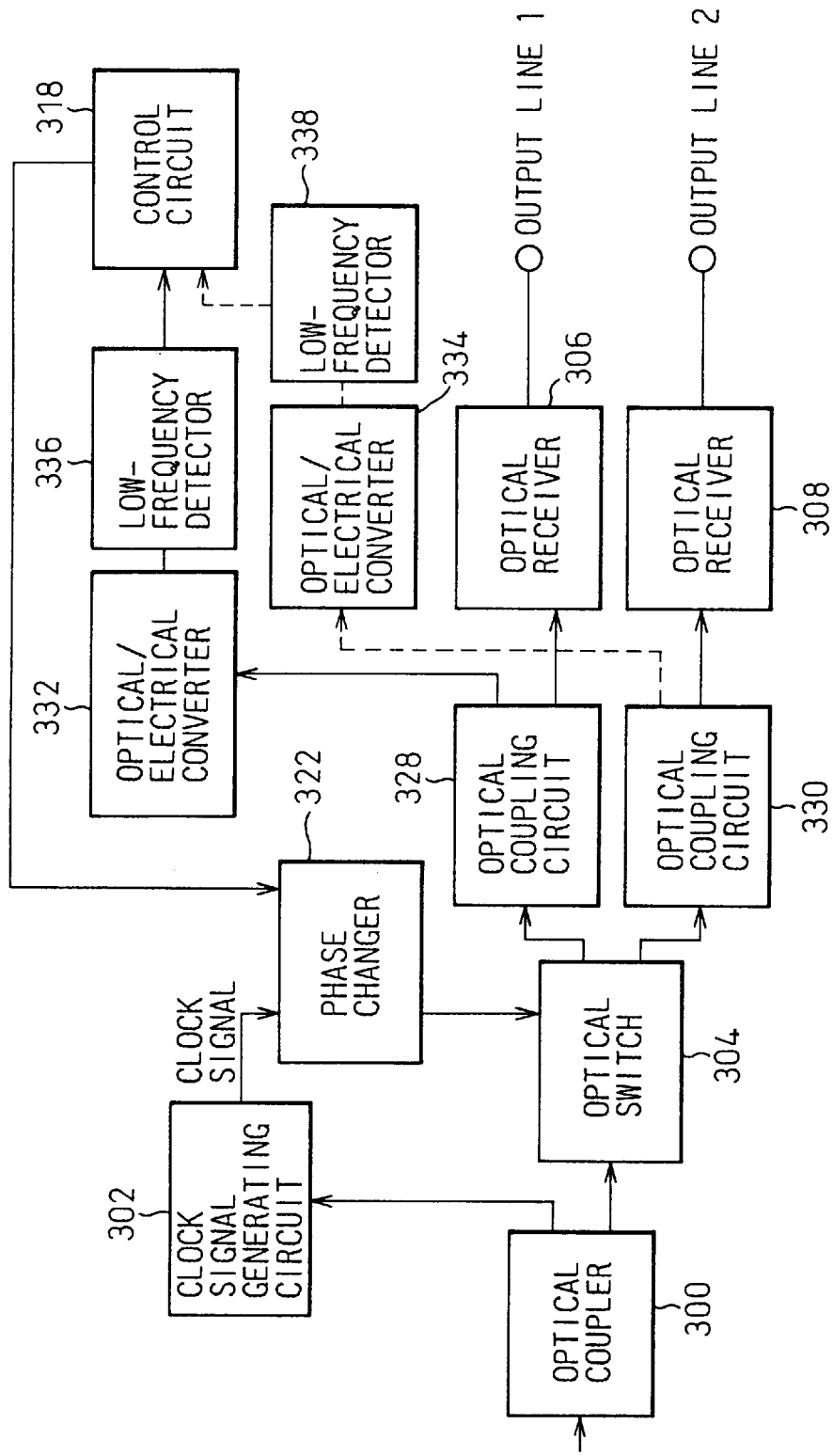
FIG. 91 is a block diagram showing another example of an optical demultiplexer according to the present invention.
Figure 92:
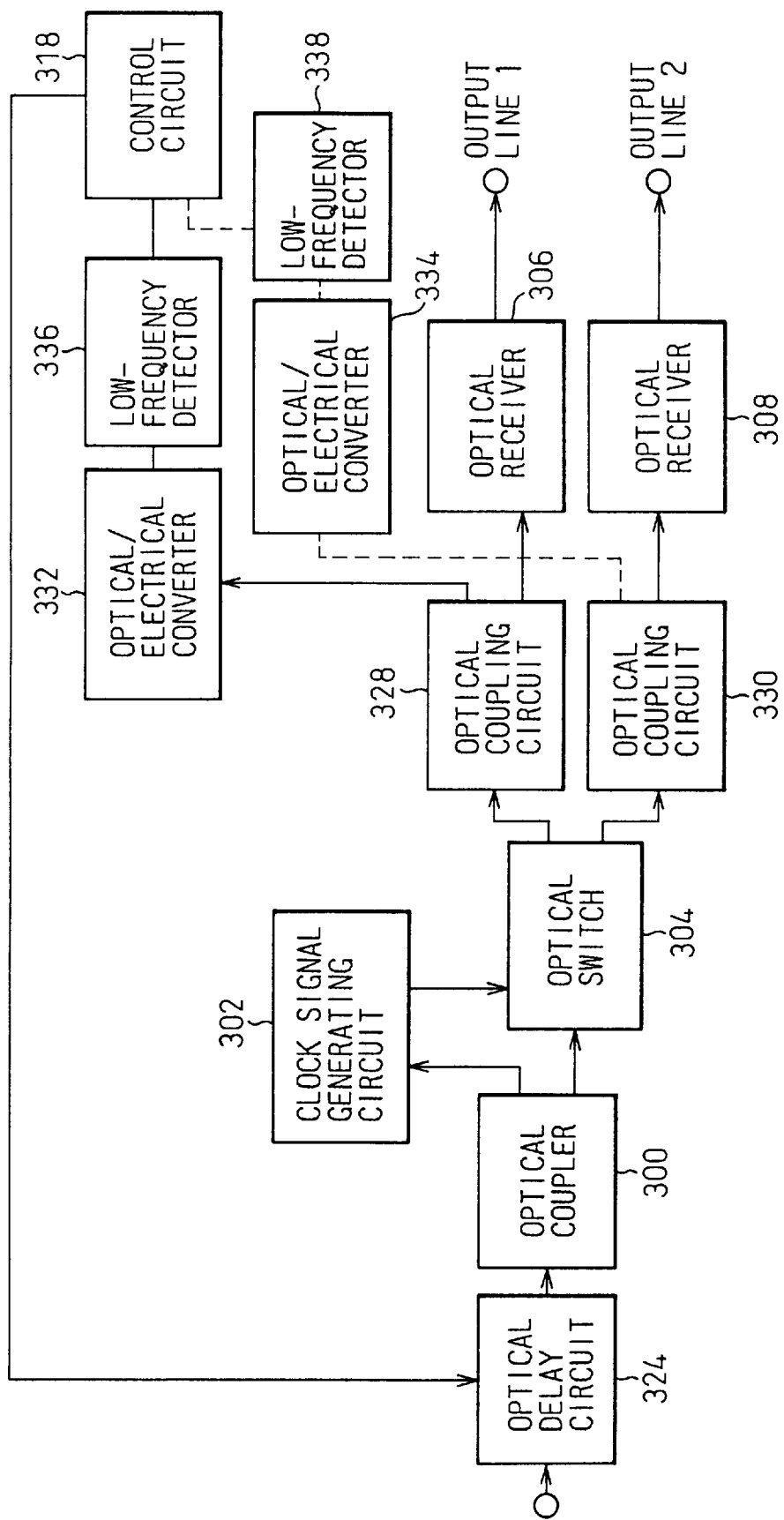
FIG. 92 is a block diagram showing another example of an optical demultiplexer according to the present invention.
Figure 93:
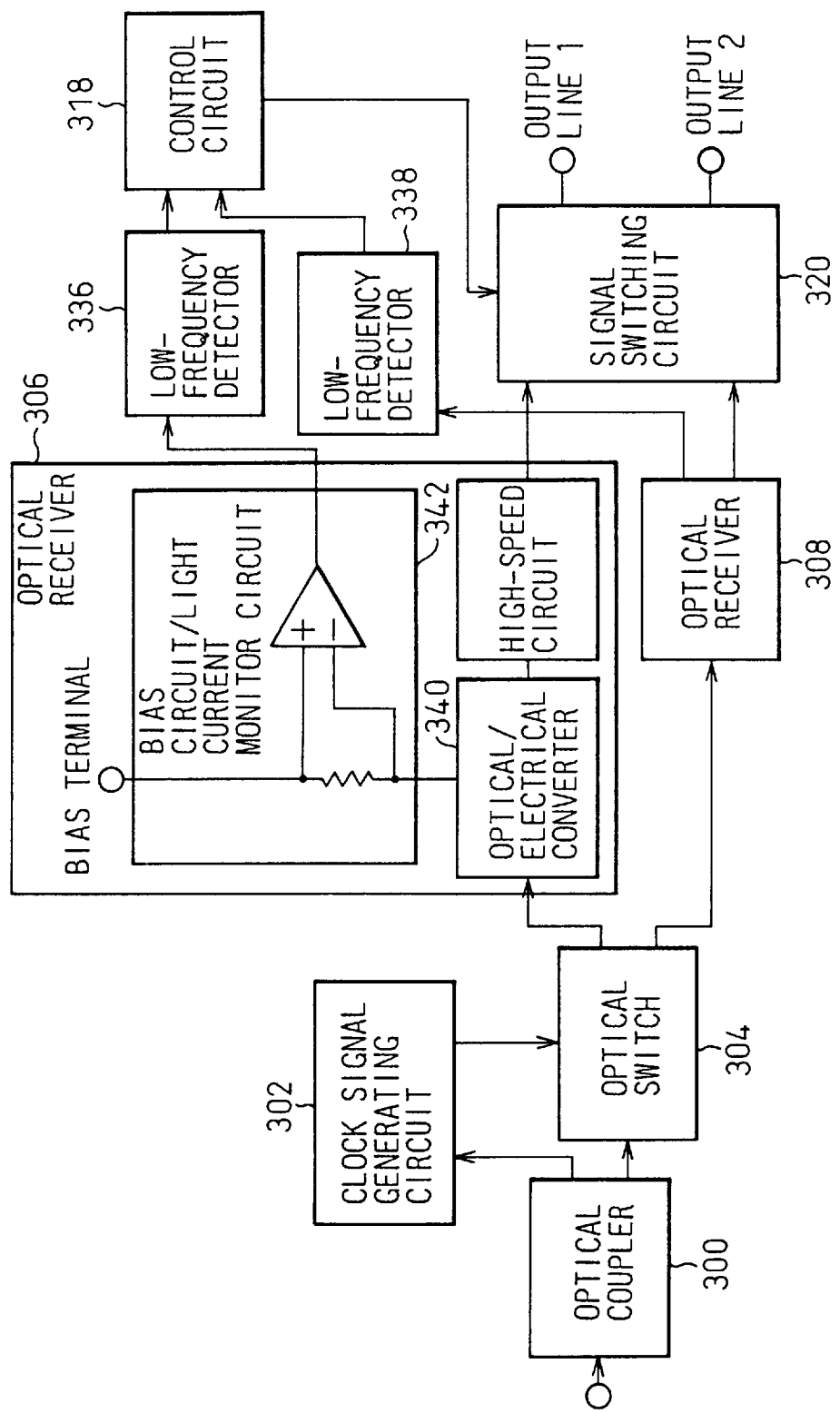
FIG. 93 is a block diagram showing another example of an optical demultiplexer according to the present invention.

The optical signals separated by the optical switch 304 are split in the respective optical couplers 328 and 330, and converted by optical /electrical conversion circuits 332 and 334 into electrical signals which are supplied to low-frequency detectors 336 and 338 for detection of the low-frequency signals superimposed on the respective signals. The control circuit 318 identifies the channels from the frequencies of the low-frequency signals and detected by the low-frequency detectors 336 and 338, and switches the connections in the signal switching circuit 320 so that the signals intended for the respective channels are output on the respective output lines 1 and 2. As described earlier, instead of switching the connections the phase of the clock signal may be changed as sown in FIG. 91, or the optical signal may be delayed or advanced as shown in FIG. 92. Further, in the case of two-wave multiplexing, since it is sufficient to identify one or the other of the two channels, the optical coupler 330, the optical/electrical conversion circuit 334, and the low-frequency detector 338 need not necessarily be provided, and only one channel may be used in the event of failure of that one channel. Further, the optical receiver 306 or 308 may be provided with a light current monitor circuit 342 for monitoring the current flowing to an optical/electrical converting element 340, as shown in FIG. 93, in which case the low-frequency signal can be derived form its output. In this case, the optical couplers, 328 and 330, and the optical/electrical conversion circuits, 332 and 334, can be eliminated.

Figure 94:
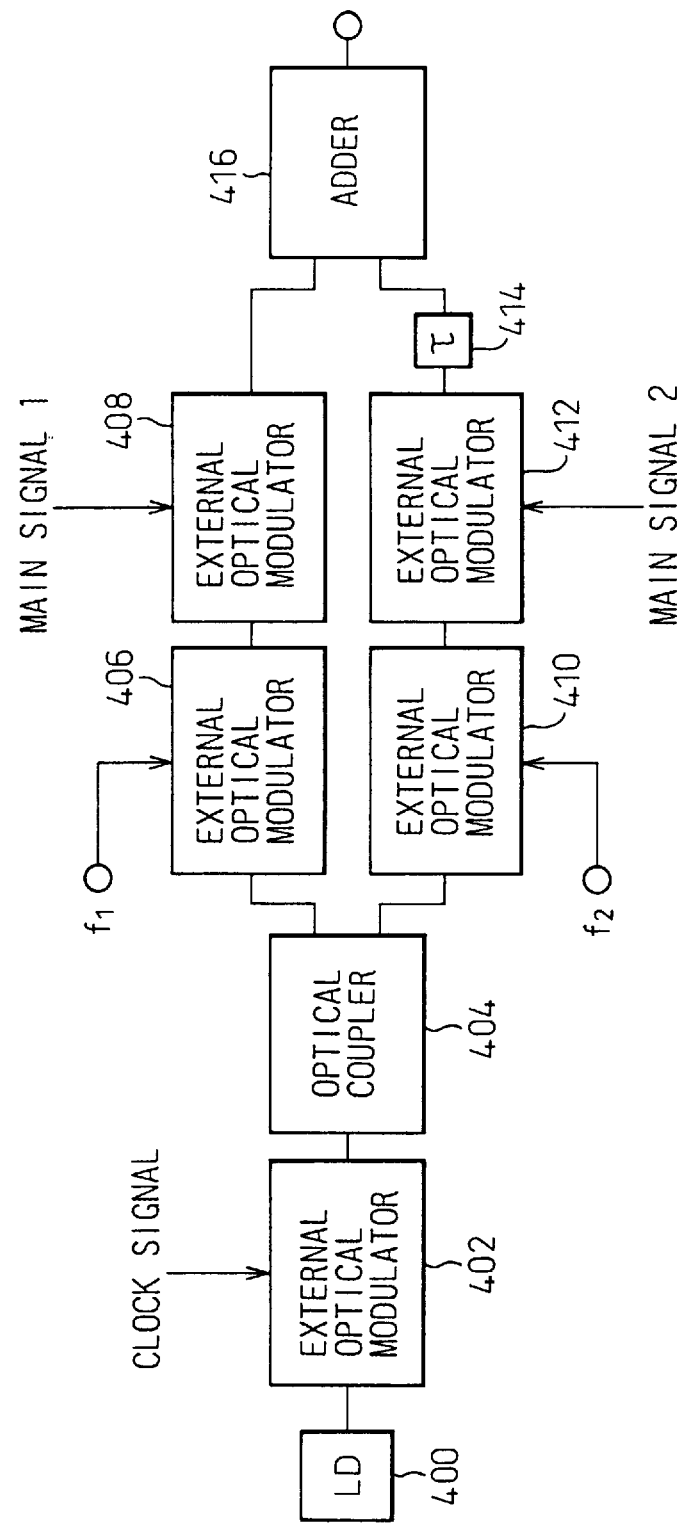
FIG. 94 is a block diagram showing an example of an optical transmitter according to the present invention.
Figure 107:
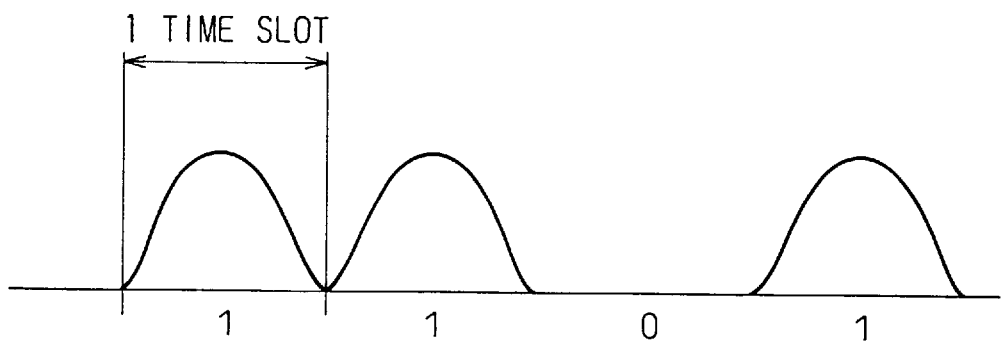
FIG. 107 is a waveform diagram showing an example of an optical multiplexed signal.

FIG. 94 shows the configuration of an optical transmitter for transmitting optical signals by superimposing thereon low-frequency signals $f_1$ of different frequencies for different channels. Light from a light source 400 is "punched" in an external optical modulator 402 in synchronism with a clock signal, and optical pulse trains are produced, and split by an optical coupler 404 into a required number of outputs (two in the case shown in the figure). The first split light is modulated with a frequency $f_1$ in an external optical modulator 406, and further modulated with a first main signal in an external modulator 408. Likewise, the second split light is modulated with a frequency $f_2$, and further modulated with a second main signal in an external optical modulator 412; the thus modulated light is passed through an optical delay element 414 to produce a time shift with respect to the first optical signal, and added together in an adder 416. Consequently, during the period (time slot) that the light is modulated with the first main signal, the frequency $f_1$ is superimposed in amplitude, and during the time slot in which the light is modulated with the second main signal, the frequency $f_2$ is superimposed in amplitude. It is desirable that the signal "punching" in the external optical modulator 402 be performed so that the resulting multiplexed signal will have the waveform shown in FIG. 107, the pulse for each channel just occupying one time slot. The advantage obtained by this will be explained later.

In the optical multiplexing system shown in FIG. 94, the input optical signal is split without introducing a phase difference between the split signals, and after applying modulation, a phase shift is introduced and the two signals are combined together; by contrast, in the optical multiplexing system shown in FIG. 70, the input optical signal is split by the optical switch 241 into two signals with opposite phases, and these signals are directly combined together. In the latter system also, if an external optical modulator for modulating with the frequency $f_1$ or $f_2$ is provided in series to the external optical modulators 244 and 245, low-frequency signals of different frequencies for different channels can be superimposed. Each of the external optical modulators, 402, 406, 408, 410, and 412, can be implemented using a Mach-Zehnder optical modulator or an electric-field absorption optical modulator (EA optical modulator).

Figure 95:
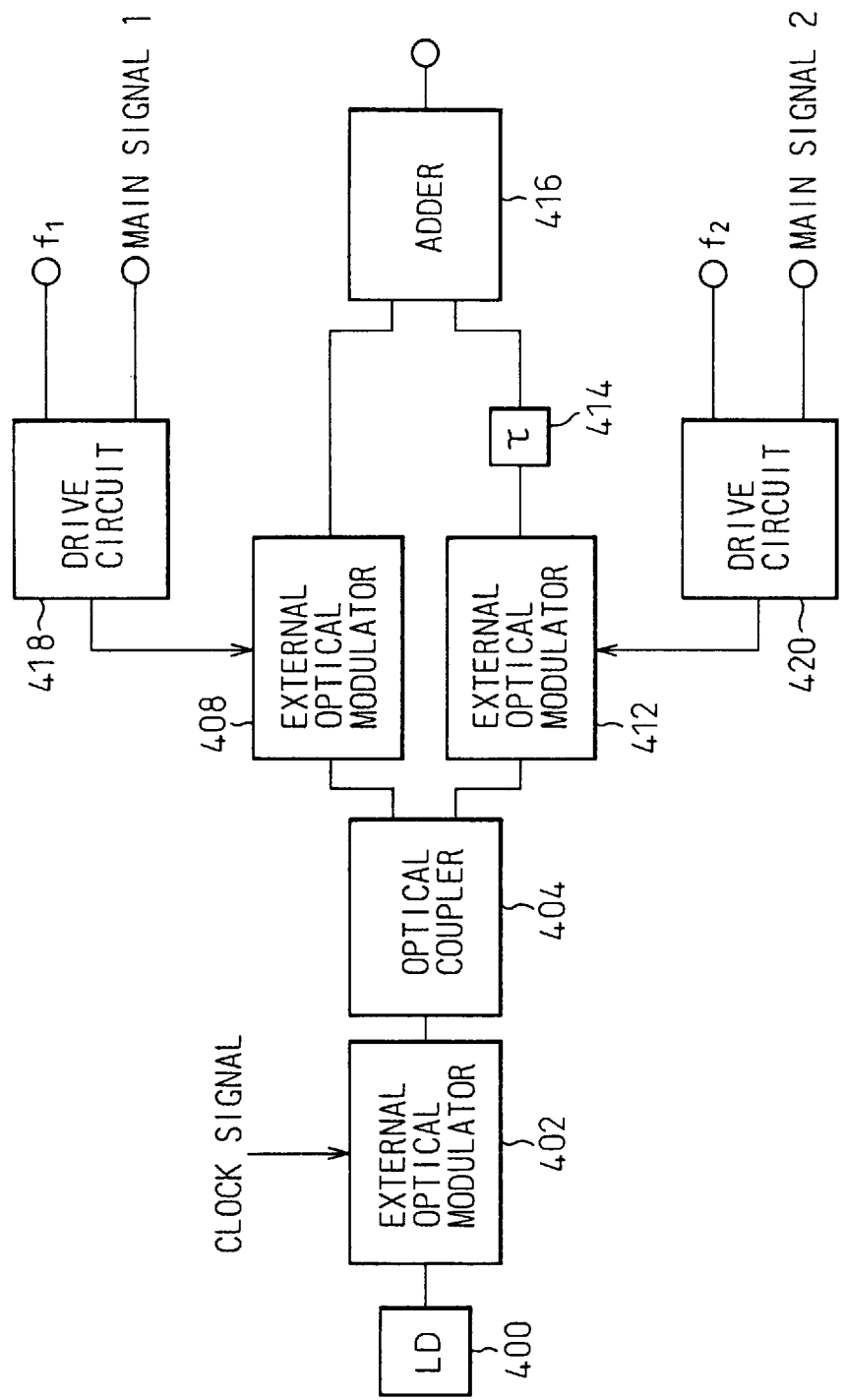
FIG. 95 is a block diagram showing another example of an optical transmitter according to the present invention.
Figure 96:
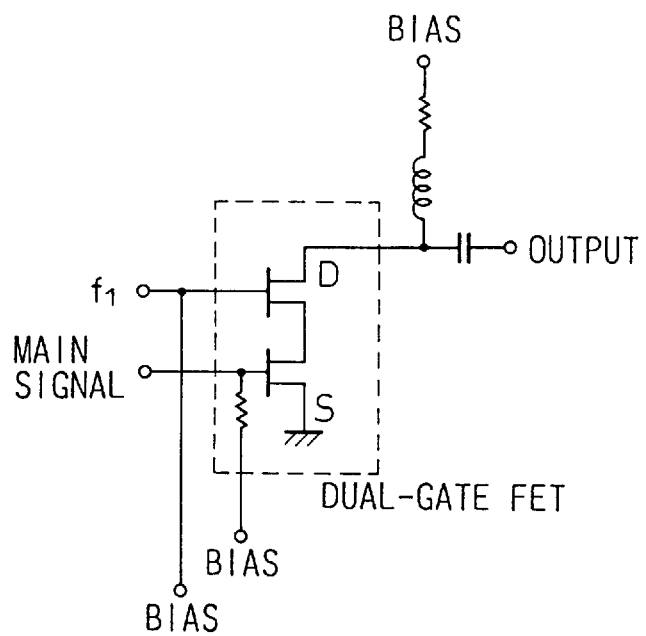
FIG. 96 is a circuit diagram showing the details of drive circuits 418 and 420.

FIG. 95 shows another example of the optical transmitter of the present invention. The number of external optical modulators can be reduced by already superimposing the frequencies $f_1$ and $f_2$ in amplitude on the respective main signals in drive circuits 418 and 420. The drive circuits 418 and 420 each can be implemented using a dual-gate FET such as shown in FIG. 96. A waveform in drive circuits are shown in FIG. 120.

Figure 116:
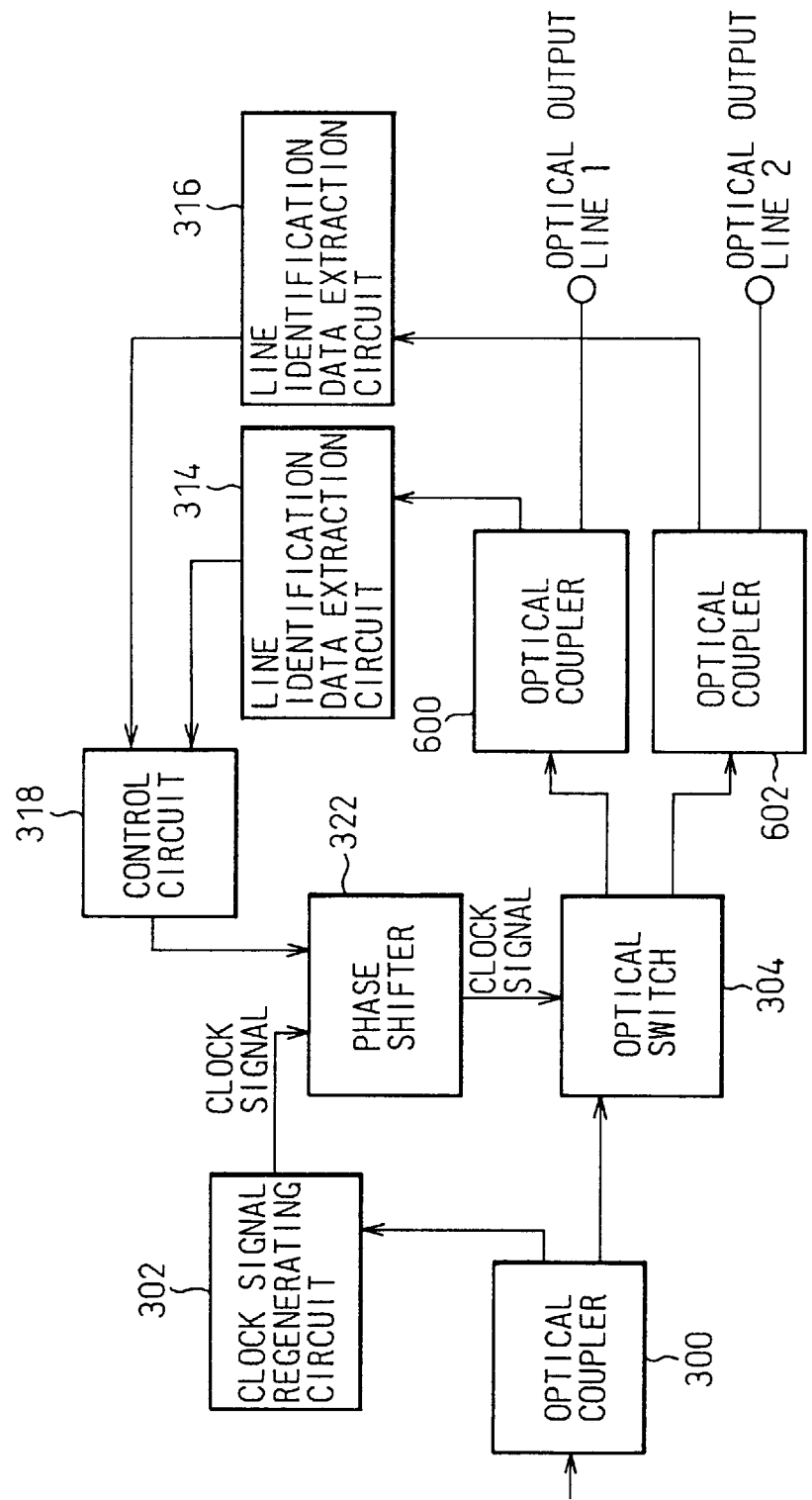
FIG. 116 is a block diagram showing an example of an optical exchange according to the present invention.
Figure 117:
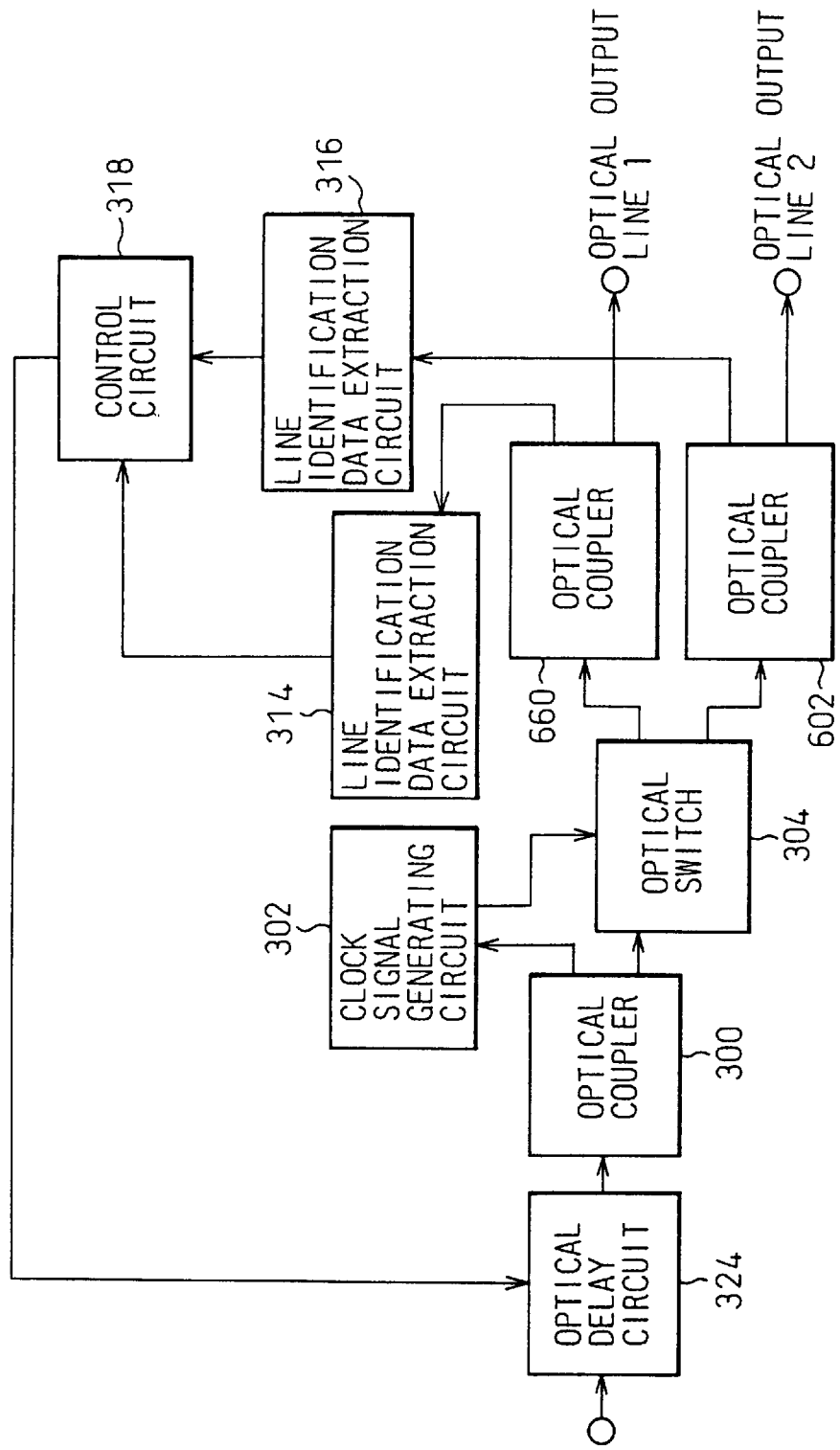
FIG. 117 is a block diagram showing another example of an optical exchange according to the present invention.
Figure 118:
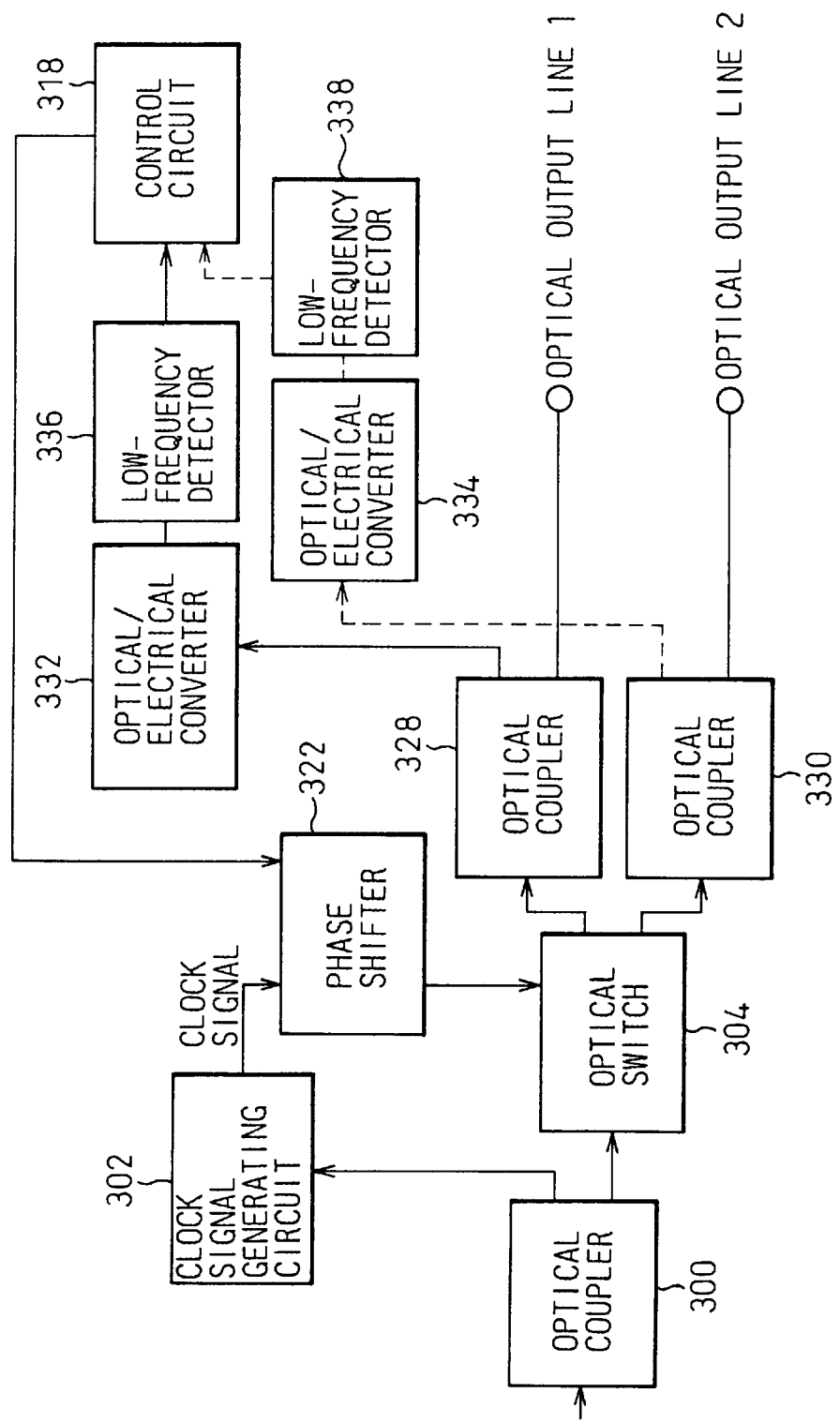
FIG. 118 is a block diagram showing another example of an optical exchange according to the present invention.
Figure 119:
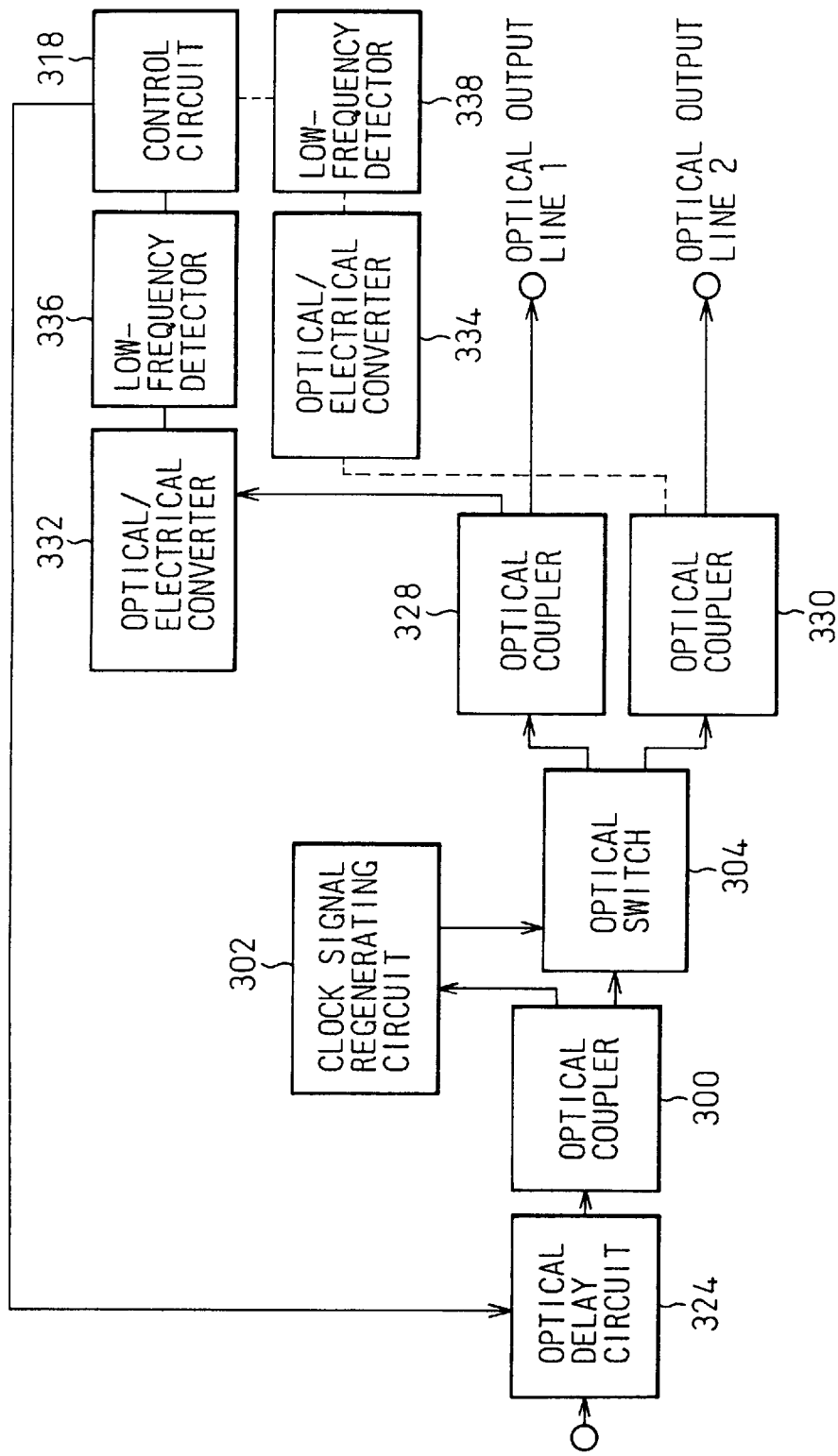
FIG. 119 is a block diagram showing another example of an optical exchange according to the present invention.

The optical demultiplexer for the optical receiver explained with reference to FIG. 83 to 92 can be modified to use it as a some kind of optical exchange that exchanges optical signals according to identification information included in an optical multiplexed signal. For example, by replacing the optical receiver 306 and 308 of FIG. 85 and FIG. 87 with optical couplers 600 and 602, respectively, as shown in FIG. 116 and FIG. 117, and by connecting another outputs of the optical couplers 600 and 602 to optical outputs 1 and 2, the modified optical demultiplexer can be used as an optical exchange. The circuit of FIG. 91 or FIG. 92 can be modified to an optical exchange by directly connecting the output of the optical couplers 328 and 330 to optical output line 1 and 2, as shown in FIG. 118 or FIG. 119.

Figure 97:
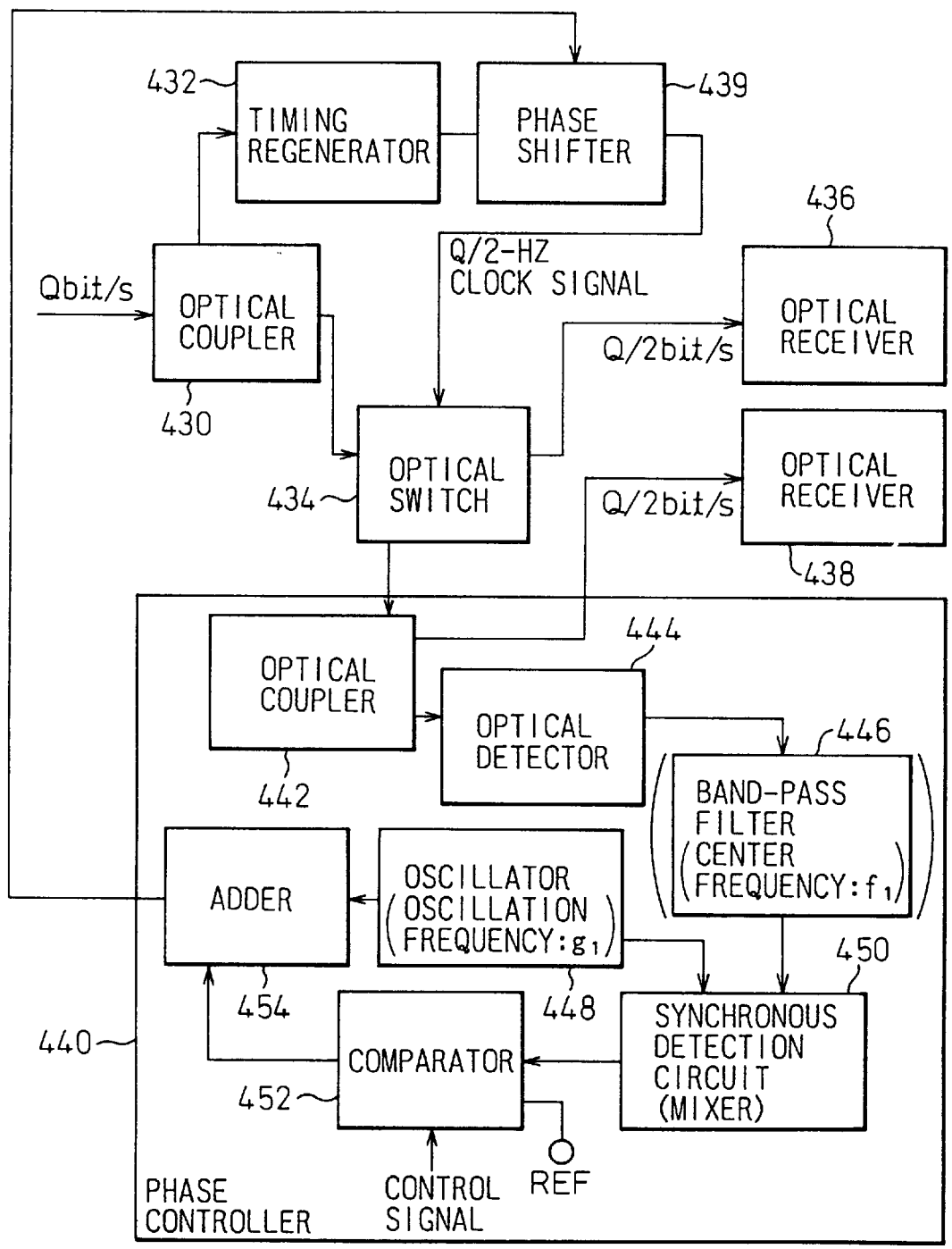
FIG. 97 is a block diagram showing an optical receiver in which clock phase stabilization control is performed according to the present invention.

When low-frequency signals are superimposed on the received signal, as shown in FIG. 90, the low-frequency signals can be used not only for channel identification but also for control for stabilizing the phase of the clock signal used for optical demultiplexing. FIG. 97 shows the configuration of an optical receiver having a phase controller for stabilizing the clock signal by using the superimposed low-frequency signals.

The optical receiver shown comprises an optical coupler 430 for splitting the received Q-bit optical signal into two signals, a timing regenerator 432 for regenerating a Q/2-Hz clock signal from one of the split signals, an optical switch 434 for separating the optical signal as light into two Q/2-bit/s optical signals by using the regenerated clock signal, and optical receivers 436 and 438 for recovering the data signals from the separated optical signals. This configuration is fundamentally the same as that shown in FIG. 83.

The phase of the clock signal supplied from the timing regenerator 432 to the optical switch 434 is changed by a phase shifter 439 which is under control of a phase controller 440. The phase controller 440 comprises an optical coupler 442 for splitting one of the separated Q/2-bit/s optical signals, an optical detector 444 for converting one of the separated optical signals into an electrical signal, a band-pass filter 446 for transmitting only a signal of designated frequency $f_1$ in the output from the optical detector 444, an oscillator 448 with an oscillation frequency of $g_1$, a synchronous detection circuit 450 for performing phase synchronous detection on the output of the band-pass filter 446 with a signal of frequency $g_1$, a comparator 452 for comparing the detection output of the synchronous detection circuit 450 with a predetermined reference value and for generating a control voltage based on the result of the comparison, and an adder 454 for adding the output of the comparator 452 to the output of the oscillator 448 and for outputting a control signal for the phase shifter 439. Low-frequency signals of different frequencies need not be superimposed on the optical signals of all channels, but need only be superimposed on a designated channel. In the latter case, the ban-pass filter 446 can be eliminated. However, in the latter case also, if the band-pass filter 446 is inserted, the S/N ratio of the signal input to the synchronous detection circuit 450 can be improved.

Figure 98:
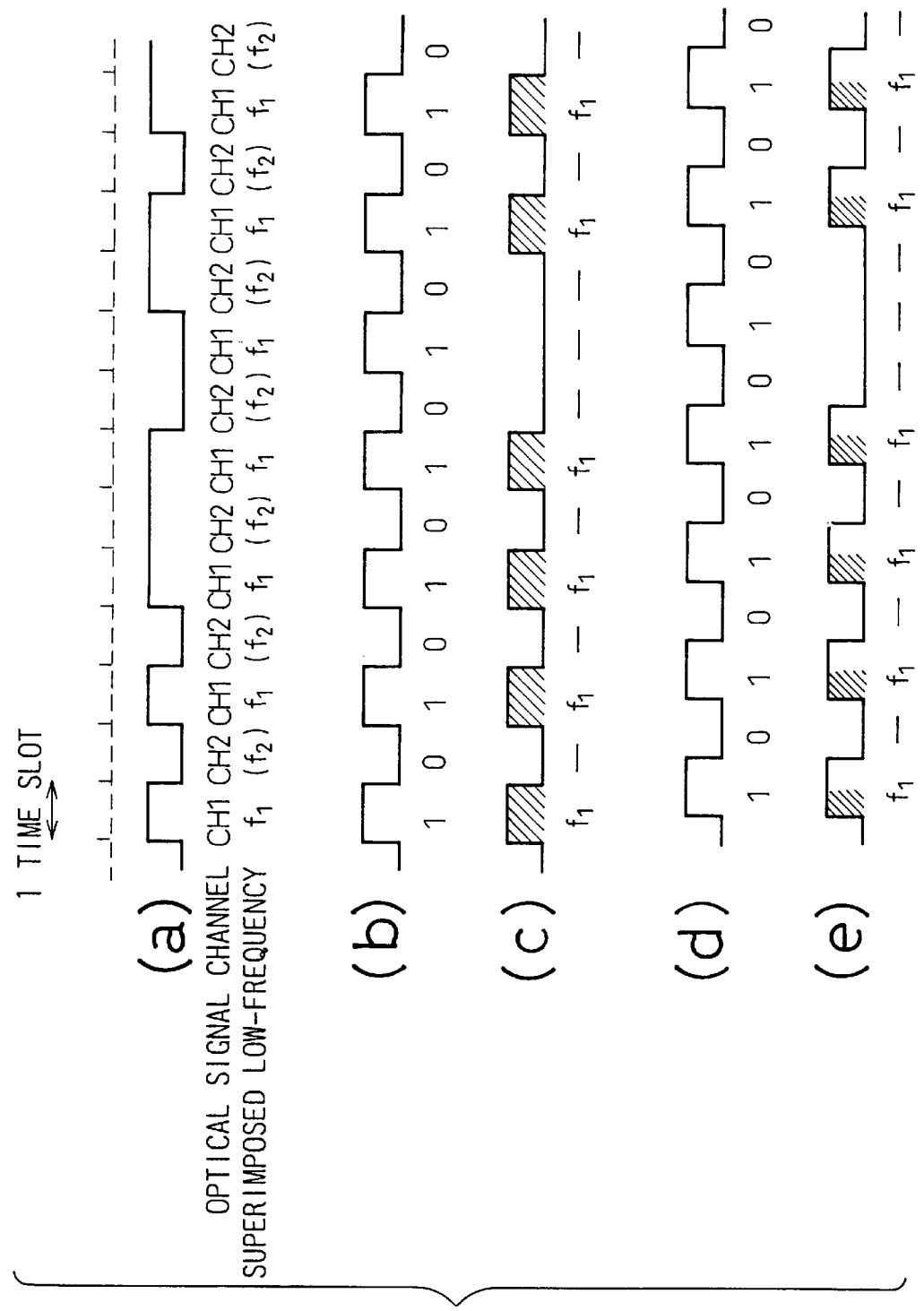
FIG. 98 is a timing chart for explaining the operation of the circuit shown in FIG. 97.
Figure 99:
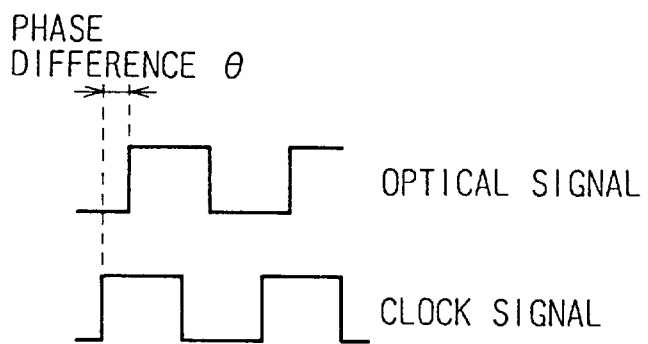
FIG. 99 is a diagram for explaining phase difference 0.
Figure 100:
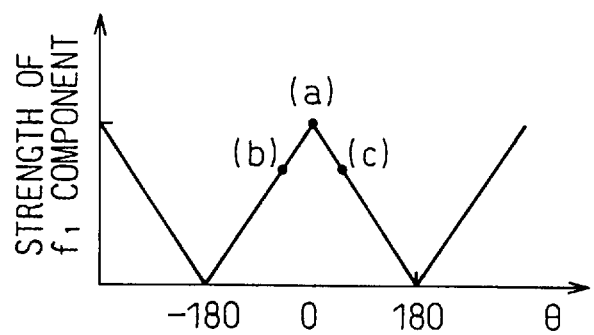
FIG. 100 is a diagram showing the relationship between phase difference 0 and $f_1$ component strength.

It is assumed here that the frequency $f_1$ is superimposed only on CH1, as shown in FIG. 98(a). When the phase of the clock signal perfectly matches the phase of the optical signal in the optical switch 434, as shown in FIG. 98(b), the strength of the signal of frequency f1 output from the optical detector 444 becomes the greatest, as shown in FIG. 98(c). On the other hand, when the clock signal is out of phase, as shown in FIG. 98(d), since the $f_1$ signal is not derived in tis entirety in the optical switch 434, the strength of the $f_1$ signal decreases. More specifically, as the phase difference θ between the optical signal and the clock signal, as defined in FIG. 99, changes from 0° to ±180°, the strength of the $f_1$ component decreases linearly, as shown in FIG. 100. Since the phase shifter 409 is controlled by the output of the oscillator 448, the clock signal is slightly phase-modulated with the frequency $g_1$. Suppose here that the center of the phase variation is at point (b) in FIG. 100. Then, since the strength of the $f_1$ component varies with the frequency $g_1$ and the straight line is upward to the right, the variation of the strength of the $f_1$ component is in phase or 180° out of phase with the frequency $g_1$ output from the oscillator 448. Therefore, when the phase synchronous detection is done in the synchronous detection circuit 450 with the frequency $g_1$, the output takes a positive or negative value of the same magnitude. When the center of the phase variation is at point (c) in FIG. 100, since the straight line is downward to the right, the phase detection output takes the same value as when at point (b) but the sign is inverted. When the center is at point (a), since half of the variation is folded back, there is no variation component of the frequency $g_1$ and the phase detection output becomes zero. Therefore, by comparing the output of the synchronous detection circuit 450 with the reference value, for example, the zero level, in the comparator 452, and by controlling the phase of the clock signal with the sum of the result of the comparison and the output of the oscillator 448, the operating point can be controlled to point (a) in FIG. 100. The control signal being input to the comparator 452 is for inverting the polarity of the output of the comparator 452; when the polarity of the output of the comparator 452 is inverted, the center of the control shifts form point (a) (maximum) to minimum, thus shifting the phase of the clock signal by 180°. Switching between the channels can be easily achieved in this manner.

Figure 101:
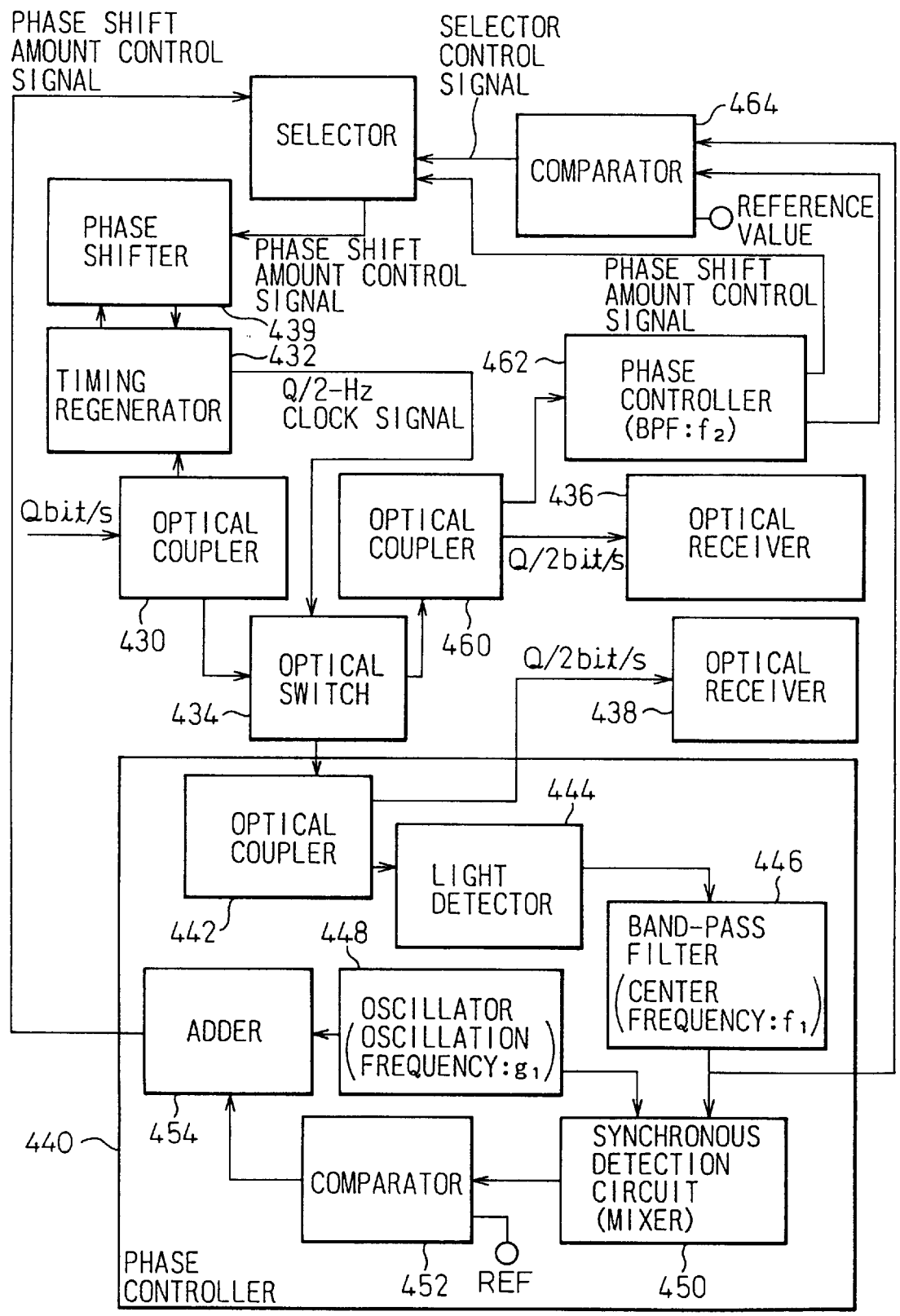
FIG. 101 is a block diagram showing another example of an optical receiver according to the present invention.

The circuit shown in FIG. 101 is a modified example of the optical receiver of FIG. 97. In the circuit of FIG. 101, not only the optical signal to the optical receiver 438 is split, but the optical signal to the optical receiver 436 is split by an optical coupler 460, and input to a phase controller 562 having the same configuration as the phase controller 440. However, while the center frequency of the band-pass filter in the phase controller 440 is $f_1$, in the phase controller 462 the center frequency of the band-pass filter is $f_2$ to achieve locking on the other channel. The outputs of the band-pass filters in the phase controllers 440 and 462 are fed to a comparator 464 for comparison with a reference value. The enables the detection of any channel not in use. When one of the channels is not in use, a selector 466 is controlled to select the output signal of one or other of the phase controllers 440 and 462 and output it to control the phase of the clock signal using the phase shift amount control signal obtained for the channel in use. The phase shift amount control signal selected by the selector 466 is supplied to the phase shifter 439. If there is more than one channel identified as being in use, the selector 466 is controlled according to predetermined priority.

Figure 102:
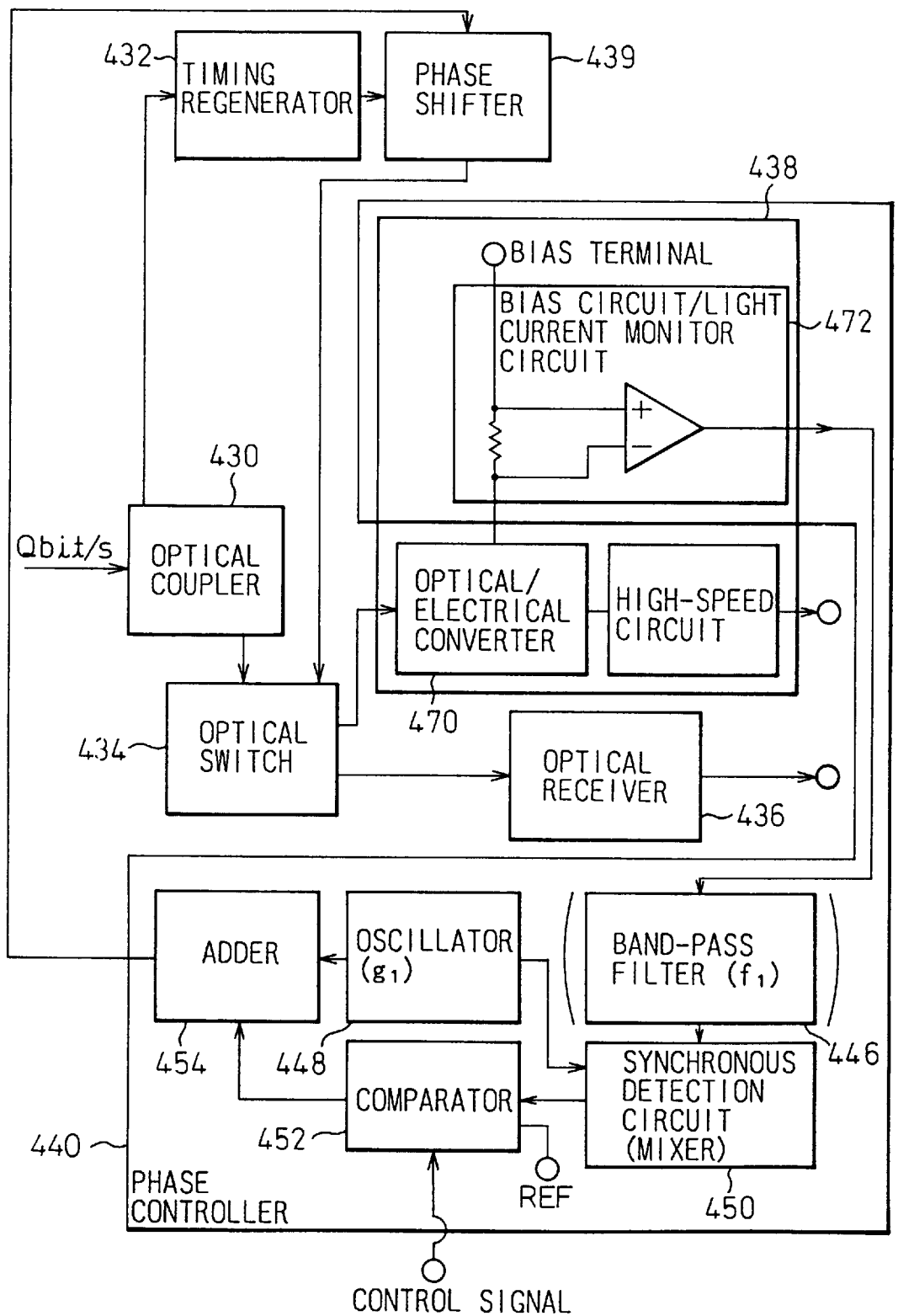
FIG. 102 is a block diagram showing another example of an optical receiver according to the present invention.

FIG. 102 also shows a modified example of FIG. 97. Instead of splitting the optical signal and converting it to an electrical signal for detection of low-frequency signals in the phase controller 440, the optical receiver 438 includes a light current monitor circuit 472 for an optical-electrical converting element 470, and low-frequency signals are derived from the output of the light current monitor circuit 472, as described with reference to FIG. 93.

Figure 103:
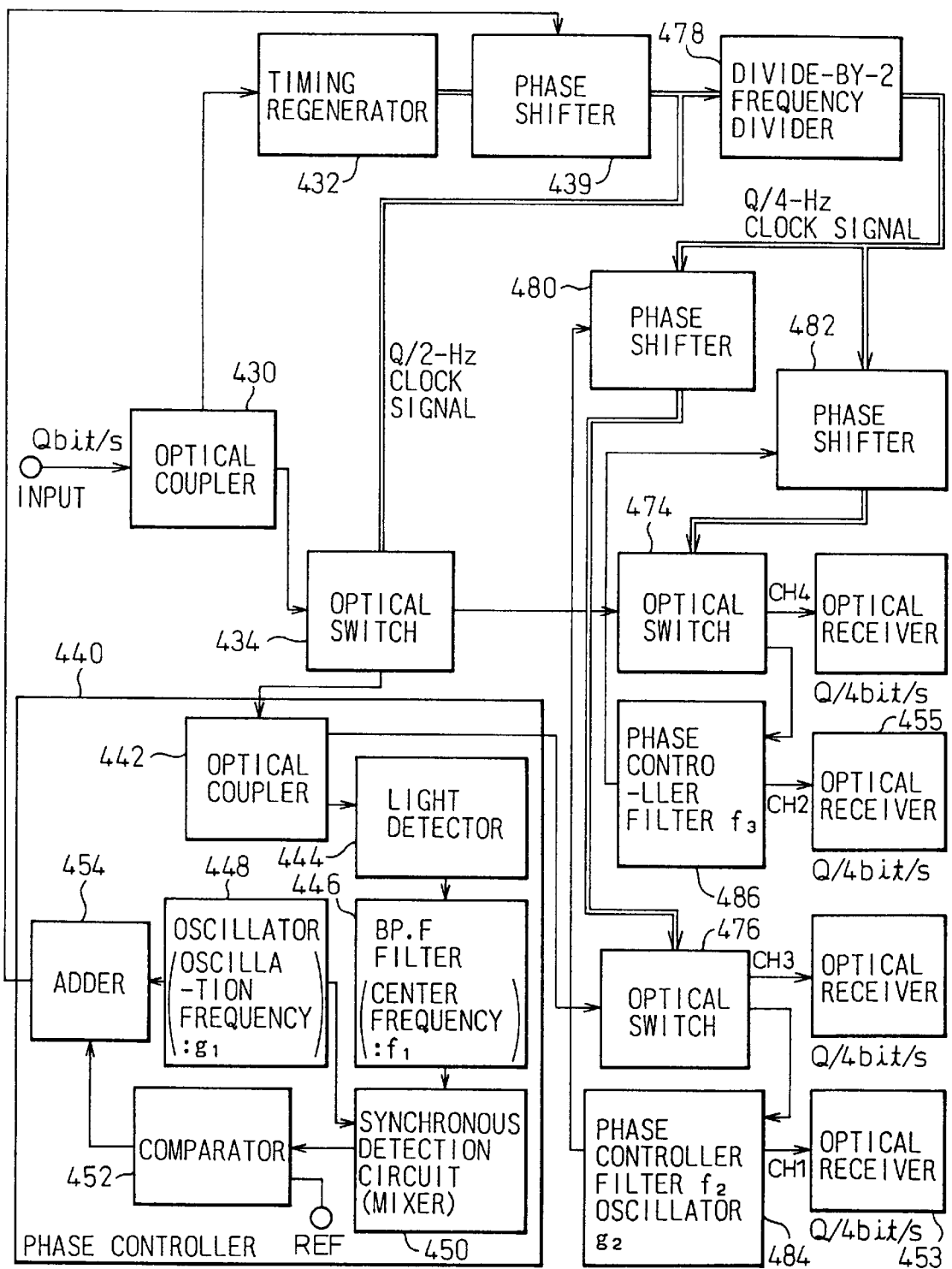
FIG. 103 is a block diagram showing another example of an optical receiver according to the present invention.
Figure 104:
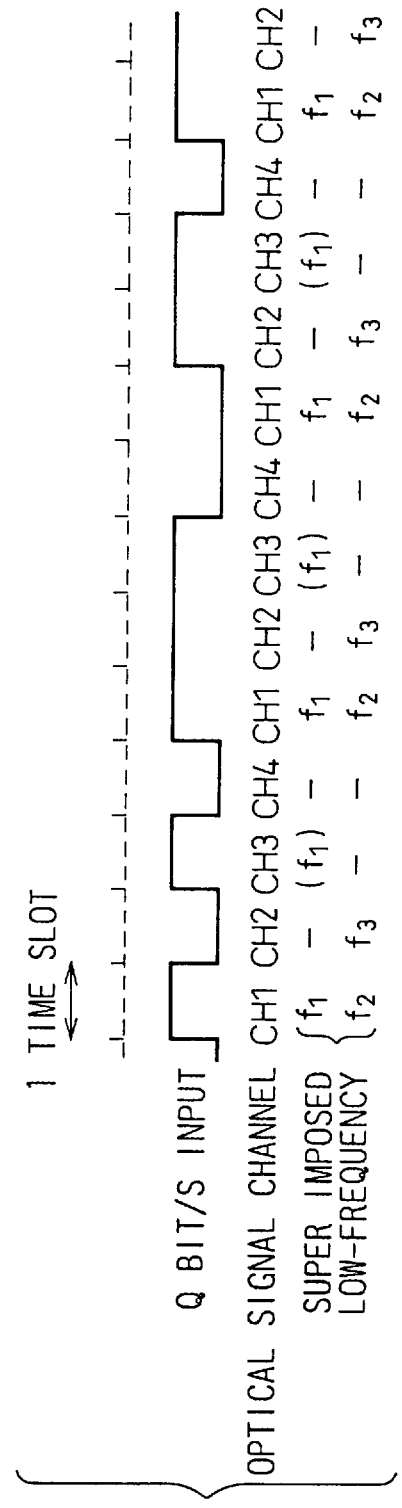
FIG. 104 is a diagram showing an example of a low-frequency signal superimposed on a received signal in the optical receiver shown in FIG. 103.

FIG. 103 shows an example of a configuration expanded to four-wave multiplexing. Two Q/2-bit/s optical signals separated by the optical switch 434 are further separated by optical switches 474 and 479 into four Q/4-bit/s optical signals. The Q/2-Hz clock signal output from the phase shifter 439 is divided by a divide-by-2 frequency divider 478, and the resulting Q/4-Hz clock signal is supplied to the optical switches 474 and 476 via phase shifters 480 and 482, respectively. The phase controller 440 controls the phase of the Q/2-Hz clock signal based on frequency $f_1$. Since the frequency $f_1$ is superimposed, for example, on CH1 and CH3 time slots, as shown in FIG. 104, the Q/2-Hz clock signal is phase synchronized to the CH1 or CH3 time slot under the control of the phase controller 440. This ensures stable separation of CH1+CH3 and CH2+CH4 by the optical switch 434. It should b noted that $f_1$ need not necessarily be superimposed on CH3.

In the example of FIG. 103, it is assumed that CH1+CH3 is input to the optical switch 476 and CH2+CH4 to the optical switch 474. A phase controller 484 controls the phase of the Q/4-Hz clock signal input to the optical switch 476, based on frequency $f_2$. In the example shown in FIG. 104, the frequency $f_2$ is superimposed on the CH1 time slot, so that the optical switch 476 can separate CH1 and CH3 stably. A phase controller 486 controls the phase of the Q/4-Hz clock signal input to the optical switch 474, based on frequency $f_3$. In the example shown in FIG. 104, the frequency $f_3$ is superimposed on the CH2 time slot, so that the optical switch 474 can separate CH2 and CH4 stably.

FIG. 103 shows an example for four-wave multiplexing. A system for eight-wave or 16-wave multiplexing can be constructed by cascading an optical switch, divider, and phase controller in a similar manner.

Figure 105:
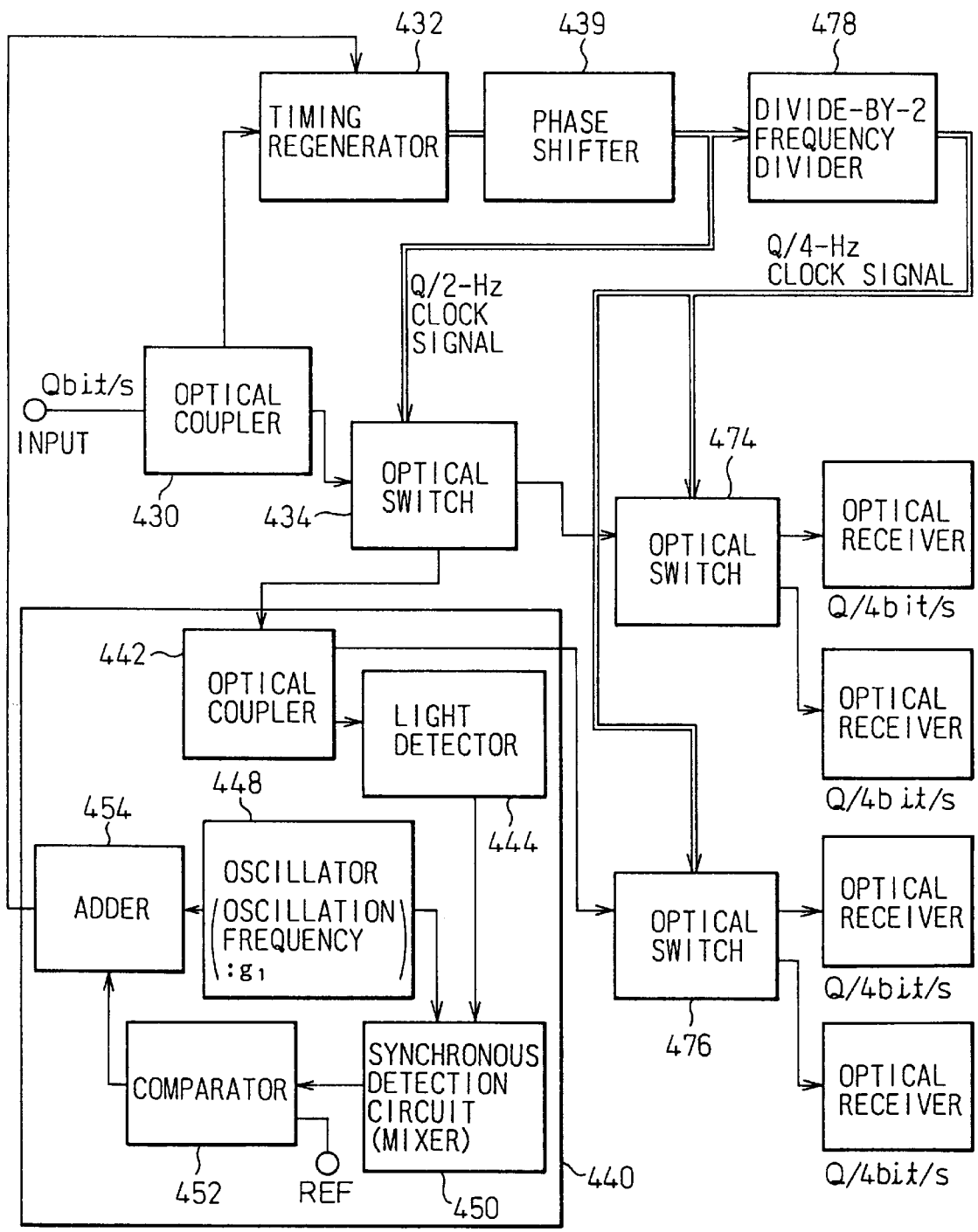
FIG. 105 is a block diagram showing another example of an optical receiver according to the present invention.

In a modified example of the circuit of FIG. 103, the phase shifters 480 and 482 and their associated phase controllers 484 and 486 can be omitted, as shown in FIG. 105, provided that the phases of the optical path and electrical path are adjusted at the time of manufacture so that the phase of the Q/4-Hz clock signal applied to the optical switches 474 and 476 becomes optimum if the Q/2-Hz clock signal applied to the optical switch 434 is optimum. In this configuration, since only the low-frequency signal $f_1$ needs to be superimposed, the band-pass filter 446 also can be omitted.

Furthermore, the configuration of FIG. 103 may be modified so that the frequencies, $f_1$, $f_2$, and $f_3$, necessary for the phase controllers, 440, 484, and 486, can be detected from the output of the light current monitor circuit of the optical/ electrical converting element provided in the optical receiver, as in the example shown in FIG. 102. In this case, provisions must be made so that $f_1$ and $f_2$ are detected from the optical receiver 453 that is to receive CH1, and $f_3$ from the optical receiver 455 that is to receive CH3.

Figure 106:
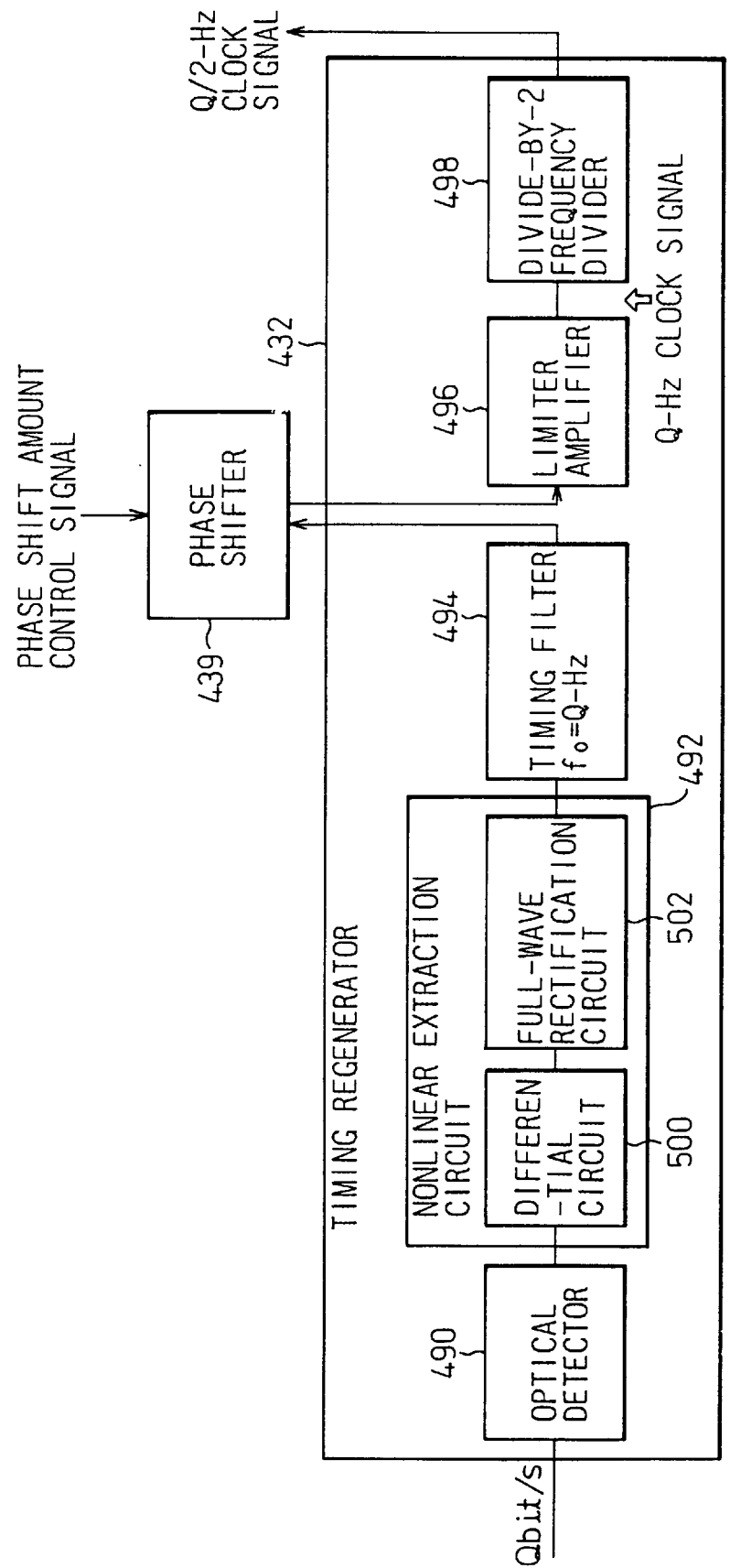
FIG. 106 is a block diagram showing an example of a detailed configuration of a timing regenerator.

FIG. 106 shows an example of the detailed configuration of the timing regenerator 432 and phase shifter 439 shown in FIGS. 96, 101, 102, 103, and 105. The timing regenerator 432 comprises an optical detector 490 for performing optical/electrical conversion, a nonlinear extraction circuit 492 for deriving a Q-Hz component from the output of the optical detector 490, a timing filter 494 for extracting only the Q-Hz component from the output of the nonlinear extraction circuit 492, a limiter amplifier 496 for keeping the output of the timing filter 494 at a constant amplitude, and a divide-by-2 frequency divider 498. It is advantageous to insert the phase shifter 439 between the timing filter 494 and the limiter amplifier 496.

Further, the nonlinear extraction circuit 492 comprises a differential circuit 500 and a full-wave rectification circuit 502. When signal switch each pulse positioned within one time slot are optical multiplexed, the differential circuit 500 and full-wave rectification circuit 502 for performing nonlinear extraction can be omitted, thus simplifying the timing generator 432.

Figure 108:
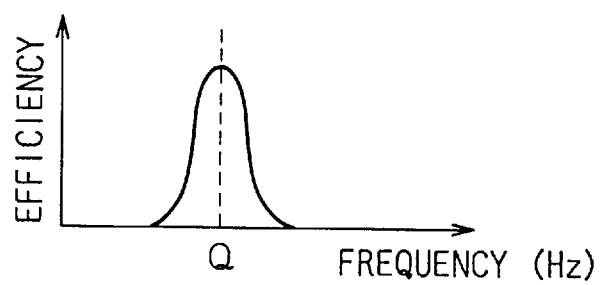
FIG. 108 is a diagram showing a characteristic of an optical detector.

In the thus simplified configuration, the optical detector 490 for performing optical/electrical conversion may be constructed to have a resonant frequency at Q Hz as shown in FIG. 108. This makes the fabrication of the optical detector easier, since the detector need not to have a flat frequency characteristic over a wide range. Furthermore, since the detector has a filter characteristic, the out-of-band attenuation characteristic of the timing filter 494 can be eased.

Figure 109:
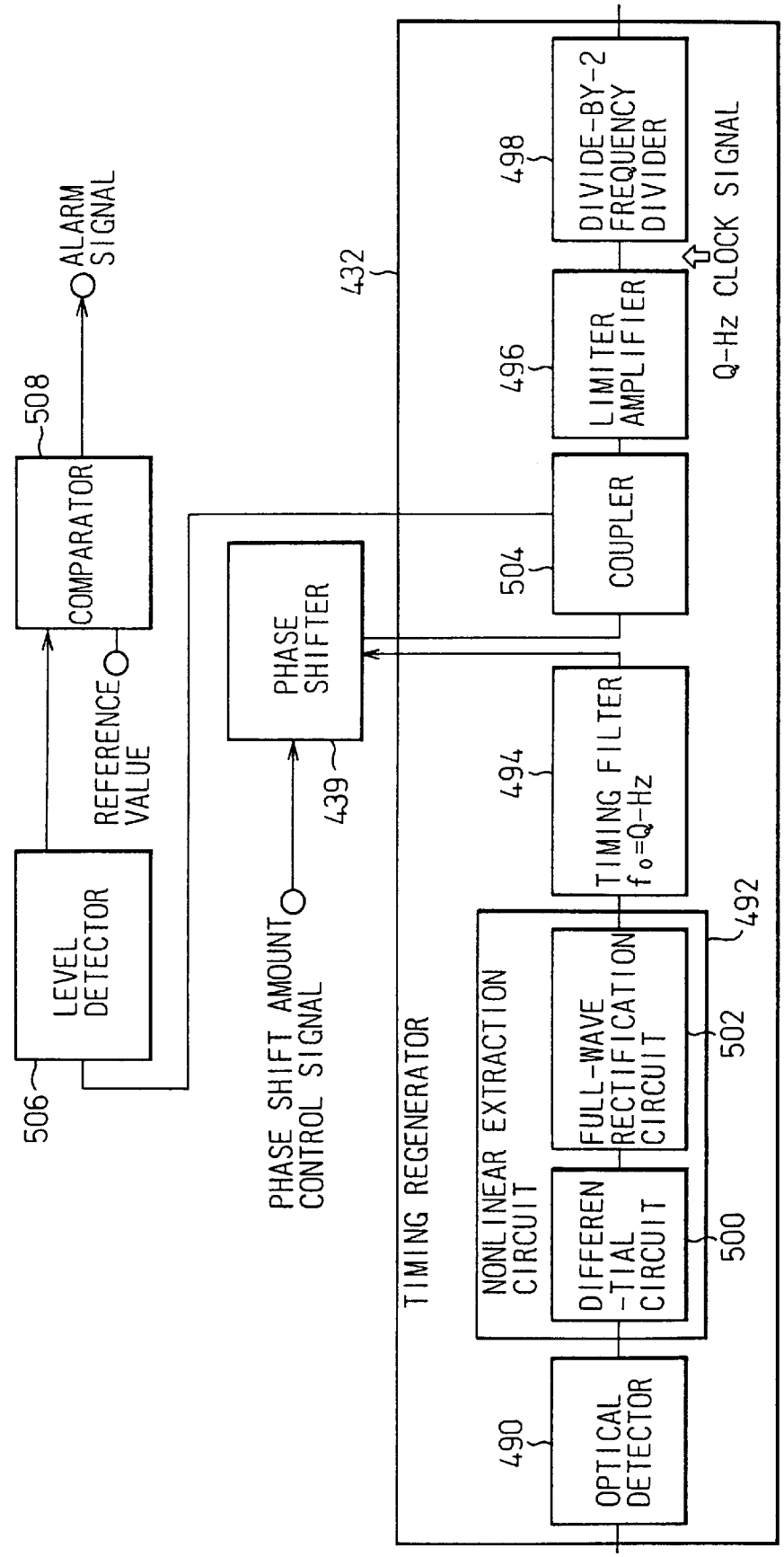
FIG. 109 is a block diagram showing another example of a detailed configuration of the timing regenerator.

FIG. 109 shows a modified example of the circuit of FIG. 106. A coupler circuit 504 is used to separate a portion of a signal, and the level of the received signal is detected by a level detector 506. The detected level is compared in a comparator 508 with a reference value, and if the level is below the reference value, an input off alarm signal is output. Since the circuit from the input to the comparator 508 is made up only of passive components which are less prone to failure, the input-off condition of the light can be detected reliably. With this configuration, if a signal-off condition has occurred in the optical receiver, the cause of that condition can be identified, that is, whether the optical input signal has been cut off or has gone out of synchronization.

Figure 110:
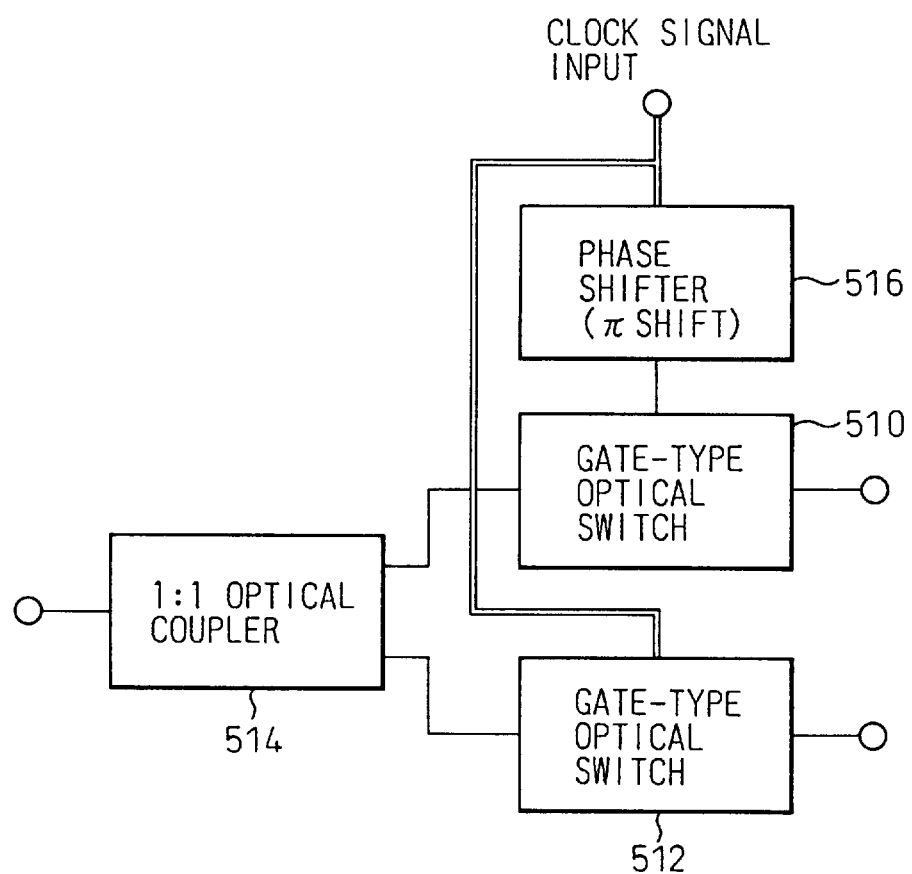
FIG. 110 is a block diagram showing the details of an optical switch.

The optical switch for separating an input optical switch into two 180° out-of-phase optical signals by using a clock signal can be implemented by a directional active optical coupler using a Ti-diffused LiNbO$_3$ crystal waveguide described in Japanese Patent Unexamined Publication No. 55-7315. As shown in FIG. 110, it can also be constructed using two gate-type optical switches 510 and 512, an optical coupler circuit 514 for distributing optical signals to them, and a phase shifter 516 for shifting the phase of the clock signal input to the gate-type optical switch 510 by 180°. This configuration can reduce polarization dependence than the directional active optical coupler. The gate-type optical switch is a device that exhibits varying transmittance with an applied voltage and therefore can also be used as an optical modulator. An electric-field absorption optical modulator (EA modulator) is an example.

Figure 111:
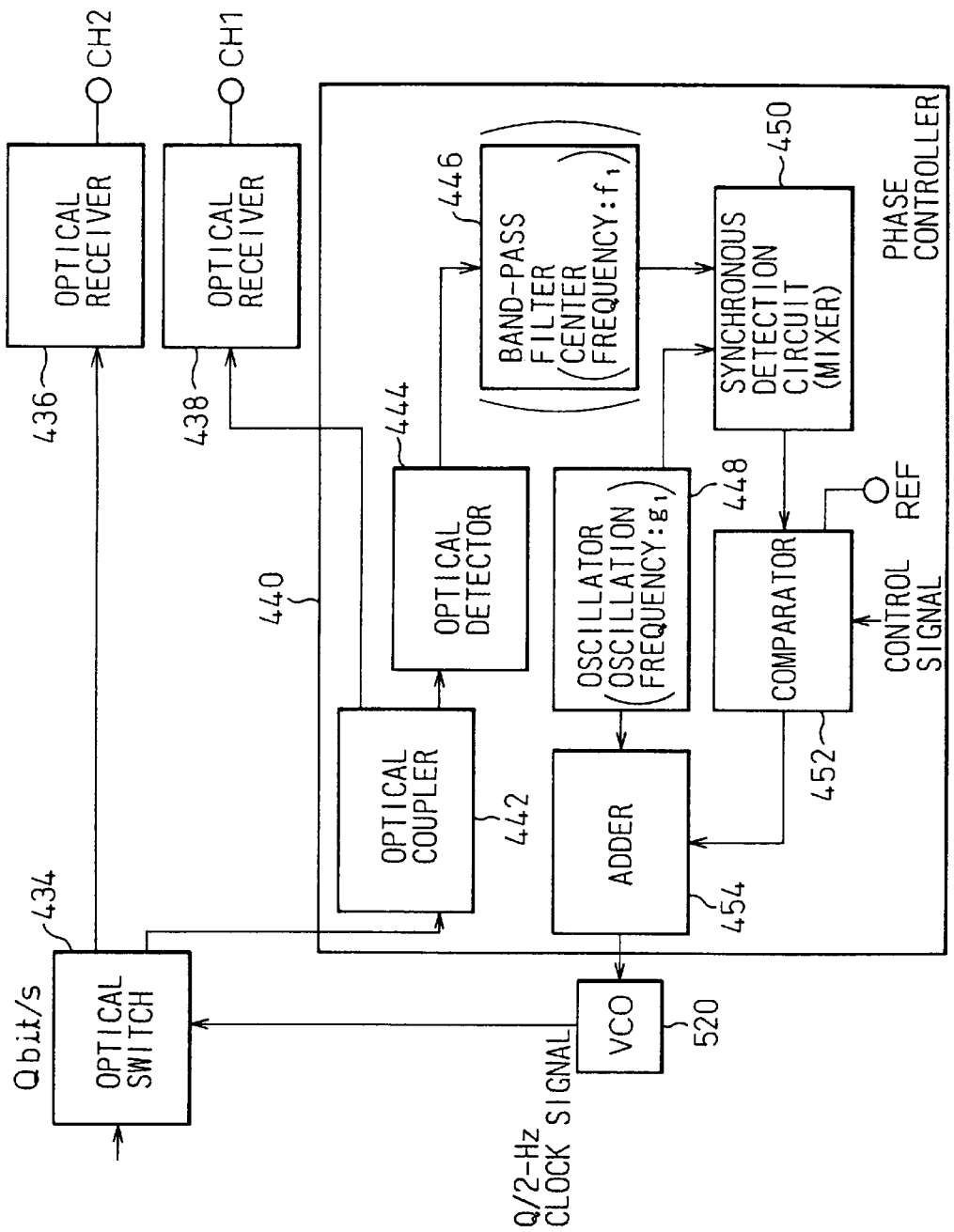
FIG. 111 is a block diagram showing another example of an optical receiver according to the present invention.

In any of the optical receivers described with reference to FIGS. 97 to 105, an optimum clock signal was obtained by controlling the phase of the clock signal recovered from the received optical signal. Instead, it would be possible to generate a clock signal using a voltage-controlled oscillator (VCO) and control it so that the frequency and phase become optimum, as shown in FIG. 111. In FIG. 111, the phase controller 440 is identical in configuration and operation to the one shown in FIG. 97. The clock signal supplied to the optical switch 434 is generated by the VCO 520, while the control signal output from the phase controller 440 is given to the VCO 520.

The following describes how the clock signal generated by the VCO 520 is controlled to the optimum value.

First, definitions are given as follows.

$\phi(t)$: Phase of the clock signal input to the optical switch 434 (phase of the output signal from the VCO 520)

$\alpha(t)$: Phase of the optical signal input to the optical switch (for simplicity, it is assumed that an alternating signal 1010 is input) with respect to channel 1

$\theta(t)$: $\phi(t)-\alpha(t)$ (see FIG. 99)

$\omega_0$: Free-running angular frequency of VCO

V(t): Control voltage for VCO×Angular frequency modulation sensitivity of VCO

Vo: Output value of synchronous detection circuit 450

K: Constant

The strength of the $f_1$ component that passes through the band-pass filter 446 (center frequency $f_1$) varies with the phase difference $\theta$ as shown in FIG. 100.

Here, perturbation is applied to $\theta$ by adding a low-frequency signal, $I_0 \cos 2\pi g_1 t$, output from the oscillator 448, to the control voltage applied to VCO 520.

$$d\phi/dt=\omega_0+V(t)=\omega_0+I_0 \cos 2\pi g_1 t+KVo \quad (1)$$

Now, Vo is assumed to be changing slowly or in a steady state, and therefore constant.

Integrating equation (1) gives equation (2), from which it can be seen that $\phi$ i phase-modulated with the frequency $g_1$.

$$\phi=(\omega_0+KVo)t+I_1 \sin 2\pi g_1 t+C \quad (2)$$

(C: Constant of integration, $I_1$: Constant)

Therefore, assuming that the derivative of $\alpha(t)$ with respect to time is constant, $\theta(t)$ is phase-modulated with the frequency $g_1$ as in the case of FIG. 97.

When $\theta$ is phase-modulated, the $f_1$ component transmitted through the band-pass filter 446 exhibits the response shown in FIG. 100, as already described. That is, at point (a) where the waveform is folded back, the component of $\sin 2\pi g_1 t$ does not exist in the variation of the $f_1$ component. At point (b), it is in phase with the input signal, and at point (c), it is 180° out of phase.

Figure 112:
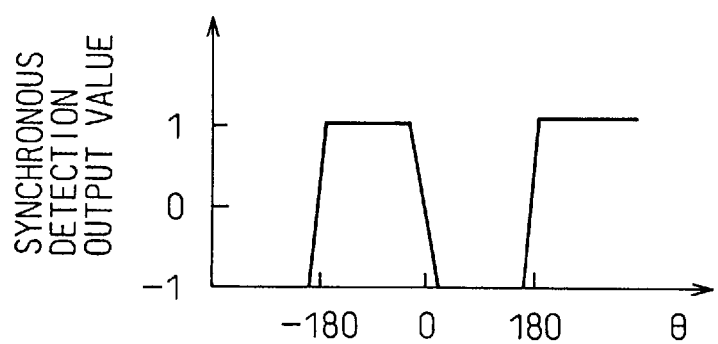
FIG. 112 is a diagram showing the relationship of a synchronous detection output value relative to the phase difference 0.

Therefore, the output Vo(t) of the synchronous detection performed using the output of oscillator 448, $I_0 \sin 2\pi g_1 t$, will be as shown in FIG. 112.

(It is assumed that +1 is output when in phase and −1 when 180° out of phase.)

Next, the convergence of the operation is observed. When the perturbation component is removed for simplicity, this can be written as $$d\phi/dt=\omega_0+V(t)=\omega_0+KVo(t) \quad (3)$$

Transforming this equation, we have $$d\theta/dt=d\phi/dt-d\alpha/dt=\omega_0-d\alpha/dt+Vo(t)=\Delta\omega_0+KVo(t)$$

Since $d\alpha/dt$ is a constant value, $\Delta\omega_0$ is a constant value. If K is positive and is large, and if $\leftarrow\omega_0/K\approx 0$, then when $\theta>0$, Vo(t)<0 and $d\theta/dt<0$, and hence $\theta$ converges to 0, and when $\theta<0$, Vo(t)>0 and $d\theta/dt>0$, and hence $\theta$ converges to 0.

From the above, it is shown that $\theta$ converges to 0, which indicates that the optical signal can be switched between the light paths by the optical switch with optimum timing.

Figure 113:
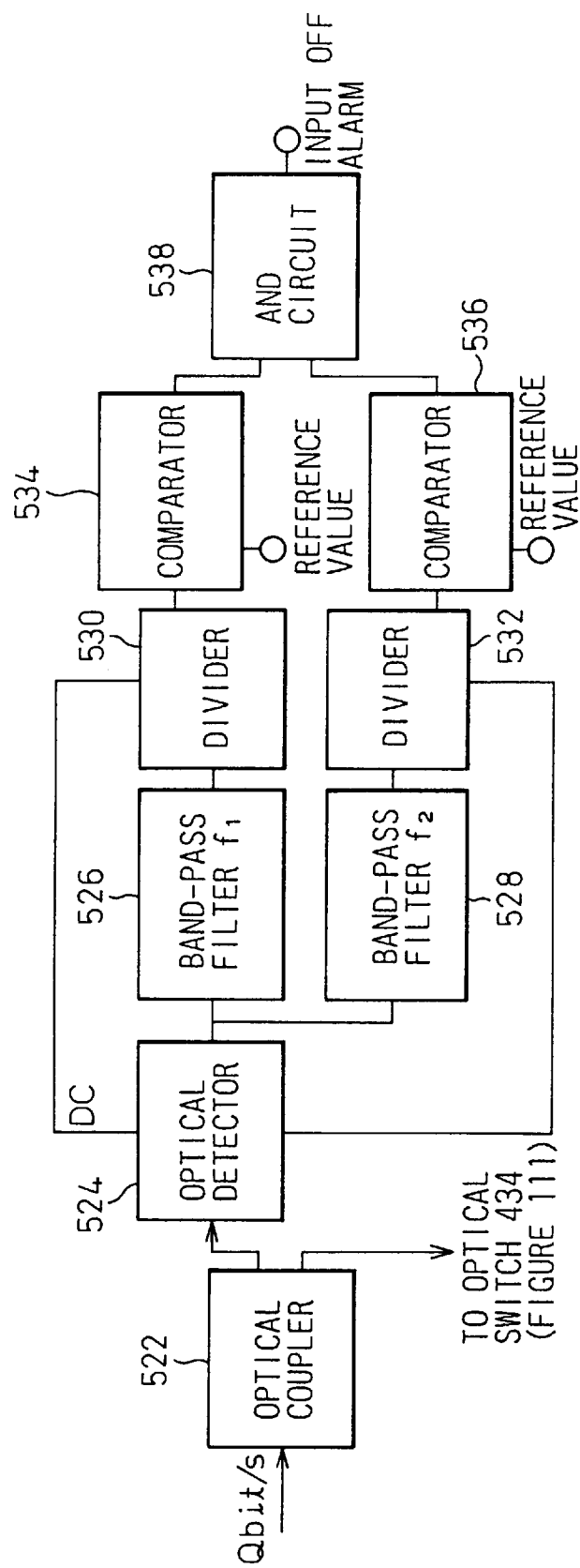
FIG. 113 is a diagram showing an example of a circuit for detecting an input-off alarm condition.

FIG. 113 shows a circuit configuration for implementing the detection of a light input-off condition in the receiver configuration shown in FIG. 111. The received optical signal is split by an optical coupler 522 one of whose output is supplied to the optical switch 434 (FIG. 111). The other output is supplied to an optical detector 524 for conversion into an electrical signal. This electrical signal is input to band-pass filters 526 and 528 for detection of the low-frequency components $f_1$ and $f_2$, respectively, which are then normalized by being divided by a DC value in dividers 530 and 532, and are compared with a reference value in comparators 534 and 536, and the results of the comparisons are ANDed to produce an input off alarm signal. The circuit shown in FIG. 111 assumes that $f_1$ is superimposed on one channel and $f_2$ on the other channel. Only one of $f_1$ and $f_2$ may be monitored, but when both are monitored, only one of the lines can be used. The dividers 530 and 532 are provided to remove the effects of input power variation, but these can be omitted when the input power is stable.

Figure 114:
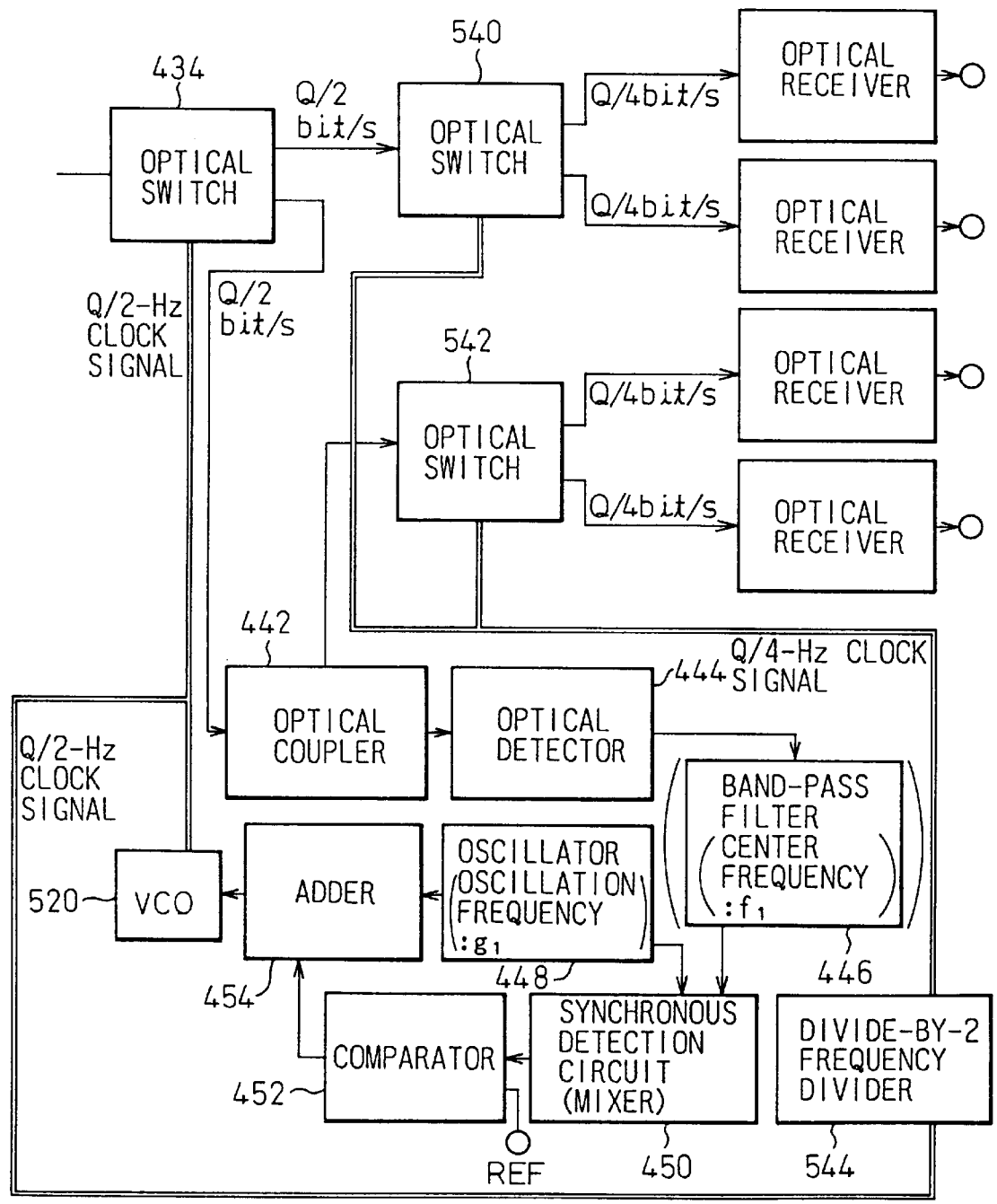
FIG. 114 is a block diagram showing another example of an optical receiver according to the present invention.

FIG. 114 shows an expanded version of the circuit of FIG. 111 for four-wave multiplexing. Clock signals applied to optical switches 540 and 542 are created by dividing the output of the VCO 520 by two in a divide-by-two frequency divider 544. The low-frequency signal $f_1$ is superimposed on CH1 and CH2.

We claim:

1. An optical transmission system comprising:

optical time-division multiplexing means for time-division multiplexing a plurality of optical signal channels;

means for appending identification information for identifying each optical signal channel, to an optical multiplexed signal generated by the optical time-division multiplexing means;

an identification information extraction circuit for extracting the identification information contained in the optical signal channel; and a control circuit for changing output destinations so that each optical signal channel is output on a designated destination in accordance with the identification information extracted by the identification information extraction circuit.

2. An optical transmission system according to claim 1, further comprising:

a clock regenerating circuit for regenerating a clock signal for each optical signal channel from the optical multiplexed signal; and an optical switch for separating each optical signal channel from the optical multiplexed signal in accordance with the clock signal regenerated by the clock regenerating circuit.

3. An optical transmission system according to claim 2, wherein the identification information appending means appends identification data to a data signal transmitted on each of the optical signals, and the identification information extraction circuit extracts the identification data contained in the data signal reconstructed from each optical signal channel.

4. An optical transmission system according to claim 3, wherein the control circuit changes output destinations by changing connections between the output of each optical signal channel and the output destinations.

5. An optical transmission system according to claim 3, wherein the control circuit changes output destinations by changing the phase of the clock signal supplied to the optical switch.

6. An optical transmission system according to claim 3, wherein the control circuit changes output destinations by delaying or advancing the optical multiplexed signal input to the optical switch.

7. An optical transmission system according to claim 2, wherein the identification information appending means superimposes a low-frequency signal on the optical multiplexed signal in a time slot designated for a specific optical signal channel, and the identification information extraction circuit extracts the identification information by detecting the low-frequency signal superimposed on the optical multiplexed signal.

8. An optical transmission system according to claim 7, wherein the identification information extraction circuit detects the low-frequency signal from an electrical signal converted from each optical signal channel separated by the optical switch.

9. An optical transmission system according to claim 7, wherein the identification information extraction circuit detects the low-frequency signal from a current flowing to an optical/electrical converting device for converting each optical signal channel separated by the optical switch into an electrical signal.

10. An optical transmission system according to claim 7, further comprising a signal switching circuit provided between outputs of the optical switch and output destinations, wherein the control circuit changes output destinations by changing in the signal switching circuit connection relationships between the outputs of the optical switch and the output destinations.

11. An optical transmission system according to claim 7, wherein the control circuit changes output destinations by changing the phase of the clock signal supplied to the optical switch.

12. An optical transmission system according to claim 7, wherein the control circuit changes output destinations by delaying or advancing the optical multiplexed signal input to the optical switch.

13. An optical transmitter comprising:

optical time-division multiplexing means for time-division multiplexing a plurality of optical signal channels; and means for appending identification information for identifying each optical signal channel, to an optical multiplexed signal generated by the optical time-division multiplexing means.

14. An optical transmitter according to claim 13, wherein the identification information appending means superimposes a low-frequency signal on the optical multiplexed signal in a time slot designated for a specific optical signal channel.

15. An optical transmitter according to claim 14, wherein the identification information appending means includes a second optical modulator which is connected in series to an optical modulator for generating the specific optical signal channel, and to which the low-frequency signal is applied as a modulating signal.

16. An optical transmitter according to claim 14, wherein the identification information appending means includes a drive circuit for superimposing the low-frequency signal on a modulating signal for the specific optical signal channel, and for supplying the resulting signal as a modulating signal to an optical modulator for generating the optical signal channel.

* * * * *